(12) United States Patent
Motadel et al.

(10) Patent No.: US 11,059,047 B2
(45) Date of Patent: Jul. 13, 2021

(54) RIGIDIFIED PIPETTE TIP TRAY

(71) Applicant: Biotix, Inc., San Diego, CA (US)

(72) Inventors: Arta Motadel, San Diego, CA (US);
Peter Paul Blaszcak, San Diego, CA (US); Kyle Richard Briggs, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 106 days.

(21) Appl. No.: 16/359,759

(22) Filed: Mar. 20, 2019

(65) Prior Publication Data

US 2019/0299217 A1     Oct. 3, 2019

Related U.S. Application Data

(60) Provisional application No. 62/650,154, filed on Mar. 29, 2018.

(51) Int. Cl.
| | |
|---|---|
| *B65D 85/30* | (2006.01) |
| *B01L 3/00* | (2006.01) |
| *B01L 9/00* | (2006.01) |
| *B65D 25/10* | (2006.01) |

(Continued)

(52) U.S. Cl.
CPC ............ *B01L 9/543* (2013.01); *B65D 25/108* (2013.01); *B01L 2200/025* (2013.01); *B01L 2300/043* (2013.01); *B01L 2300/0609* (2013.01); *B01L 2300/0809* (2013.01);

(Continued)

(58) Field of Classification Search
CPC ..... B65D 25/108; B65D 43/164; B01L 9/543;
B01L 2200/025; B01L 2300/043; B01L 2300/0609; B01L 2300/0809; B01L 2300/0858; B01L 2300/12; G01N 2035/103
USPC ......... 206/486, 499, 443; 220/529; 422/560, 422/565, 566
See application file for complete search history.

(56) References Cited

U.S. PATENT DOCUMENTS

| | | | | |
|---|---|---|---|---|
| 4,577,760 A | * | 3/1986 | Rainin ................... | B01L 9/543 206/508 |
| 4,676,377 A | * | 6/1987 | Rainin ................... | B01L 3/021 206/468 |

(Continued)

FOREIGN PATENT DOCUMENTS

| | | |
|---|---|---|
| EP | 1 128 907 | 9/2001 |
| JP | 54-052433 | 4/1979 |

(Continued)

OTHER PUBLICATIONS

International Search Report and Written Opinion dated May 28, 2019 for International Application No. PCT/US2019/023221, filed on Mar. 20, 2019.

(Continued)

*Primary Examiner* — Luan K Bui
(74) *Attorney, Agent, or Firm* — Grant IP, Inc.

(57) ABSTRACT

Provided herein is a pipette tip tray that includes a base and a connected pipette tip receptacle plate, where the base includes a plurality of axially-disposed base ribs disposed on two or more internal wall surfaces, the pipette receptacle plate includes a plurality of plate ribs disposed on the distal surface of the plate, and a portion of at least a subset of the plate ribs is in contact with at least a portion of an end of at least a subset of the base ribs.

22 Claims, 30 Drawing Sheets

(51) Int. Cl.
   *B65D 43/16*      (2006.01)
   *G01N 35/10*      (2006.01)
(52) U.S. Cl.
   CPC ... *B01L 2300/0858* (2013.01); *B01L 2300/12* (2013.01); *B65D 43/164* (2013.01); *G01N 2035/103* (2013.01)

(56) References Cited

U.S. PATENT DOCUMENTS

| | | | |
|---|---|---|---|
| 5,366,088 A * | 11/1994 | Hill | B01L 9/543 |
| | | | 206/443 |
| 5,487,872 A * | 1/1996 | Hafeman | B01L 3/5085 |
| | | | 250/372 |
| 6,221,317 B1 | 4/2001 | Carl | |
| 6,286,678 B1 | 9/2001 | Petrek | |
| D464,734 S | 10/2002 | Berna | |
| D574,505 S | 8/2008 | Muller-Cohn | |
| D631,557 S | 1/2011 | Tajima | |
| D632,803 S | 2/2011 | Motadel | |
| 8,312,781 B2 | 11/2012 | Himmelsbach | |
| D699,370 S | 2/2014 | Motadel | |
| D699,859 S | 2/2014 | Motadel | |
| D724,236 S | 3/2015 | Motadel | |
| 9,156,598 B2 * | 10/2015 | Nicoletti | B65D 77/046 |
| 9,238,227 B2 | 1/2016 | Motadel | |
| D768,873 S | 10/2016 | Stedman | |
| 9,545,635 B2 | 1/2017 | Motadel et al. | |
| D808,540 S | 1/2018 | Johns | |
| D812,243 S | 3/2018 | Johns | |
| D826,426 S | 8/2018 | Muller | |
| D839,445 S | 1/2019 | Motadel et al. | |
| D840,053 S | 2/2019 | Kamees | |
| D844,806 S | 4/2019 | Johns | |
| 10,300,488 B2 | 5/2019 | Motadel | |
| D873,436 S | 1/2020 | O'Connell et al. | |
| D886,321 S | 6/2020 | Motadel et al. | |
| D888,280 S | 6/2020 | Motadel et al. | |
| 2005/0150808 A1 | 7/2005 | Sarna et al. | |
| 2006/0045815 A1 | 3/2006 | Hovatter | |
| 2010/0221151 A1 | 9/2010 | Motadel et al. | |
| 2010/0266457 A1 * | 10/2010 | Rethwisch | B01L 9/543 |
| | | | 422/511 |
| 2011/0236278 A1 | 9/2011 | Motadel et al. | |
| 2011/0306051 A1 | 12/2011 | Belz | |
| 2011/0306053 A1 | 12/2011 | Ochsenbein | |
| 2011/0306118 A1 | 12/2011 | Belz | |
| 2013/0108522 A1 * | 5/2013 | Cohen | B01L 9/543 |
| | | | 422/552 |
| 2014/0234182 A1 * | 8/2014 | Motadel | B01L 9/543 |
| | | | 422/526 |
| 2014/0308181 A1 | 10/2014 | Blumentritt | |
| 2016/0001292 A1 | 1/2016 | Motadel et al. | |
| 2016/0101422 A1 | 4/2016 | Bucher | |
| 2016/0167041 A1 | 6/2016 | Curry et al. | |
| 2017/0008001 A1 | 1/2017 | Motadel | |
| 2019/0009277 A1 | 1/2019 | Kofler | |

FOREIGN PATENT DOCUMENTS

| | | |
|---|---|---|
| JP | 61-074652 | 4/1986 |
| JP | 01-065647 | 4/1989 |
| JP | 3005123 | 12/1994 |
| JP | 2007-525647 | 9/2007 |
| JP | D1424642 S | 9/2011 |
| JP | 2011-227076 | 11/2011 |
| JP | 2014-081096 | 5/2014 |
| WO | WO 2004/098764 | 11/2004 |
| WO | WO 2008/107961 | 9/2008 |
| WO | WO 2010/008737 | 1/2010 |
| WO | WO 2010/054337 | 5/2010 |
| WO | WO 2016/094553 | 6/2016 |
| WO | WO 2019/190864 A1 | 10/2019 |

OTHER PUBLICATIONS

Office action dated Jul. 23, 2019 in U.S. Appl. No. 29/642,485, filed Mar. 29, 2018.
Pipette Tips. Online, published date unknown. Retrieved on Mar. 20, 2019 from URL: https://www.labproservices.com/2-200ul-micropette-universal-sterile-tips-clear-color-rack-10-x-96-960.html.
2-200ul MicroPette Universal Sterile Filtered Tips. Online, published date unknown. Retrieved on Mar. 20, 2019 from URL: https://www.labproservices.com/2-200ul-micropette-universal-sterile-tips-clear-color-rack-10-x-96-960.html.
"Office Action dated Feb. 26, 2020 in U.S. Appl. No. 29/642,485, filed Mar. 29, 2018", 7 pages.
Filtered Pipet Tips 1-100 ul Sterilized Microfilter Tip, retrieved on Sep. 8, 2020 via URL: https://crystalgen.com/filtered-pipet-tips-1-100-ul-sterilized-microfilter-tip.html, published date unknown, 1 page.
International Preliminary Report on Patentability dated Oct. 8, 2020 in International Patent Application No. PCT/US2019/023221, filed on Mar. 20, 2019, 7 pages.
Office Action dated Sep. 11, 2020 in U.S. Appl. No. 29/684,389, filed Mar. 20, 2019, 10 pages.
Racks for Tips for Pipette with Filter Element 5ml, retrieved on Sep. 8, 2020 from URL: http://www.toolots.com/80208085.html?cid=10196878749&gclid=EAIaIQobChMInq08xZna6wIVGUWGChOJRQxkEAQYOCA8EgIM6_D_BwE, published date unknown, 1 page.

* cited by examiner

RIGIDIFIED PIPETTE TIP TRAY

RELATED APPLICATION

This patent application claims the benefit of U.S. provisional application No. 62/650,154, filed on Mar. 29, 2018, entitled RIGIDIFIED PIPETTE TIP TRAY, naming Arta Motadel et al. as inventors. The entire content of the foregoing provisional patent application, including all text, tables and drawings, is hereby incorporated by reference for all purposes.

FIELD

The technology relates in part to a rigidified pipette tip tray that includes a base and a pipette tip receptacle plate. The technology also relates in part to a pipette tip tray that includes structural members in the base that minimize deflection of a pipette tip receptacle plate under load.

BACKGROUND

Pipette tips are utilized in a variety of industries that have a requirement for handling fluids, and are used in facilities including medical laboratories and research laboratories, for example. In many instances pipette tips are used in large numbers, and often are utilized for processing many samples and/or adding many reagents to samples, for example. Pipette tips can be utilized in conjunction with a variety of dispensing devices, including manual dispensers (e.g., pipetting device) and automated dispensers (e.g., automated liquid handling devices and systems, e.g., liquid dispensing robotic devices). A dispenser, when attached to a proximal (i.e., upper) end of a pipette tip, can apply negative pressure to acquire fluid in a pipette tip, and can apply positive pressure to dispense fluid from a pipette tip. A proximal end of a pipette tip often is attached to a distal (i.e., lower) portion of a dispenser, often referred to as a barrel or nozzle, when the distal portion of the dispenser is placed in contact with the proximal portion of a pipette tip and a downward compressive pressure is applied.

Pipette tips often are shipped, stored and presented to a user or dispenser in a pipette tip tray. A tray often includes a base and a pipette tip receptacle plate, and sometimes a lid. The receptacle plate generally includes bores through which pipette tips are disposed. Pipette tips disposed in a receptacle plate often include a collar, and the distal terminus of the collar often rests on a proximal surface of the plate. A lid sometimes is attached to a rack by a hinge, and often is configured for an operator to swing the lid open to access pipette tips in the tray for use.

SUMMARY

Provided herein is a pipette tip tray that includes a base and a connected pipette tip receptacle plate, where the base includes base support features disposed on two or more internal wall surfaces, the pipette receptacle plate includes plate support features disposed on the distal surface of the plate, and a portion of at least a subset of the plate support features is in contact with at least a portion of at least a subset of the base support features. In certain embodiments, the base support features are axially-oriented ribs disposed on two or more internal wall surfaces of the plate. In some embodiments, the plate support features are ribs disposed on the distal surface of the plate. Provided also in certain aspects is a pipette tip tray, including a lid in connection with a base described herein.

Base support features consist of ribs in certain embodiments, and the ribs disposed on surfaces within the interior of a base sometimes consist of base ribs disposed on the interior surface of two or more base sidewalls. Each base rib does not contact another base rib in certain embodiments. A base often has a hollow cavity with no internal support features that contact a plate member except for base ribs disposed on two or more internal base sidewalls. A base sometimes includes no ribs or other support features having a significant portion (e.g., major length portion) disposed on the interior surface of the base bottom. For example, a base sometimes includes no ribs or other support features disposed on the interior surface of the base bottom and that extend from one sidewall to an opposing sidewall (e.g., no rib grid structure disposed on the interior surface of the base bottom).

Also provided in certain aspects is a pipette tip receptacle plate that includes a proximal surface, a distal surface, an array of bores traversing the plate from the proximal surface to the distal surface, and a plurality of plate ribs disposed on the distal surface of the plate, where: each of the plate ribs includes a distal edge and two opposing side edges; the plate includes two opposing shorter sides and two opposing longer sides; the plate includes longitudinal plate ribs each having a major length disposed in a direction from one of the shorter sides to the opposing shorter side; the plate includes latitudinal plate ribs each having a major length disposed in a direction from one of the longer sides to the opposing longer side; and each of the longitudinal plate ribs, of at least a portion of the longitudinal plate ribs, intersects the set of latitudinal plate ribs at a plurality of plate rib junctions, or each of the latitudinal plate ribs, for at least a portion of the latitudinal plate ribs, intersects the set of longitudinal plate ribs at a plurality of plate rib junctions. Provided also herein is an assembly including a plurality of pipette tip receptacle plates described herein.

Also provided herein is a method for manufacturing one or more pipette tip tray components described herein, and methods for using a pipette tip tray or pipette tip receptacle plate described herein.

Certain embodiments are described further in the following description, examples, claim(s) and drawings.

BRIEF DESCRIPTION OF THE DRAWINGS

The drawings illustrate certain embodiments of the technology and are not limiting. For clarity and ease of illustration, the drawings are not necessarily made to scale and, in some instances, various aspects may be shown exaggerated or enlarged to facilitate an understanding of particular embodiments.

FIG. 1 shows a front, top perspective view of the assembly.

FIG. 2 shows a rear, top perspective view of the assembly.

FIG. 3 shows a front, bottom perspective view of the assembly.

FIG. 4 shows a rear, bottom perspective view of the assembly.

FIG. 5 shows a side view of assembly 100,

FIG. 6 shows a front view thereof,

FIG. 7 shows a rear view thereof,

FIG. 8 shows a top view thereof, and

FIG. 9 shows a bottom view thereof.

FIG. 19 shows a front, top perspective view of plate 400;
FIG. 20 shows a front, bottom perspective view thereof;
FIG. 21 shows a top view thereof;
FIG. 22 shows a bottom view thereof;
FIG. 23 shows a front view thereof; and
FIG. 24 shows a side view thereof.

FIG. 25 is an enlarged view of the region delineated by the broken circle shown in FIG. 20, and FIG. 26 is an enlarged view of the region delineated by the broken circle shown in FIG. 22.

FIG. 27 is a view of pipette tip receptacle plate embodiment 400 shown in claim 20, with one longitudinal rib highlighted with an imaginary first hatching and one latitudinal rib highlighted with an imaginary second hatching, wherein the second hatching is in a direction opposite to the first hatching.

FIG. 30 is a top, front perspective view of pipette tip tray assembly embodiment 600 that includes a lid in a closed orientation, and FIG. 31 is a bottom, front perspective view thereof.

FIG. 32 shows a front, top perspective view of assembly embodiment 605, which includes the same components as pipette tip tray assembly embodiment 600 with the lid in an open orientation.

FIG. 33 is a top, front perspective view of pipette tip tray assembly embodiment 700 that includes a lid in a closed orientation, and FIG. 34 is a bottom, front perspective view thereof.

FIG. 35 shows a front, top perspective view of assembly embodiment 705, which includes the same components as pipette tip tray assembly embodiment 700 with the lid in an open orientation.

Figure 1:
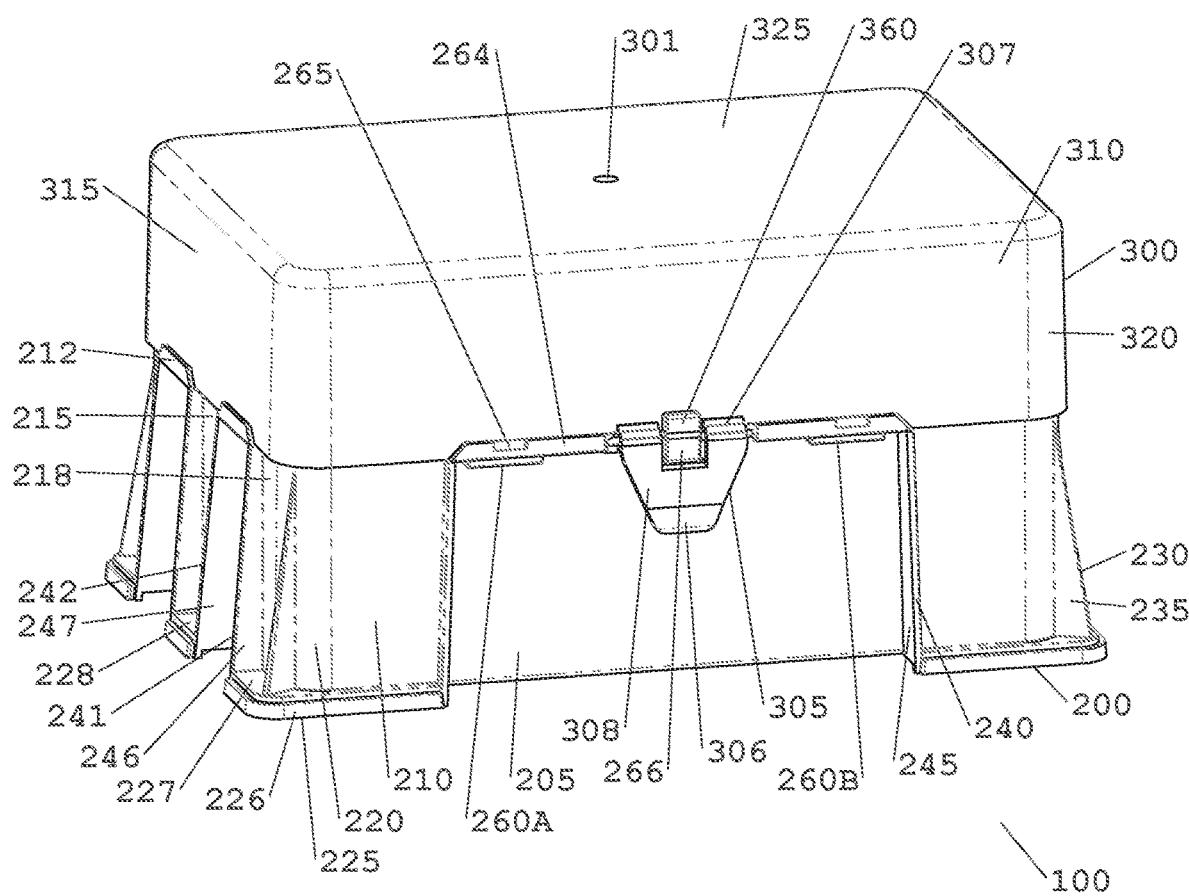
FIG. 1 to FIG. 9 illustrate pipette tip tray assembly embodiment 100 that includes a lid in a closed orientation.
Figure 2:
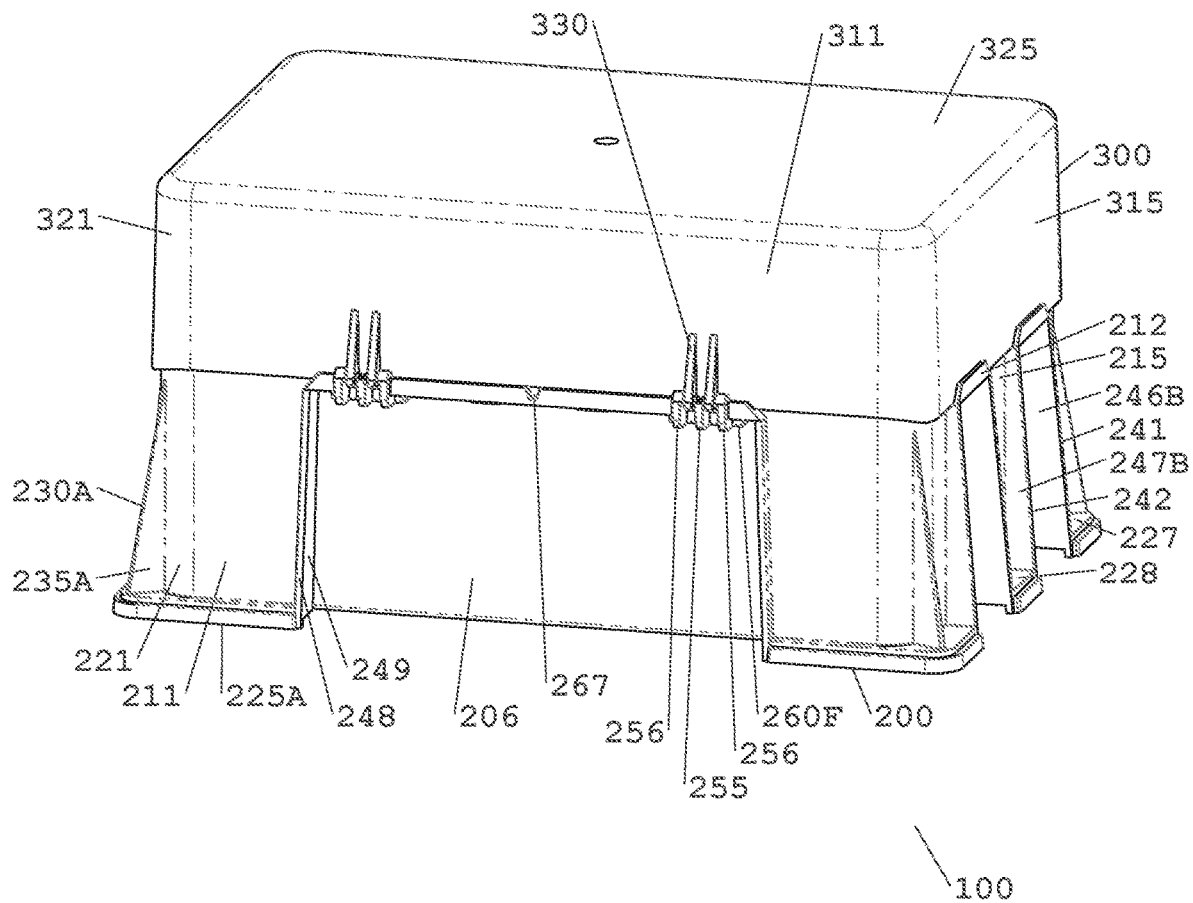
Figure 3:
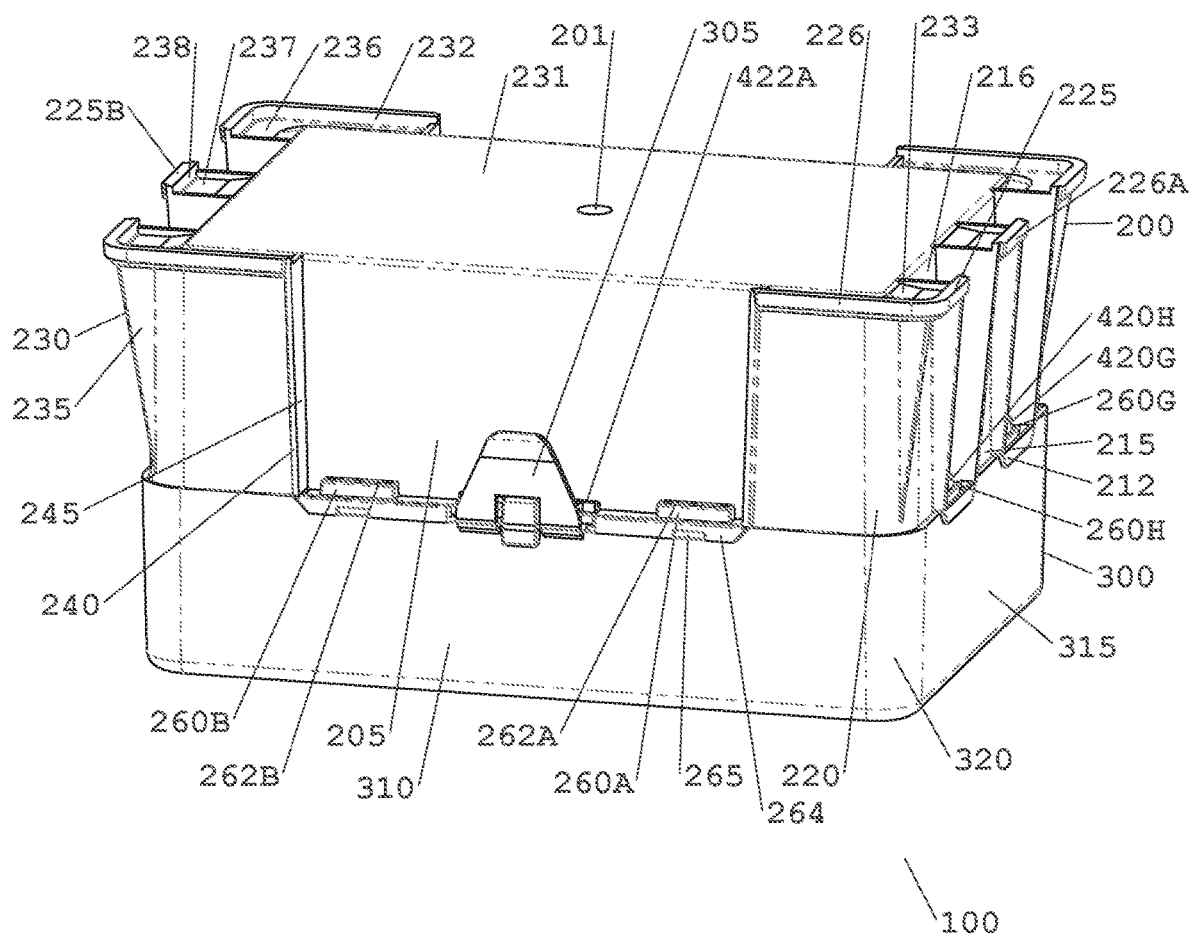
Figure 4:
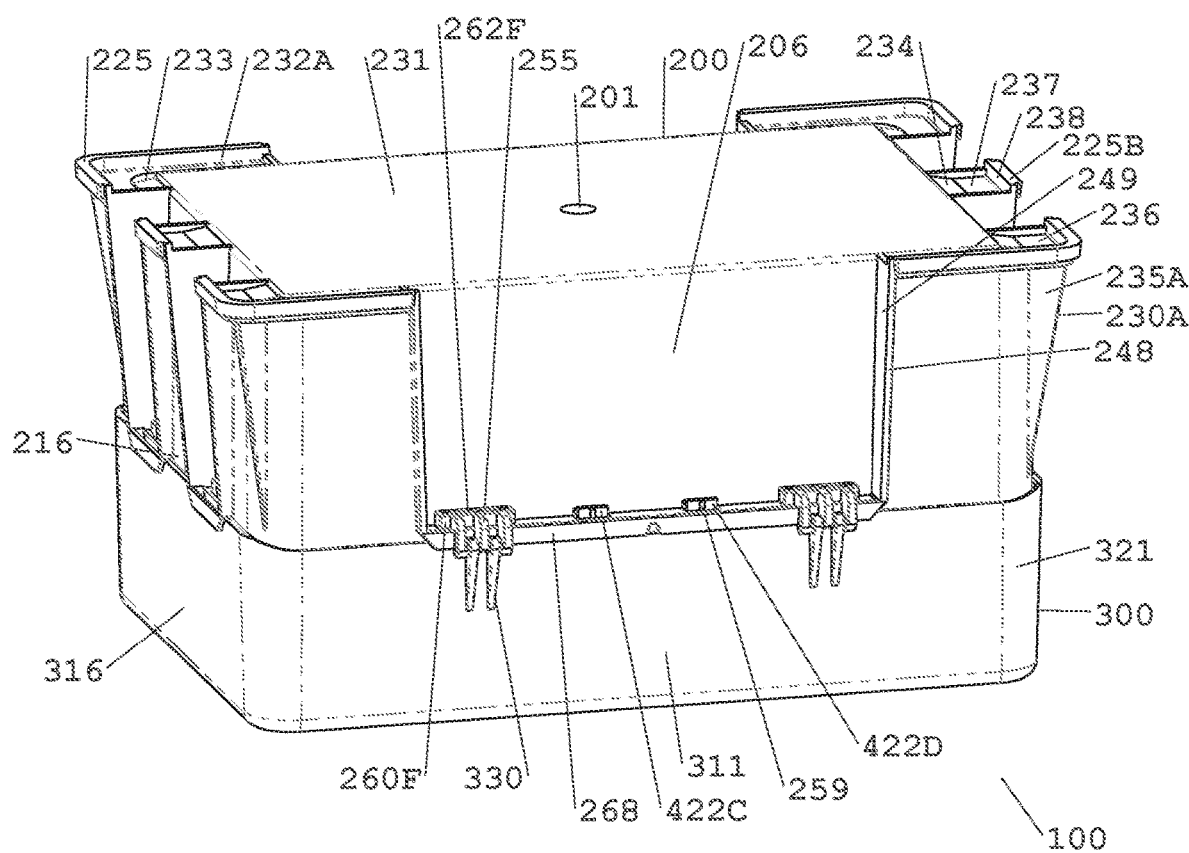
Figure 5:
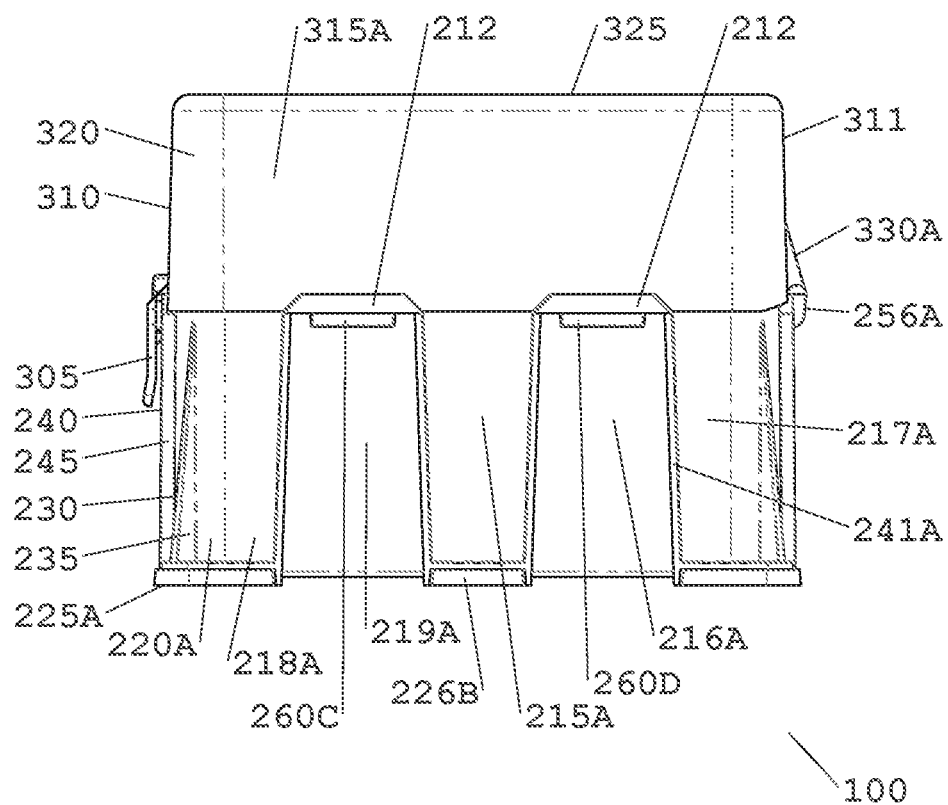
Figure 6:
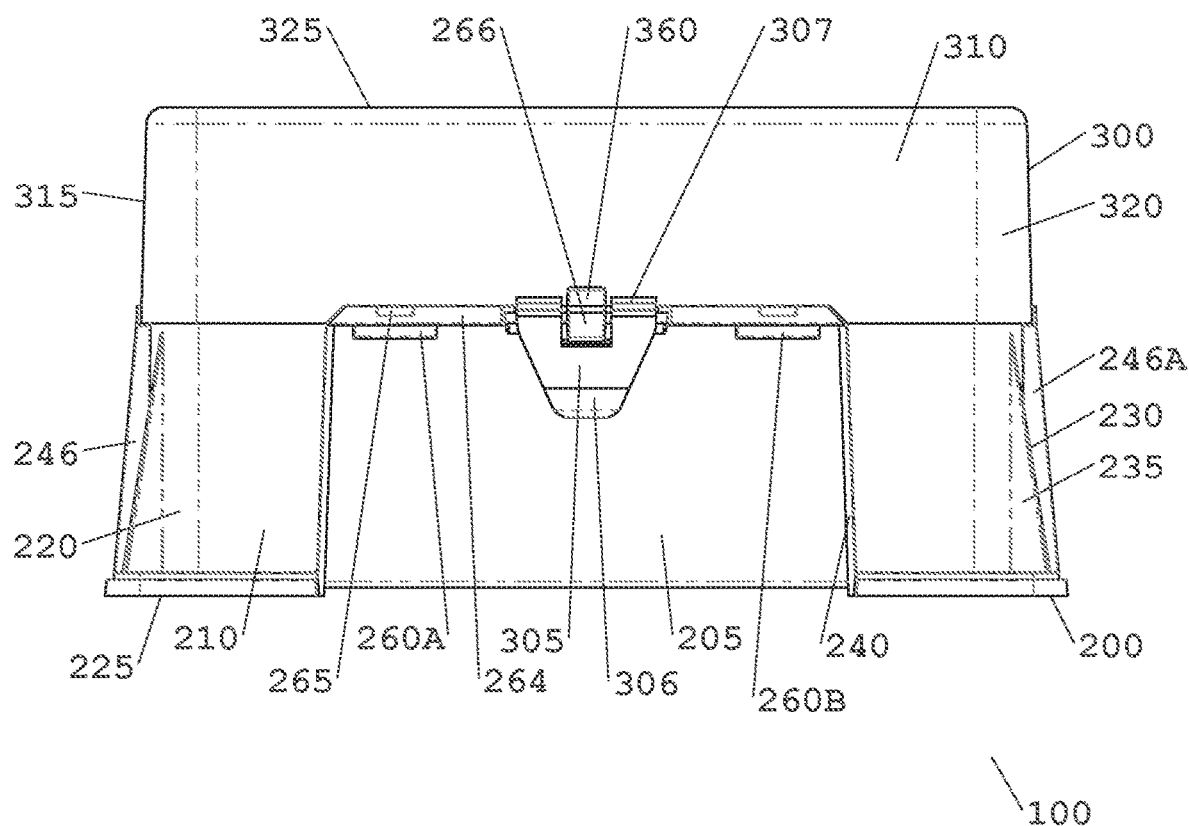
Figure 7:
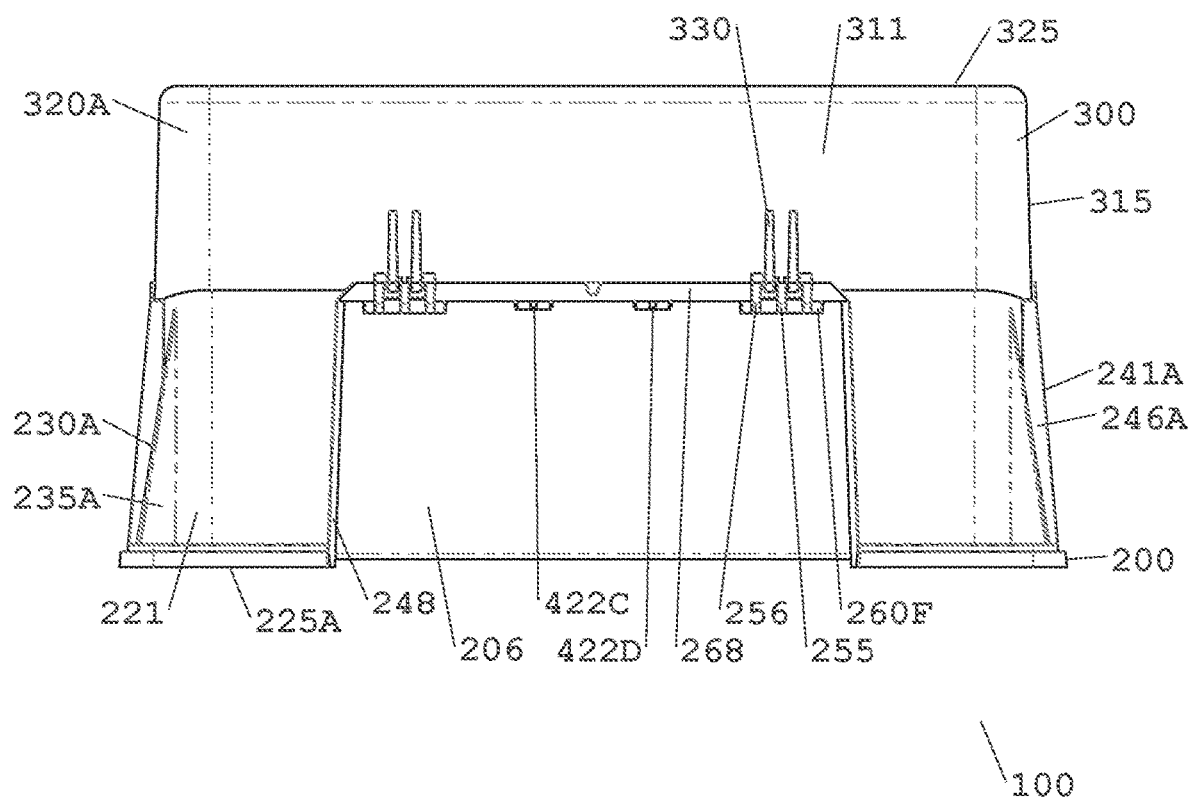
Figure 8:
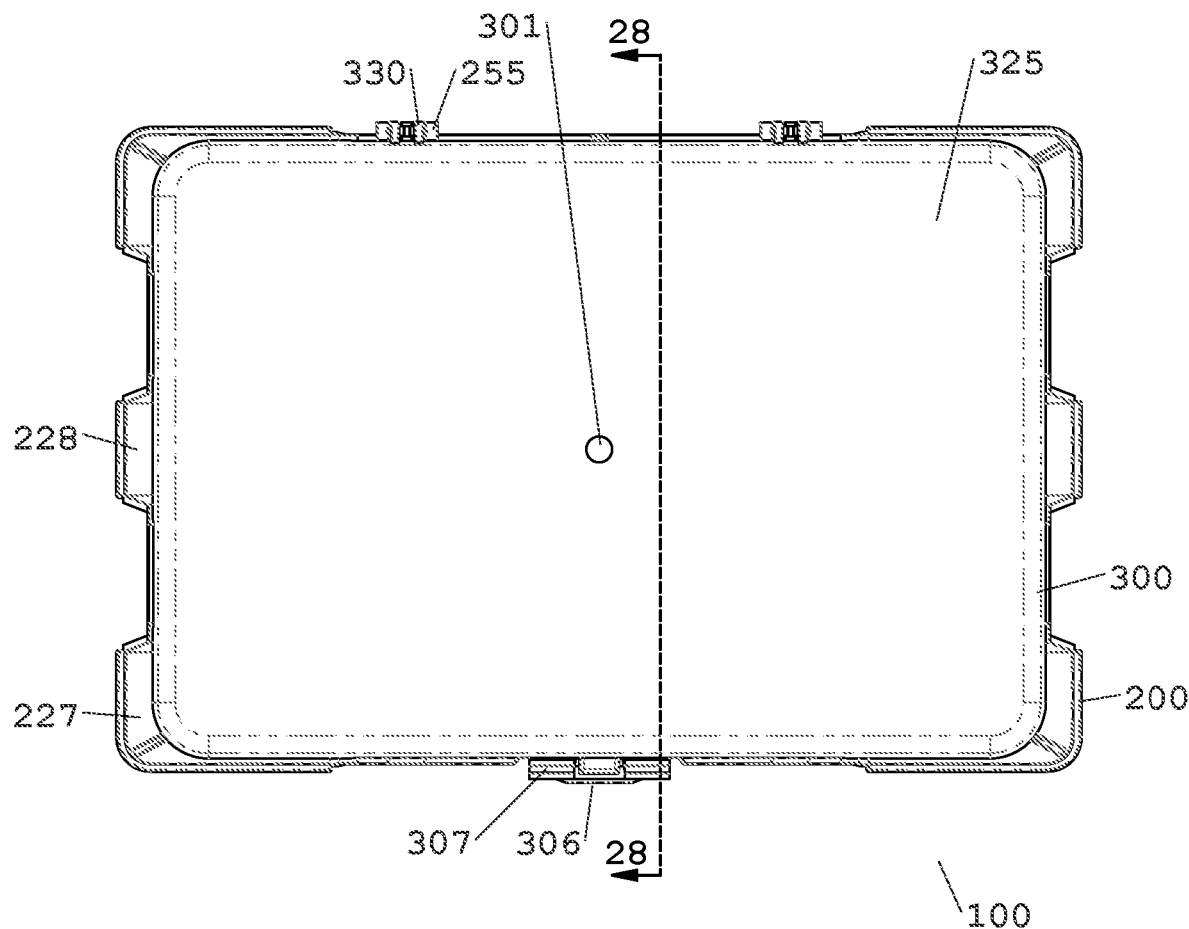
Figure 9:
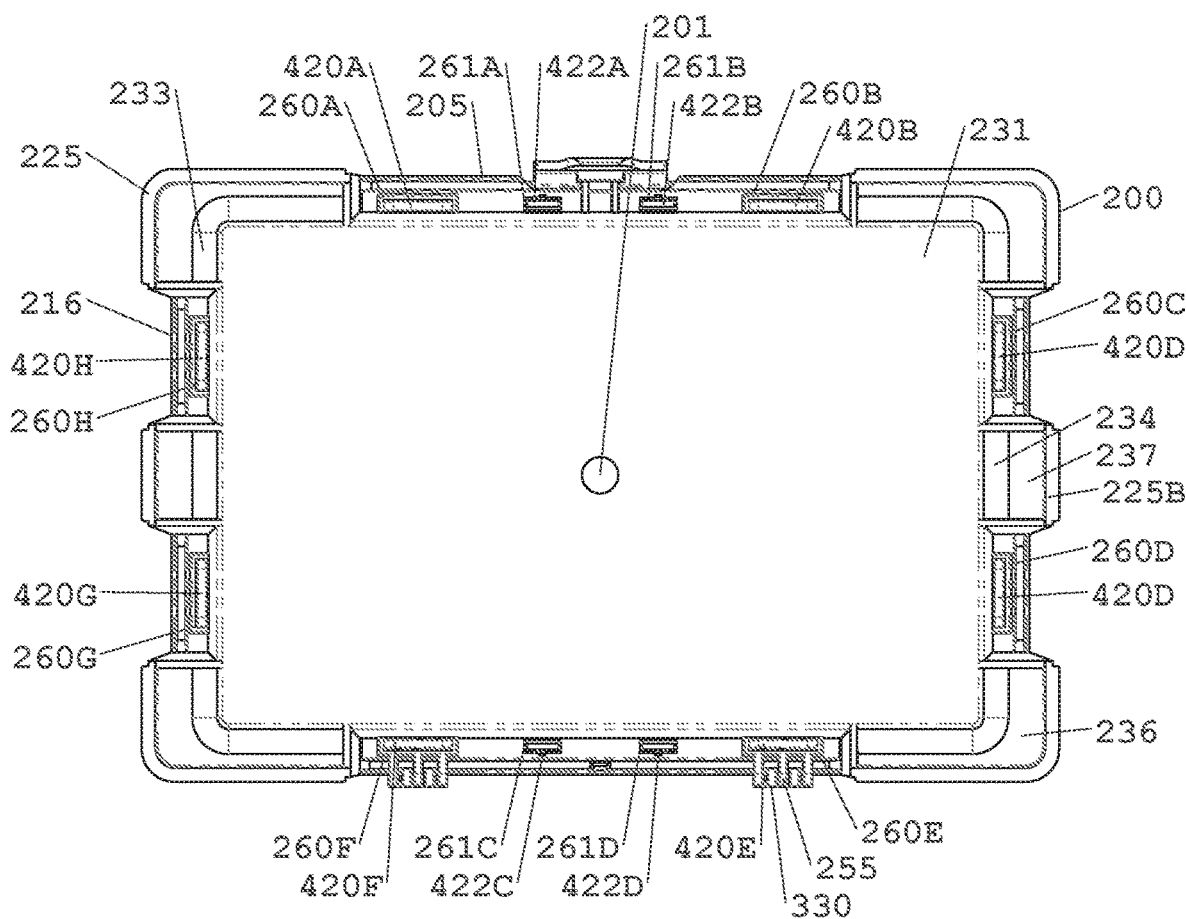
Figure 10:
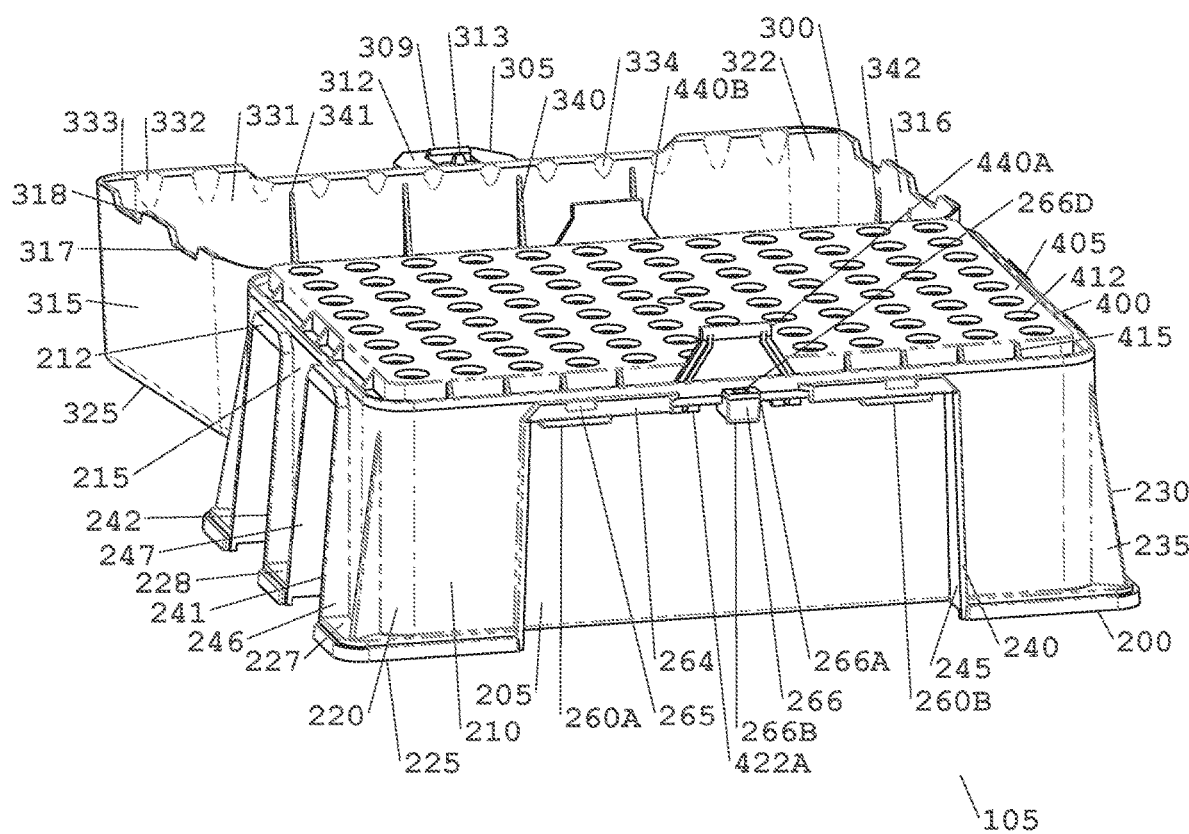
FIG. 10 shows a front, top perspective view of assembly embodiment 105, which includes the same components as pipette tip tray assembly embodiment 100 with the lid in an open orientation (with or without an array of pipette tips disposed in the bores of the pipette tip receptacle plate).
Figure 11:
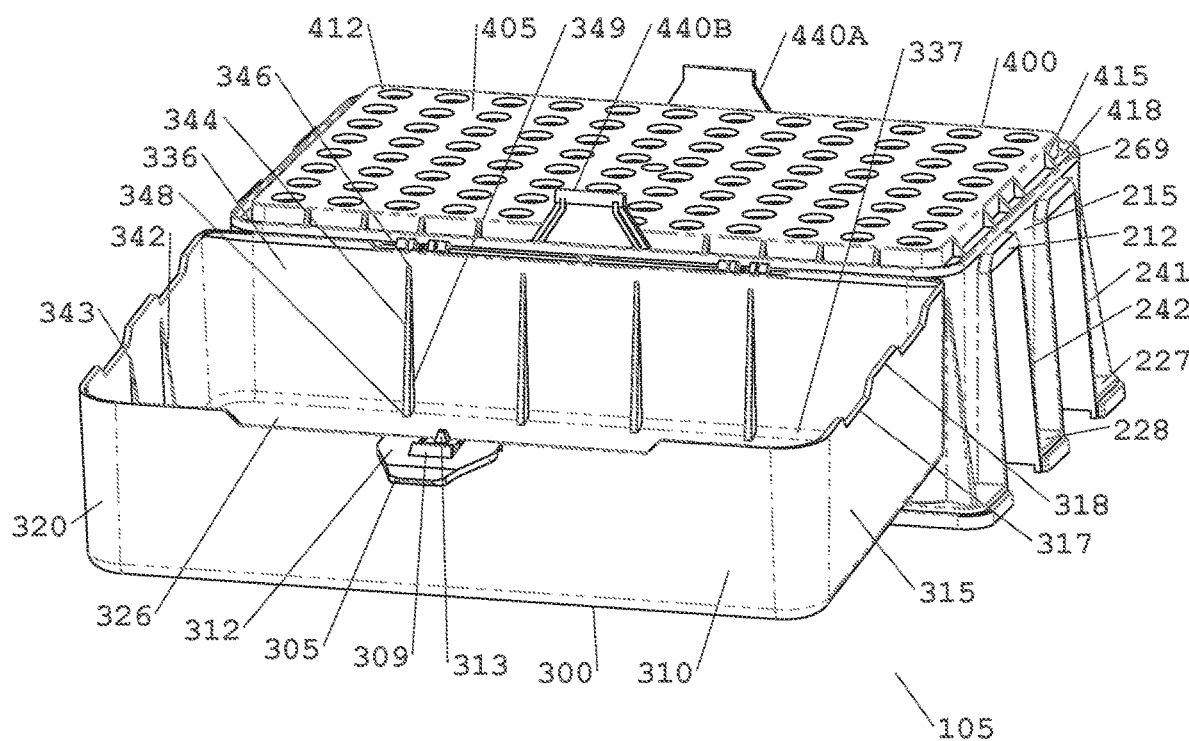
FIG. 11 shows a rear, top perspective view of assembly embodiment 105.
Figure 12:
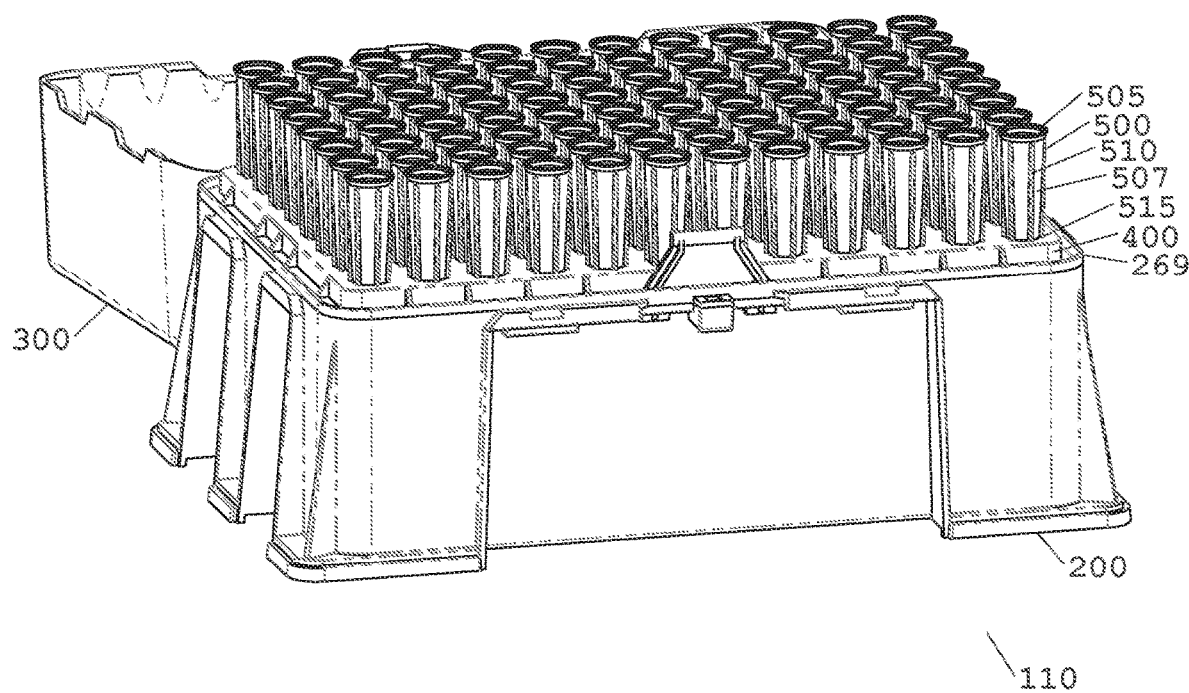
FIG. 12 shows a front, top perspective view of assembly embodiment 110, which includes the same components as pipette tip tray assembly embodiment 105 and includes an array of pipette tips.
Figure 13:
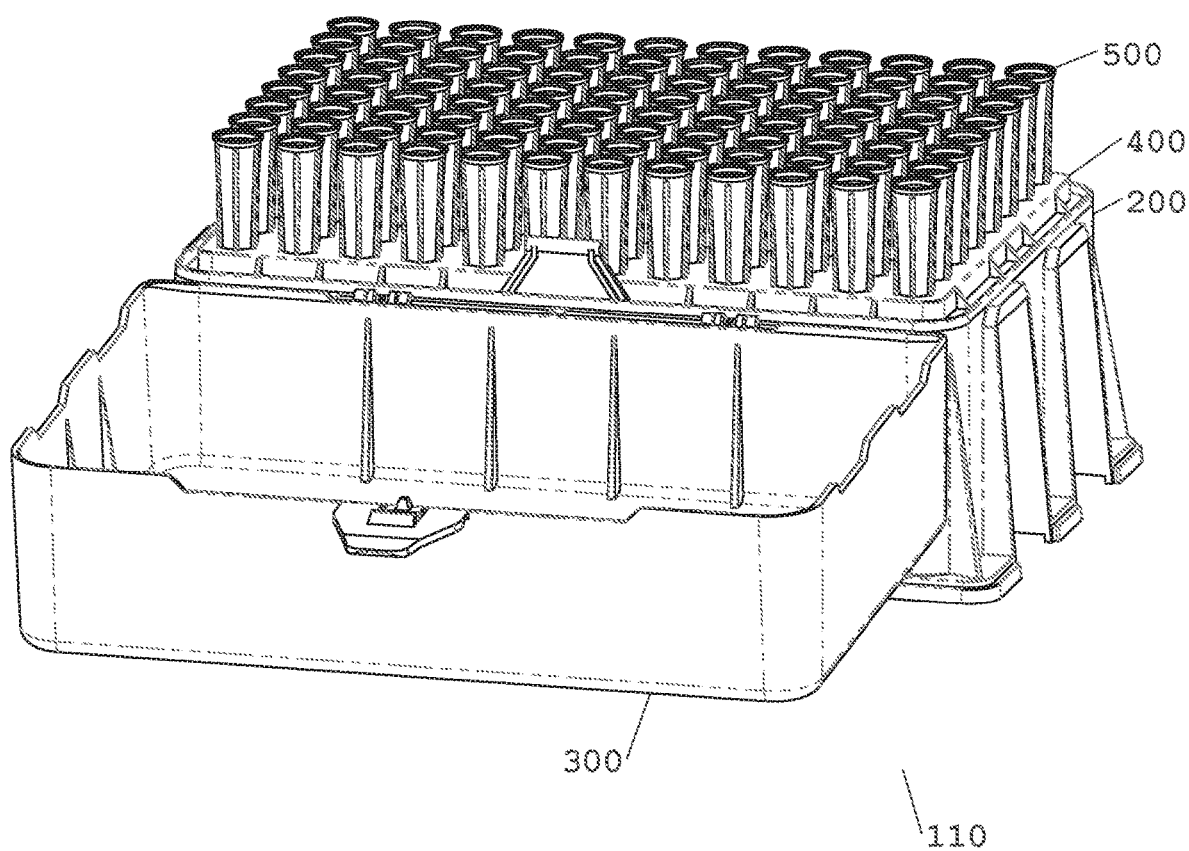
FIG. 13 shows a rear, top perspective view of assembly embodiment 110.
Figure 14:
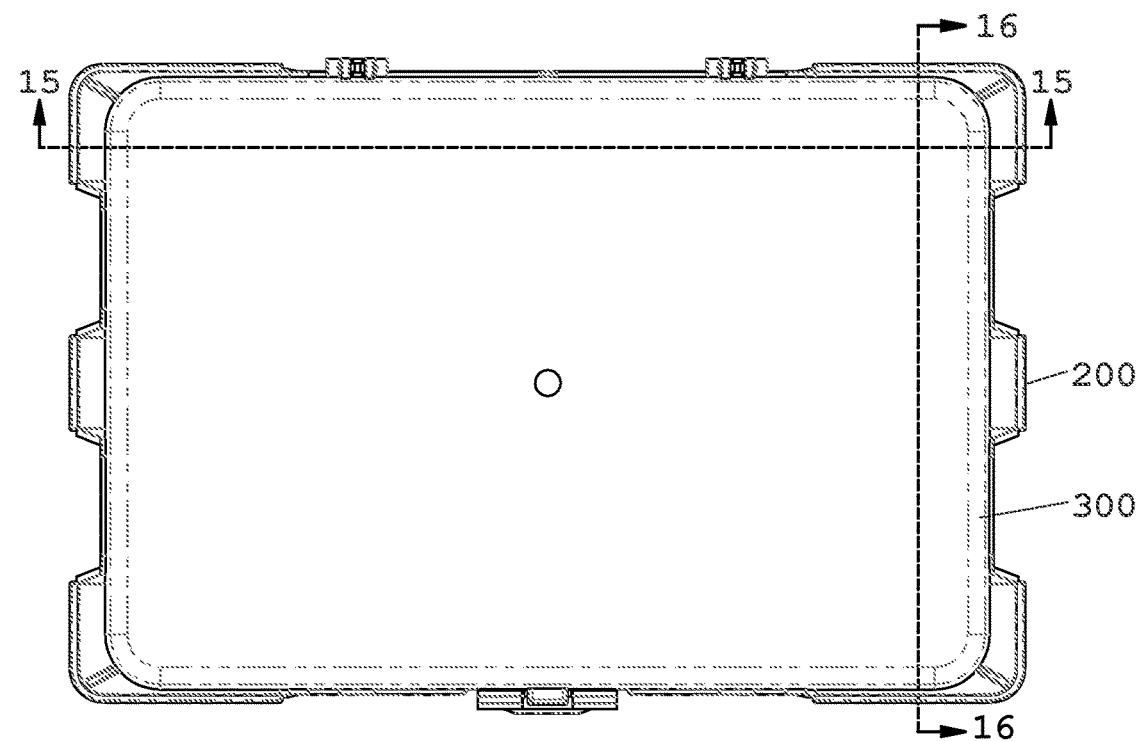
FIG. 14 shows a top view of pipette tip tray assembly embodiment 100 with cutting planes 15-15 and 16-16.

Certain features in the drawings are summarized in Table 1.

TABLE 1

| Callout | Element |
|---|---|
| 100 | pipette tip tray assembly embodiment with lid in closed orientation |
| 105 | pipette tip tray assembly embodiment with lid in open orientation |
| 110 | pipette tip tray assembly embodiment with lid in open orientation and with an array of pipette tips |
| 105 | exploded view of pipette tip tray assembly embodiment having no array of pipette tips |
| 150 | junction between base rib proximal edge and longitudinal plate rib distal edge |
| 155 | junction between base rib proximal edge and latitudinal plate rib distal edge |
| 160 | junction between lid rib distal edge and plate proximal surface (lid rib disposed on shorter side of lid) |
| 165 | junction between lid rib distal edge and plate proximal surface (lid rib disposed on longer side of lid) |
| 200 | pipette tip tray rack base embodiment |
| 201 | optional injection gate dimple |
| 205 | central front wall exterior surface |
| 206 | central rear wall exterior surface |
| 210 | peripheral front wall exterior surface |
| 211 | peripheral rear wall exterior surface |
| 212 | buttress arch |
| 215, 215A | central sidewall exterior surface |
| 216, 216A | rearward offset sidewall exterior surface |
| 217, 217A | rearward peripheral sidewall exterior surface |
| 218, 218A | forward peripheral sidewall exterior surface |
| 219, 219A | forward offset sidewall exterior surface |
| 220, 220A | transition wall exterior surface - transition between peripheral front wall and peripheral sidewall |
| 221 | transition wall exterior surface - transition between peripheral rear wall and peripheral sidewall |
| 225, 225A, 225B | footing distal surface |
| 226, 226A, 226B | footing exterior edge |
| 227 | peripheral footing proximal surface adjacent to peripheral sidewall |
| 228 | central footing proximal surface adjacent to central sidewall |
| 230, 230A | exterior corner rib edge |
| 231 | rack base distal exterior surface |
| 232, 232A | peripheral footing distal surface sidewall |
| 233 | peripheral footing distal surface to rack base distal exterior surface transition |
| 234 | central footing distal surface to rack base distal exterior surface transition |
| 235, 235A | exterior corner rib face |
| 236 | peripheral footing distal surface |
| 237 | central footing distal surface |
| 238 | footing interior edge |
| 240 | front buttress edge |
| 241, 241A | peripheral sidewall buttress edge |
| 242 | central sidewall buttress edge |
| 245, 245A | front buttress face |
| 246, 246A, 246B | peripheral sidewall buttress face |
| 247, 247A, 247B | central sidewall buttress face |
| 248 | rear buttress edge |
| 249 | rear buttress face |
| 254 | lid hinge projection |

TABLE 1-continued

| Callout | Element |
|---|---|
| 255 | central lid hinge connector |
| 256, 256A | peripheral lid hinge connector |
| 257, 257A, 257B, 257E, 257F | pipette tip receptacle plate projection alignment member proximal orifice disposed on long side of base |
| 258, 258C, 258D, 258G, 258H | pipette tip receptacle plate projection alignment member proximal orifice disposed on short side of base |
| 259, 259A, 259B, 259C, 259D | pipette tip receptacle plate tab projection connector proximal orifice |
| 260, 260A, 260B, 260C, 260D, 260E, 260F, 260G, 260H | pipette tip receptacle plate alignment member |
| 261, 261A, 261B, 261C, 261D | pipette tip receptacle plate tab projection connector distal orifice |
| 262, 262A, 262B, 262C, 262D, 262E, 262F, 262G, 262H | pipette tip receptacle plate projection alignment member distal orifice |
| 263 | front exterior projection ledge |
| 264 | front exterior projection |
| 265 | front exterior hollow |
| 266 | front exterior latch connector |
| 266A | latch connector proximal surface |
| 266B | latch connector distal surface |
| 266C | latch connector protrusion |
| 266D | latch connector orifice |
| 267 | rear exterior hollow |
| 268 | rear exterior projection |
| 269 | base wall proximal terminus; base proximal rim |
| 270, 270A | base long side interior axially-disposed rib |
| 271, 271A | base rib proximal terminus edge |
| 272 | base long side interior boss |
| 273 | boss hollow |
| 274 | base long side interior boss side surface |
| 275 | base long side interior boss surface |
| 276 | base long side interior boss proximal surface |
| 277 | base long side boss projection |
| 278 | pipette tip receptacle plate projection connector - interior sidewall |
| 280, 280A | base short side interior axially-disposed rib |
| 281, 281A | rib proximal terminus edge |
| 282 | base short side interior boss |
| 284 | base short side interior boss side surface |
| 286 | base short side interior boss proximal surface |
| 288 | pipette tip receptacle plate projection connector - interior sidewall |
| 290 | interior base rib not in contact with plate rib |
| 291 | interior wall transition surface |
| 292 | interior wall transition surface |
| 294 | bevel |
| 296 | depression bottom |
| 300 | pipette tip tray lid embodiment |
| 301 | optional injection gate dimple |
| 305 | latch |
| 306 | latch distal region exterior surface |
| 307 | latch proximal region exterior surface |
| 308 | latch central region exterior surface |
| 309 | latch distal projection |
| 310 | lid front wall exterior surface |
| 311 | lid rear wall exterior surface |
| 312 | latch central region interior surface |
| 313 | latch proximal projection |
| 314 | latch distal projection protrusion |
| 315 | lid sidewall exterior surface |
| 316 | lid sidewall interior surface |
| 317 | lid opening cutout edge |
| 318 | lid opening edge adjacent to cutout edge |
| 320, 320A | lid front-to-side transition exterior surface |
| 321 | lid rear-to-side transition exterior surface |
| 322 | lid front-to-side transition interior surface |
| 325 | lid top exterior surface |
| 326 | lid top interior surface |
| 329 | lid rear hinge connector bore |
| 330, 330A | lid rear hinge connector |
| 331 | lid front wall interior surface |
| 332 | lid interior peripheral hollows |
| 333 | lid opening perimeter edge |
| 334 | lid interior central hollows |
| 336 | lid rear wall interior surface |
| 337 | lid rear wall interior surface to proximal interior surface transition |
| 340 | lid front wall interior axially-disposed ribs |
| 341 | lid front wall interior rib distal terminus |
| 342, 342A | lid sidewall interior axially-disposed ribs |
| 343 | lid sidewall interior rib distal terminus |
| 344, 344A | lid rear wall interior axially-disposed ribs |
| 346 | lid rear wall interior rib distal terminus |
| 348 | lid rear wall interior rib proximal surface terminus |
| 349 | lid rear wall interior rib side surface |
| 360 | lid-to-latch connector |
| 400 | pipette tip receptacle plate embodiment |
| 401 | optional injection gate dimple |
| 405 | plate proximal surface |
| 407 | sidewall exterior surface |
| 409 | plate distal surface |
| 410 | bore |
| 412 | bore sidewall edge |
| 415 | plate exterior rib |
| 416 | flange |
| 417 | flange edge |
| 417A | flange sidewall surface |
| 418 | flange proximal surface |
| 419 | flange distal surface |
| 420A, 420B, 420C, 420D, 420E, 420F, 420G, 420H | pipette tip receptacle plate projection |
| 422A, 422B, 422C, 422D | pipette tip receptacle plate tab projection |
| 423A, 423B, 423C, 423D | pipette tip receptacle plate tab projection distension |
| 430, 430A, 430B | plate latitudinal rib |
| 432, 432A, 432B, 432C | plate latitudinal rib side edge |
| 433, 433A, 433B | plate latitudinal rib distal edge |
| 434, 434A, 434B | plate longitudinal rib |
| 435 | junction between latitudinal rib and longitudinal rib |
| 436, 436A, 436B, 436C | plate longitudinal rib side edge |
| 437, 437A, 437B | plate longitudinal rib distal edge |
| 438 | reinforced junction between latitudinal rib and longitudinal rib - terminus |
| 439 | reinforced junction between latitudinal rib and longitudinal rib - side |
| 440A, 440B | pipette tip receptacle plate tab |
| 442A, 442B | pipette tip receptacle plate tab proximal region |
| 444A, 444B | pipette tip receptacle plate tab body - exterior surface |
| 445A, 445B | pipette tip receptacle plate tab body - interior surface |
| 446A, 446B | pipette tip receptacle plate tab sloped edge |
| 448A, 448B | pipette tip receptacle plate tab reinforcement |
| 449A, 449B | pipette tip receptacle plate flange to tab spacer |
| $h_1, h_2$ | rib height dimension |
| $w_1, w_2$ | rib width dimension |
| $t_l$ | lid rib thickness |
| $t_p$ | plate rib thickness |
| $t_b$ | base rib thickness |
| 500 | pipette tip |
| 505 | pipette tip proximal terminus flange |
| 507 | pipette tip proximal region |
| 510 | pipette tip axially-disposed rib |
| 515 | pipette tip rib distal terminus |
| 600 | pipette tip tray assembly embodiment with lid in closed orientation |
| 605 | pipette tip tray assembly embodiment with same |

TABLE 1-continued

| Callout | Element |
|---|---|
| | components as embodiment 600, with lid in open orientation and with an array of pipette tips |
| 610 | pipette tip tray rack base embodiment |
| 615 | front wall exterior surface |
| 620 | buttress arch |
| 625 | sidewall exterior surface |
| 630 | transition wall exterior surface |
| 635 | front buttress face |
| 640 | side buttress face |
| 645 | rack base distal exterior surface |
| 650 | footing distal surface |
| 655 | footing exterior edge |
| 660 | pipette tip tray lid embodiment |
| 665 | latch |
| 670 | pipette tip receptacle plate embodiment |
| 675 | pipette tip receptacle plate tab body |
| 690 | pipette tip embodiment |
| 700 | pipette tip tray assembly embodiment with lid in closed orientation |
| 705 | pipette tip tray assembly embodiment with same components as embodiment 600, with lid in open orientation and with an array of pipette tips |
| 710 | pipette tip tray rack base embodiment |
| 715 | front wall exterior surface |
| 720 | buttress arch |
| 725 | sidewall exterior surface |
| 730 | transition wall exterior surface |
| 735 | front buttress face |
| 740 | side buttress face |
| 745 | rack base distal exterior surface |
| 750 | footing distal surface |
| 755 | footing exterior edge |
| 760 | pipette tip tray lid embodiment |
| 765 | latch |
| 770 | pipette tip receptacle plate embodiment |
| 775 | pipette tip receptacle plate tab body |
| 790 | pipette tip embodiment |

DETAILED DESCRIPTION

Provided herein is a pipette tip tray that includes a base and a connected pipette tip receptacle plate, where the base includes base support features disposed on two or more internal wall surfaces, the pipette receptacle plate includes plate support features disposed on the distal surface of the plate, and a portion of at least a subset of the plate support features is in contact with at least a portion of at least a subset of the base support features. In certain embodiments, the base support features are axially-oriented ribs disposed on two or more internal wall surfaces of the plate. In some embodiments, the plate support features are ribs disposed on the distal surface of the plate. Without being limited by theory, interaction of the base support features with the plate support features rigidifies the plate. A plate configured for this interaction is subject to less deflection under load than a plate not configured for the interaction. Rigidifying the plate and reducing plate deflection under load can provide advantages of (i) enhancing uniformity of nozzle/barrel insertion depth in pipette tips and thereby improving sealing engagement of multiple pipette tips on a fluid dispenser, and (ii) enhancing uniformity of insertion depth of filters loaded into multiple pipette tips in a filter loading process and thereby improving product consistency for batches of filtered pipette tips, for example.

Base Internal Support Features

A base may include any suitable support features disposed on two or more interior walls of the base that can interact with support features disposed on the distal surface of a pipette tip receptacle plate. Base support features may be disposed on a proximal edge of the base or on an exterior wall surface, and often are disposed on an interior surface of two or more base walls.

A base often has a hollow cavity with no internal support features that contact a plate member except for base ribs disposed on two or more internal base sidewalls. Base support features include or consist of ribs in certain embodiments. In some embodiments, ribs disposed in the base interior consist of ribs disposed on the interior surface of two or more base sidewalls. In certain embodiments, each base rib does not contact another base rib. A base sometimes includes no ribs or other support features having a significant portion (e.g., major length portion) disposed on the interior surface of the base bottom. For example, a base sometimes includes no ribs or other support features disposed on the interior surface of the base bottom, and in certain embodiments, a base includes no ribs or other support ribs on the interior surface of the base bottom that extend from one sidewall to an opposing sidewall (e.g., no rib grid structure disposed on the interior surface of the base bottom).

Base ribs generally include a joined length disposed on an interior wall (i.e., axially disposed length of a rib molded with a base sidewall), a non-joined length opposite the joined length, a proximal terminus and a distal terminus. The non-joined length of a rib often is disposed relatively close to the base wall on which the joined length of the rib is disposed, and each rib in the base generally does not extend from one wall to an opposing wall, and each rib often does not contact another rib in the base. The joined length and non-joined length typically are longer than the length of each of the proximal terminus and distal terminus, and the proximal terminus and distal terminus each generally are disposed at the ends of the joined length and non-joined length. The joined length, non-joined length, proximal terminus and distal terminus of a rib together form a base rib face profile. A base rib face profile can be any suitable rib profile, including without limitation, a profile that is triangular, quadrilateral, square, rectangular, trapezoid, rhomboid, parallelogram or polygon.

A base rib profile formed sometimes includes flat sides and/or termini, sometimes includes curved sides and/or termini, sometimes includes a rounded, beveled or cut edge (e.g., rounded, beveled or cut transition with another surface), and combinations thereof. The joined length sometimes is a major length of a rib, sometimes the non-joined length is the major length of the rib, and sometimes the joined length and the non-joined length are equal and each is the major length of the rib.

In some embodiments, the distal terminus of one or more or all of the base ribs is disposed on (e.g., joined to, molded on) the interior surface of the base bottom. A base sometimes includes a transition surface between the base bottom interior surface and an interior sidewall surface (e.g., the interior sidewall surface of each wall). A transition surface sometimes has a beveled, cut or curved profile, the distal terminus of one or more of all of the base ribs sometimes is disposed on the transition surface, and the profile of the proximal terminus of the one or more or all of the base ribs sometimes follows the profile of the transition surface. The joined length of each of the base ribs disposed on a wall often is less than the length between the interior surface of the base bottom and the proximal terminus of the base wall, which can provide clearance for plate ribs and the plate.

For a rectangular base rib profile, (i) the joined length and non-joined length are parallel, are equal in length, and often are the major length of the rib, and (ii) the proximal terminus and distal terminus are perpendicular to the joined length and the non-joined length, are parallel to one another, are of the same length as one another, and typically are shorter in length than the joined length and the non-joined length. For a triangular base rib profile, (i) the joined length and non-joined length are angled with respect to one another (e.g., angle of about 5 degrees to about 60 degrees, e.g., an angle of about 5, 10, 15, 20 25, 30, 35, 40, 45, 50, 55, 60 degrees), and are not equal in length, with the non-joined length often being the major length of the rib, and (ii) one of the proximal terminus and distal terminus often is perpendicular or substantially perpendicular to the joined length and often has a length shorter than the joined length and non-joined length, and the other of the proximal terminus and distal terminus often is a point. For certain quadrilateral base rib profiles, (i) the joined length and non-joined length sometimes are angled with respect to one another (e.g., angle of about 5 degrees to about 60 degrees, e.g., an angle of about 5, 10, 15, 20 25, 30, 35, 40, 45, 50, 55, 60 degrees), and are not equal in length, with the non-joined length often being the major length of the rib, and (ii) one of the proximal terminus and distal terminus often is perpendicular or substantially perpendicular to the joined length and often has a length shorter than the joined length and non-joined length, and the other of the proximal terminus and distal terminus often is a shorter than the other. For some quadrilateral base rib profiles, (i) the joined length and non-joined length sometimes are parallel or substantially parallel to one another, and are equal or substantially equal in length, with the non-joined length and joined length typically being the major length or lengths of the rib, and (ii) the distal terminus often is perpendicular or substantially perpendicular to the joined length, and generally is of a length shorter than the joined length and non-joined length, and (iii) the proximal terminus often is angled with respect to the joined length (e.g., angle of about 5 degrees to about 60 degrees, e.g., an angle of about 5, 10, 15, 20 25, 30, 35, 40, 45, 50, 55, 60 degrees) and sometimes is longer than the distal terminus length.

As used herein, "substantially perpendicular" is an angle that deviates from 90 degrees by about 0.1 degrees to about 10 degrees (e.g., deviates by about 0.1, 0.2, 0.4, 0.5, 0.6, 0.8, 1, 2, 3, 4, 5, 6, 7, 8, 9 or 10 degrees), "substantially parallel" is an angle that deviates from parallel by about 0.1 degrees to about 10 degrees (e.g., deviates by about 0.1, 0.2, 0.4, 0.5, 0.6, 0.8, 1, 2, 3, 4, 5, 6, 7, 8, 9 or 10 degrees), and "substantially equal" is an amount that deviates from another amount by about 0.01 percent to about 5 percent (e.g., deviates by about 0.01, 0.02, 0.04, 0.05, 0.06, 0.08, 0.1, 0.2, 0.4, 0.5, 0.6, 0.8, 1, 2, 3, 4, 5, 6, 7, 8, 9 or 10 percent).

The joined length of one or more or all of the base ribs often is disposed in a direction from the base bottom to the proximal terminus of the wall on which the ribs are disposed, and thereby is "axially disposed" on the interior base wall. The joined length of one or more or all of the base ribs sometimes is disposed in a direction perpendicular or substantially perpendicular to the interior seam of the base formed between the base bottom edge and the wall edge on which the rib is disposed. In some embodiments, the joined length of a base rib disposed on a wall is parallel or substantially parallel to the joined length of one or more or all of the other base ribs disposed on the wall. The joined length of each of the base ribs of the base sometimes is parallel or substantially parallel to the joined length of the other base ribs of the base.

Base ribs disposed on a wall may be spaced equally (e.g., uniform distribution) and sometimes the distance between two base ribs is different than the distance between two other base ribs disposed on the same wall (e.g., irregular distribution). Spacing between base ribs disposed on one wall sometimes is the same or different than spacing between base ribs disposed on another wall of the base. Base ribs sometimes are disposed on two walls, three walls or four walls of a base.

A base rib can have one or more exposed edges. An exposed edge of a base rib sometimes is an edge along a non-joined length of a rib and sometimes is an edge along the proximal terminus of a base rib. An exposed edge of a base rib can have any suitable edge profile, including without limitation, an edge profile that is triangular, quadrilateral, square, rectangular, trapezoid, rhomboid, parallelogram or polygon. An edge profile sometimes includes flat sides and/or termini, sometimes includes curved sides and/or termini, sometimes includes a rounded, beveled or cut edge (e.g., beveled, rounded or cut transition with another surface), and combinations thereof. An edge profile sometimes includes sides that parallel to one another, where the thickness of the rib along the edge is uniform or substantially uniform. An edge profile sometimes includes sides that are not parallel to one another, where the thickness of the rib along the edge is discontinuous and not uniform or not substantially uniform. One or both sides of an edge having an edge profile with a discontinuous thickness sometimes taper from one side of the edge to the other side of the edge, and the one or more sides of the edge profile sometimes are defined independently by a taper angle or draft angle (e.g., an angle of about 0.5 degrees to about 2 degrees). For example, the rib thickness along the non-joined length of a base rib sometimes is not uniform, and (i) the thickness tapers from the proximal rib terminus to the distal rib terminus, (ii) the thickness tapers from the distal rib terminus to the proximal rib terminus, (iii) the thickness tapers from the joined length to the non-joined length, (iv) the thickness tapers from the non-joined length to the joined length; or combination of two or more of (i), (ii), (iii) and (iv).

It has been determined that a relatively short upper portion of each base rib is sufficient to provide substantial support to the plate and thereby sufficiently rigidify the plate in conjunction with plate ribs (e.g., relatively narrow ribs are sufficient). In some embodiments, the length of the proximal terminus edge of a base rib (i.e., from the base interior sidewall on which the rib is disposed at the proximal edge to the corner of the rib proximal edge towards the center of the base) sometimes is about 0.05 inches to about 0.30 inches (e.g., about 0.075 inches to about 0.25 inches; about 0.08 inches to about 0.22 inches; about 0.09 inches to about 0.21 inches, about 0.09 inches to about 0.15 inches, about 0.09 inches to about 0.12 inches, or about 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29 inches). In certain embodiments, (A) the length of the proximal terminus edge of each base rib in a plurality of base ribs disposed on interior base sidewalls is less than about 0.08 inches, less than about 0.09 inches, less than about 0.10 inches, less than about 0.11 inches, less than about 0.12 inches, less than about 0.13 inches, less than about 0.14 inches, less than about 0.15 inches, less than about 0.16 inches, and (B) the height of each plate rib in the plurality of plate ribs is less than about 0.20 inches, less than about 0.22 inches, less than about 0.24 inches, less than about 0.26 inches, less than about 0.28 inches, less than about 0.30 inches, less than about 0.32 inches, less than about 0.34 inches, less than about 0.36 inches, less than about 0.38 inches, less than about 0.40 inches, less than about 0.42 inches, less than about 0.44 inches, less than about 0.46 inches, less than about 0.48 inches, less than about 0.50 inches, less than about 0.52 inches, less than about 0.54 inches, less than about 0.56 inches, less than about 0.58 inches, or less than about 0.60 inches. In some embodiments, the average (e.g., mean or median) or actual surface area of the proximal terminus edge of one base rib of a base is about 0.003 square inches to about 0.010 square inches (e.g., about 0.005 square inches to about 0.008 square inches, about 0.006 square inches to about 0.008 square inches, about 0.005 square inches to about 0.007 square inches; about 0.003, 0.004, 0.005, 0.006, 0.007, 0.008, 0.009, 0.010 square inches).

In certain embodiments, the joined length of each base rib (i.e., the length of the rib molded with the base sidewall on which the rib is disposed) is about 0.5 inches to about 2.5 inches (e.g., about 0.75 inches to about 2.25 inches, about 0.80 inches to about 2.0 inches; about 0.9 inches to about 1.5 inches, about 0.9 inches to about 1.2 inches, about 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 inches).

For a base rib proximal terminus edge having a non-uniform thickness, a rib may be characterized by one or more of the following thickness measurements: (i) average rib thickness (e.g., mean rib thickness or median rib thickness) of about 0.030 inches to about 0.040 inches (e.g., about 0.032 inches to about 0.038 inches; about 0.034 inches to about 0.036 inches, about 0.031, 0.032, 0.033, 0.034, 0.035, 0.036, 0.037, 0.038, 0.039 inches); (ii) a maximum thickness of about 0.040 inches to about 0.060 inches (e.g., about 0.045 inches to about 0.055 inches; about 0.048 inches to about 0.052 inches, about 0.041, 0.042, 0.043, 0.044, 0.045, 0.046, 0.047, 0.048, 0.049, 0.050, 0.051, 0.052, 0.053, 0.054, 0.055, 0.056, 0.057, 0.058, 0.059 inches); and (iii) a minimum thickness of about 0.020 inches to about 0.025 inches (e.g., about 0.021 inches to about 0.024 inches, about 0.022 to about 0.024 inches, about 0.020, 0.021, 0.022, 0.023, 0.024, 0.025 inches).

In certain embodiments, one or more or all of the base ribs disposed on a side of the base have the same edge profiles, and sometimes two or more or all of the base ribs disposed on a side of the base have one or more different edge profiles. One or more or all base ribs disposed on all sides of the base sometimes have the same edge profiles.

In certain embodiments, one or more or all walls of the base include a boss. The boss sometimes includes two sidewalls extending from a base wall and a boss wall joined to the boss sidewalls. The boss wall sometimes is parallel to the base wall from which the boss sidewalls project. In certain embodiments, a base includes two longer sides and two shorter sides, (i) each of the longer sides includes one or more bosses, and a subset of the base ribs is disposed on the one or more bosses disposed on each of the longer sides, and/or (ii) each of the shorter sides includes one or more bosses, and a subset of the base ribs are disposed on the one or more bosses disposed on each of the shorter sides. In embodiments in which one or more walls of the base include a boss, and base ribs are disposed on the boss wall, the boss wall on which the base ribs are disposed is considered an internal wall of the base.

Figure 17:
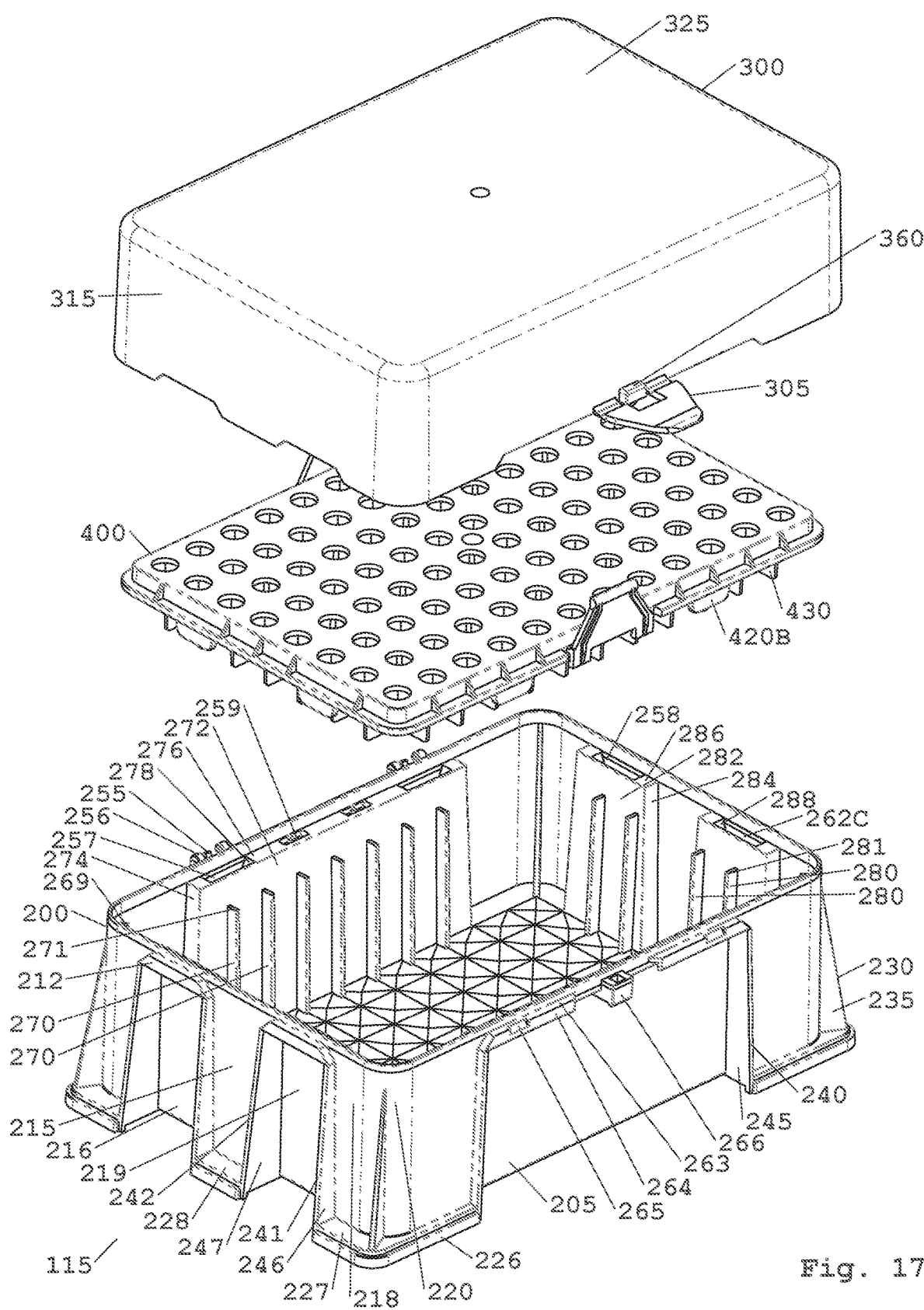
FIG. 17 shows a front, top perspective and exploded view as assembly embodiment 115, which includes the same components as pipette tip tray assembly embodiment 100.
Figure 18:
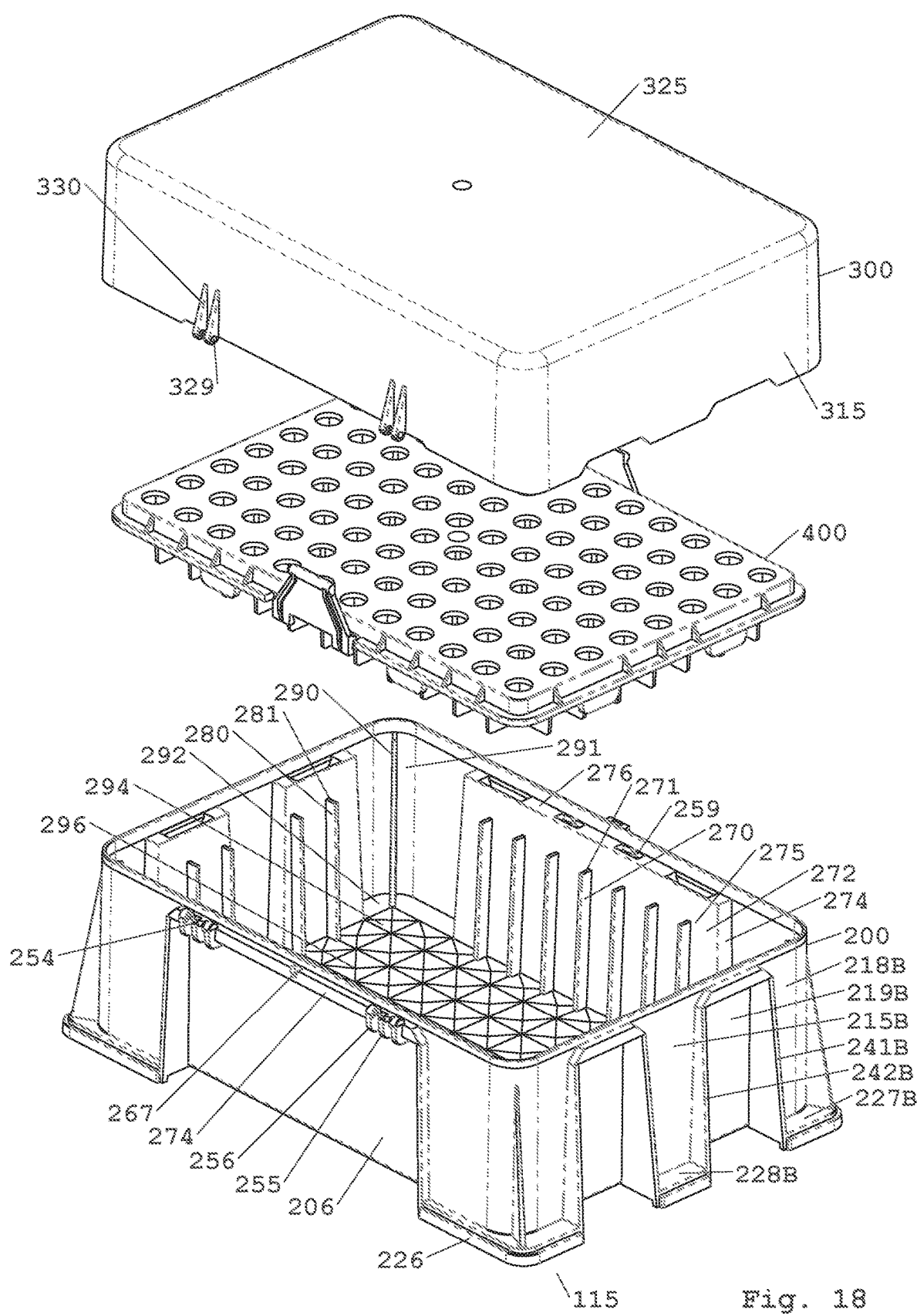
FIG. 18 shows a rear, top perspective and exploded view of assembly embodiment 115.
Figure 19:
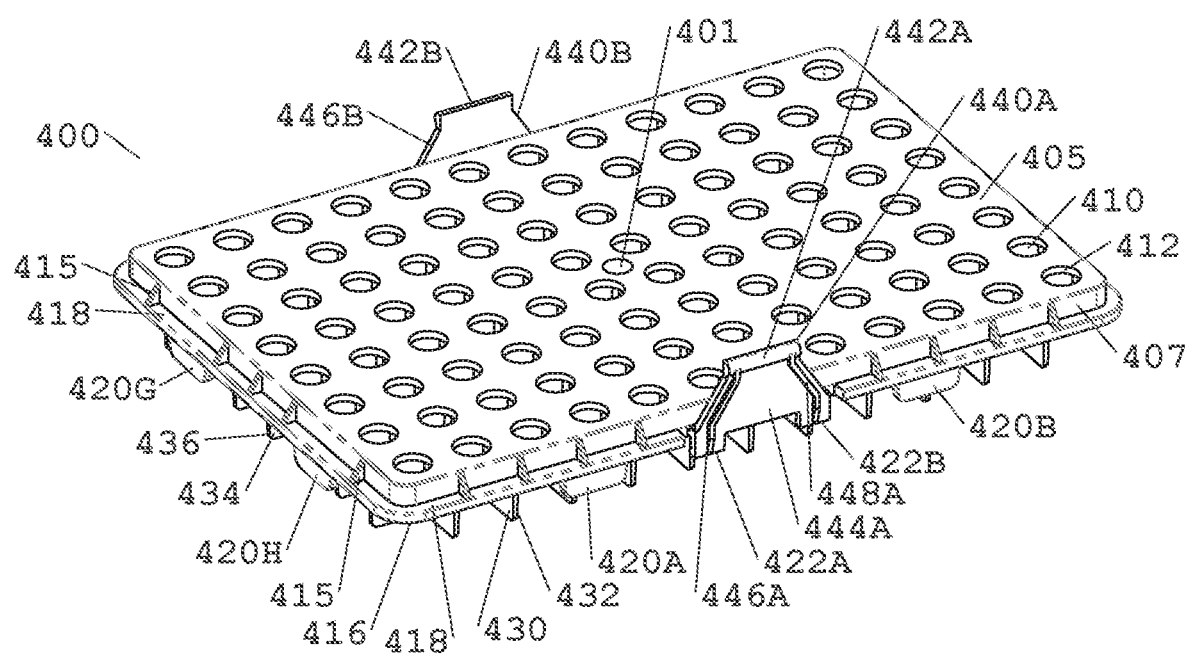
FIG. 19 to FIG. 27 illustrate pipette tip receptacle plate embodiment 400.
Figure 20:
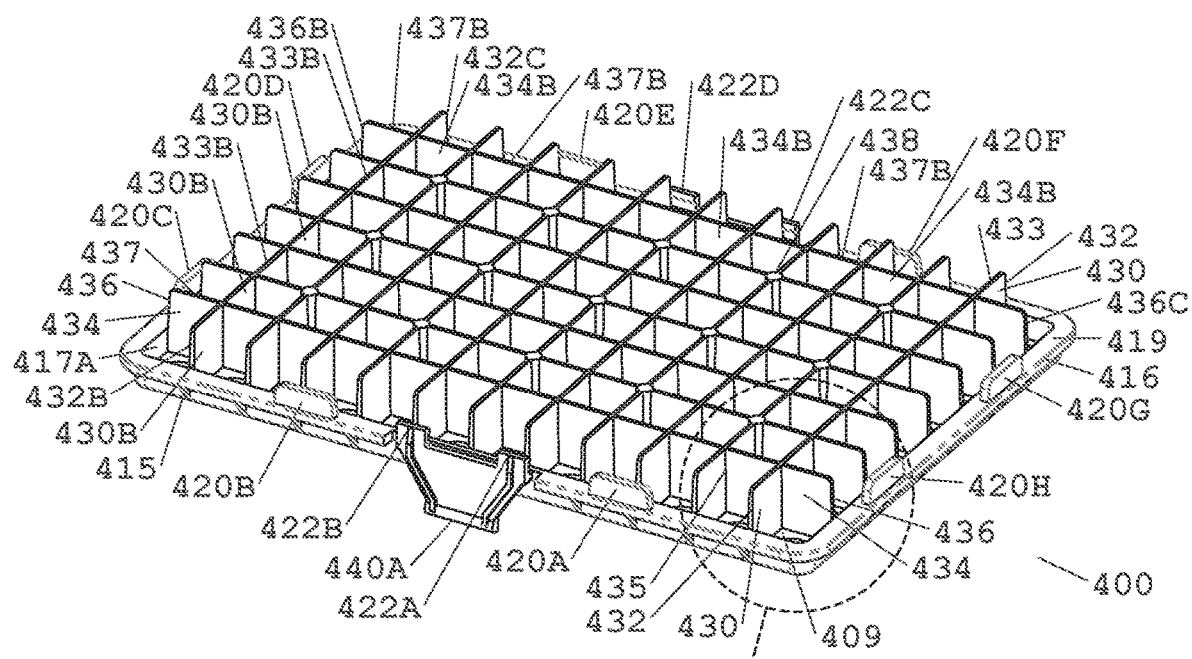

A non-limiting example of a base having interior bosses with interior boss sidewalls, and base ribs disposed on the interior boss sidewalls, is illustrated in FIG. 17 and FIG. 18. A base can include a boss disposed on an interior long-side surface (e.g., boss 272), which can include side surface 274, boss sidewall surface 275, and proximal surface or shelf 276 as illustrate for base 200. A base can include a boss disposed on an interior short-side surface (e.g., boss 282), which can include interior boss side surface 284, proximal surface 286, as illustrated for base 200. A base sometimes includes a plurality of ribs 270 (e.g., 270A) disposed on a long side (e.g., disposed on a long side boss side surface), each of which include proximal terminus edge 271 (e.g., edge 271A), as illustrated for base 200. A base sometimes includes a plurality of ribs 280 (e.g., 280A) disposed on a short side (e.g., disposed on a short side boss side surface), each of which include proximal terminus edge 281 (e.g., edge 281A), as illustrated for base 200. A proximal terminus edge of a rib (e.g., edge 271 or 281), sometimes is referred to herein as a proximal terminus surface of a rib.

The outside dimensions of a base footprint sometimes include a long side length of about 100 millimeters to about 150 millimeters (e.g., about 110 millimeters to about 135 millimeters, about 110, 115, 120, 125, 126, 127, 128, 129, 130, 135 millimeters. The outside dimensions of a base footprint sometimes include a short side length of about 115 millimeters to about 65 millimeters (about 100 millimeters to about 65 millimeters, about 100, 95, 90, 89, 88, 87, 86, 85, 84, 83, 82, 81, 80, 75, 70, 65 millimeters). The outside dimensions of a base footprint sometimes are a long side length of 127.76 millimeters ±0.25 millimeters and a short side length of 85.48 millimeters ±0.25 millimeters. A base sometimes has standard footprint dimensions specified by the Society for Biomolecular Sciences (SBS), the Society for Biomolecular Screening and/or the American National Standards Institute (ANSI). Sometimes a footprint of a base bottom conforms to SBS standards and/or SBS dimensions for a microplate footprint.

Pipette Tip Receptacle Plate Support Features

A pipette tip receptacle plate for a tray (referred to herein as a "plate") may include any suitable support features disposed on plate surface that can interact with support features disposed on two or more walls of a base. Support features of the plate may be disposed on two or more plate edges, and often are disposed on the plate distal surface. Plate support features include or consist of ribs in certain embodiments. Plate ribs generally include a joined length disposed on the plate distal surface, a non-joined length opposite the joined length, and two side termini. The joined length and non-joined length typically are longer than the length of each of the side termini, and each side terminus generally is disposed at the ends of the joined length and non-joined length. The joined length, non-joined length, and each side terminus of a rib together form a base rib face profile. A plate rib face profile can be any suitable rib profile, including without limitation, a profile that is triangular, quadrilateral, square, rectangular, trapezoid, rhomboid, parallelogram or polygon. The plate rib profile formed sometimes includes flat sides and/or termini, sometimes includes curved sides and/or termini, sometimes includes a rounded, beveled or cut edge (e.g., rounded, beveled or cut transition with another surface), and combinations thereof. The joined length sometimes is the major length of a rib, sometimes the non-joined length is the major length of the rib, and sometimes the joined length and the non-joined length are equal and each is the major length of the rib. In some embodiments, the joined length of one or more or all of the plate ribs is disposed on (e.g., joined to, molded on) the distal surface of the plate.

For a rectangular plate rib profile, (i) the joined length and non-joined length are parallel, are equal in length, and often each are the major length of the rib, and (ii) each side terminus is perpendicular to the joined length and the non-joined length, are parallel to one another, are of the same length as one another, and typically are shorter in length than the joined length and the non-joined length. For a triangular plate rib profile, (i) the joined length and non-joined length are angled with respect to one another (e.g., angle of about 5 degrees to about 60 degrees, e.g., an angle of about 5, 10, 15, 20 25, 30, 35, 40, 45, 50, 55, 60 degrees), are not equal in length, with the non-joined length often being the major length of the rib, and (ii) one of the edge termini often is perpendicular or substantially perpendicular to the joined length and often has a length shorter than the joined length and non-joined length, and the other of the edge termini often is a point. For certain quadrilateral plate rib profiles, (i) the joined length and non-joined length sometimes are angled with respect to one another (e.g., angle of about 5 degrees to about 60 degrees, e.g., an angle of about 5, 10, 15, 20 25, 30, 35, 40, 45, 50, 55, 60 degrees), are not equal in length, with the non-joined length often being the major length of the rib, and (ii) one of the side termini often is perpendicular or substantially perpendicular to the joined length and often has a length shorter than the joined length and non-joined length, and the other of the edge termini often is shorter than the other. For some quadrilateral plate rib profiles, (i) the joined length and non-joined length sometimes are parallel or substantially parallel to one another, are equal or substantially equal in length, with the non-joined length and joined length typically being the major length or lengths of the rib, and (ii) one or both of the side termini often is angled with respect to the joined length (e.g., angle of about 5 degrees to about 60 degrees, e.g., an angle of about 5, 10, 15, 20 25, 30, 35, 40, 45, 50, 55, 60 degrees).

A plate often has four sides, and often is rectangular with two opposing shorter sides and two opposing longer sides. The joined length of one or more or all of the plate ribs sometimes is disposed in a direction from one shorter side to the other opposing shorter side (i.e., longitudinally-disposed ribs, or longitudinal ribs) and/or sometimes is disposed in a direction from one longer side to the other opposing longer side (i.e., latitudinally-disposed ribs or latitudinal ribs). The joined length of one or more or all of the plate ribs sometimes is disposed in a direction perpendicular or substantially perpendicular to the shorter side or a longer side. In some embodiments, the joined length of a plate rib is parallel or substantially parallel to the joined length of one or more or all of the other plate ribs disposed on the wall. The joined length of a longitudinal plate rib is parallel or substantially parallel to the joined length of one or more or all of the other longitudinal plate ribs disposed on a plate, in embodiments where longitudinal plate ribs are disposed on plate. The joined length of a latitudinal plate rib is parallel or substantially parallel to the joined length of one or more or all of the other latitudinal plate ribs disposed on a plate, in embodiments where latitudinal plate ribs are disposed on plate.

Plate ribs may be spaced equally (e.g., uniform distribution) and sometimes the distance between two plate ribs is different than the distance between two other plate ribs (e.g., irregular distribution). Latitudinal plate ribs, when present on a plate, may be spaced equally (e.g., uniform distribution) and sometimes the distance between two latitudinal plate ribs is different than the distance between two other latitudinal plate ribs (e.g., irregular distribution). Longitudinal plate ribs, when present on a plate, may be spaced equally (e.g., uniform distribution) and sometimes the distance between two longitudinal plate ribs is different than the distance between two other longitudinal plate ribs (e.g., irregular distribution). Spacing of ribs sometimes is determined by rib section widths, as addressed hereafter.

Figure 25:
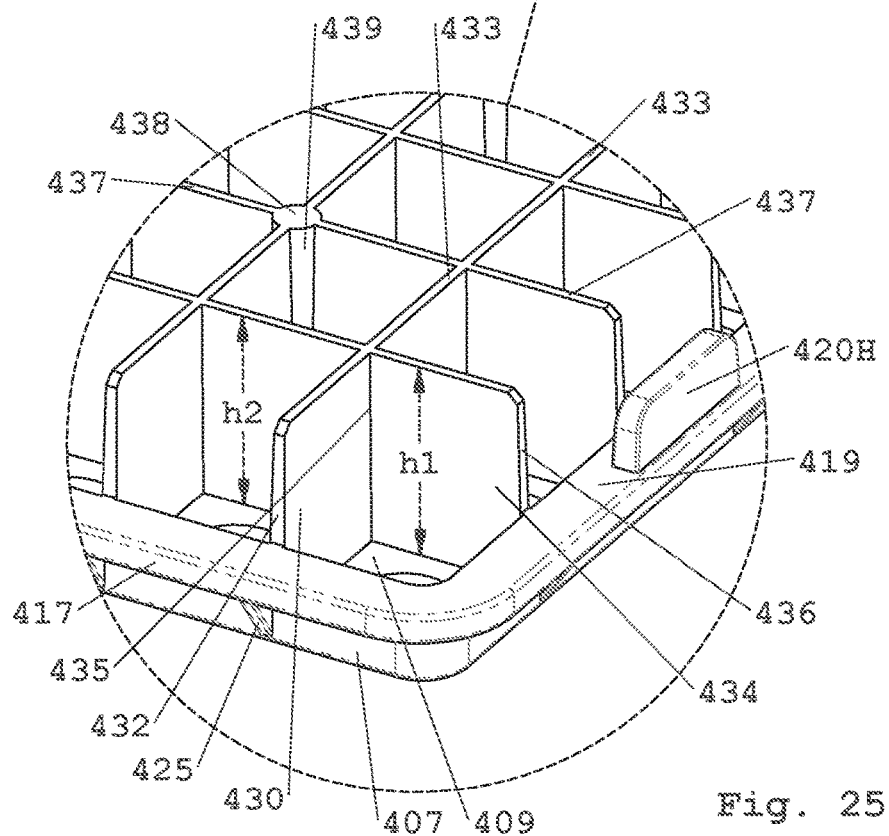
Figure 29:
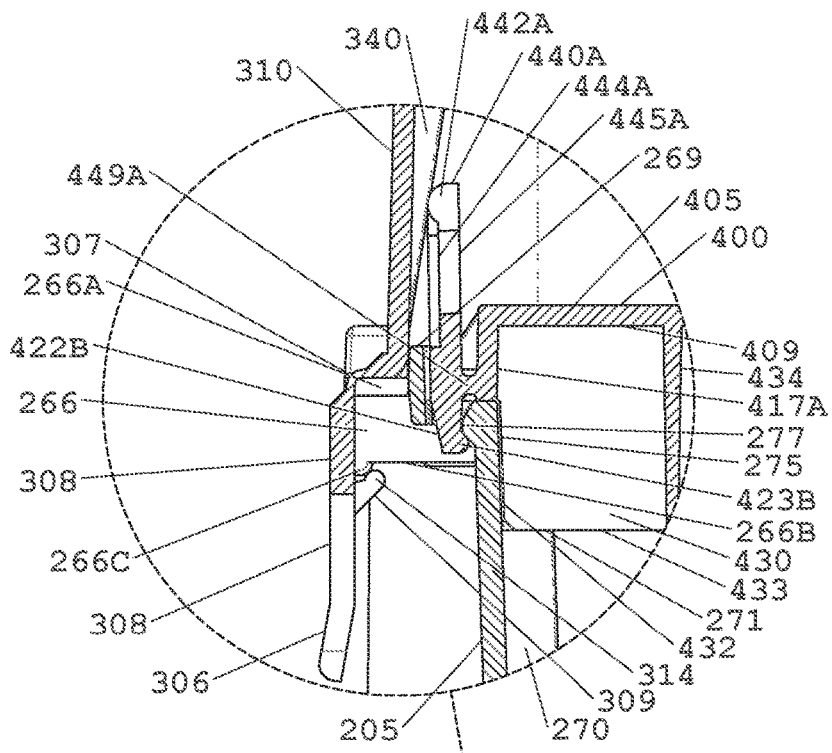
FIG. 29 is an enlarged view of the region delineated by the broken circle shown in FIG. 28.
Figure 28:
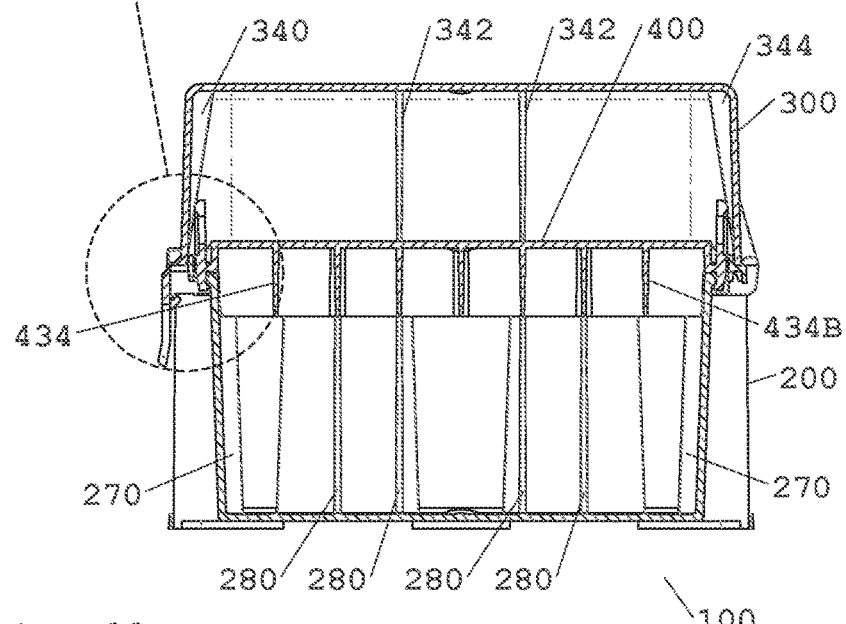
FIG. 28 is a section view through cutting plane 28-28 shown in FIG. 8.
Figure 30:
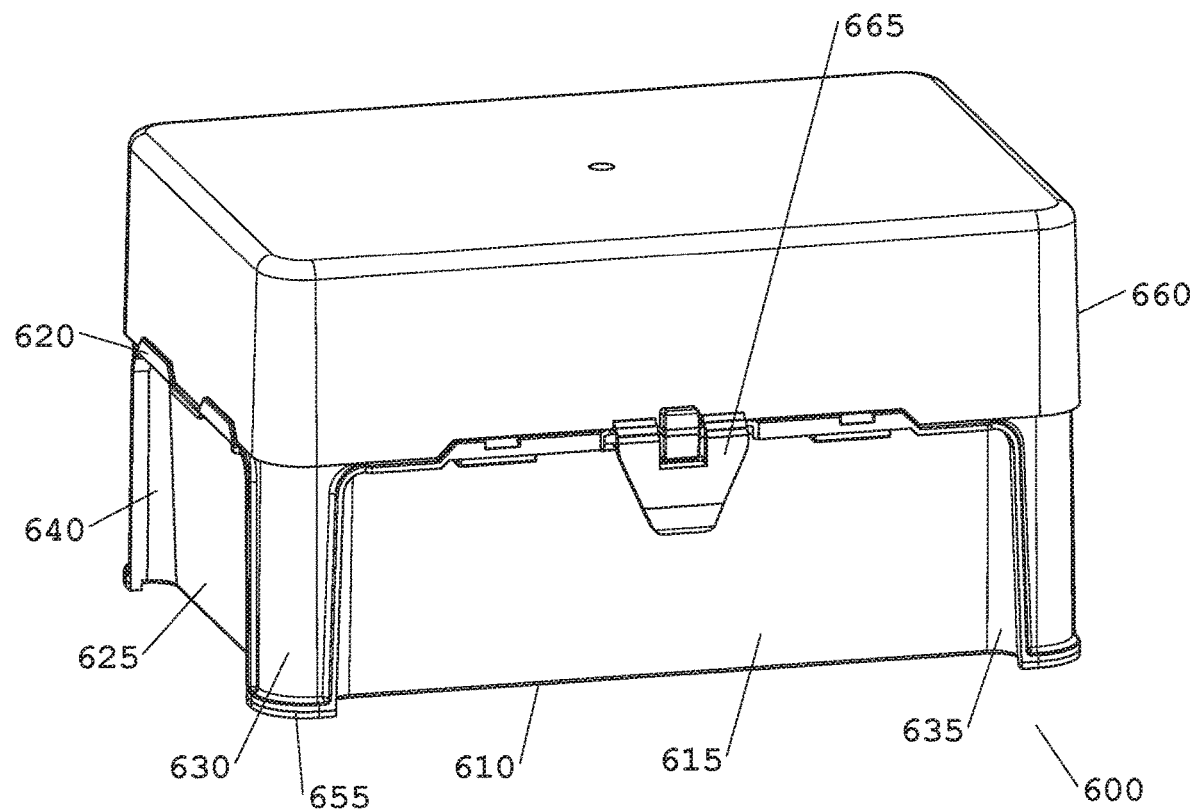
FIG. 30 to FIG. 35 illustrate alternative pipette tip tray embodiments having base features, for example that differ from pipette tip tray embodiments 100 and 105.
Figure 31:
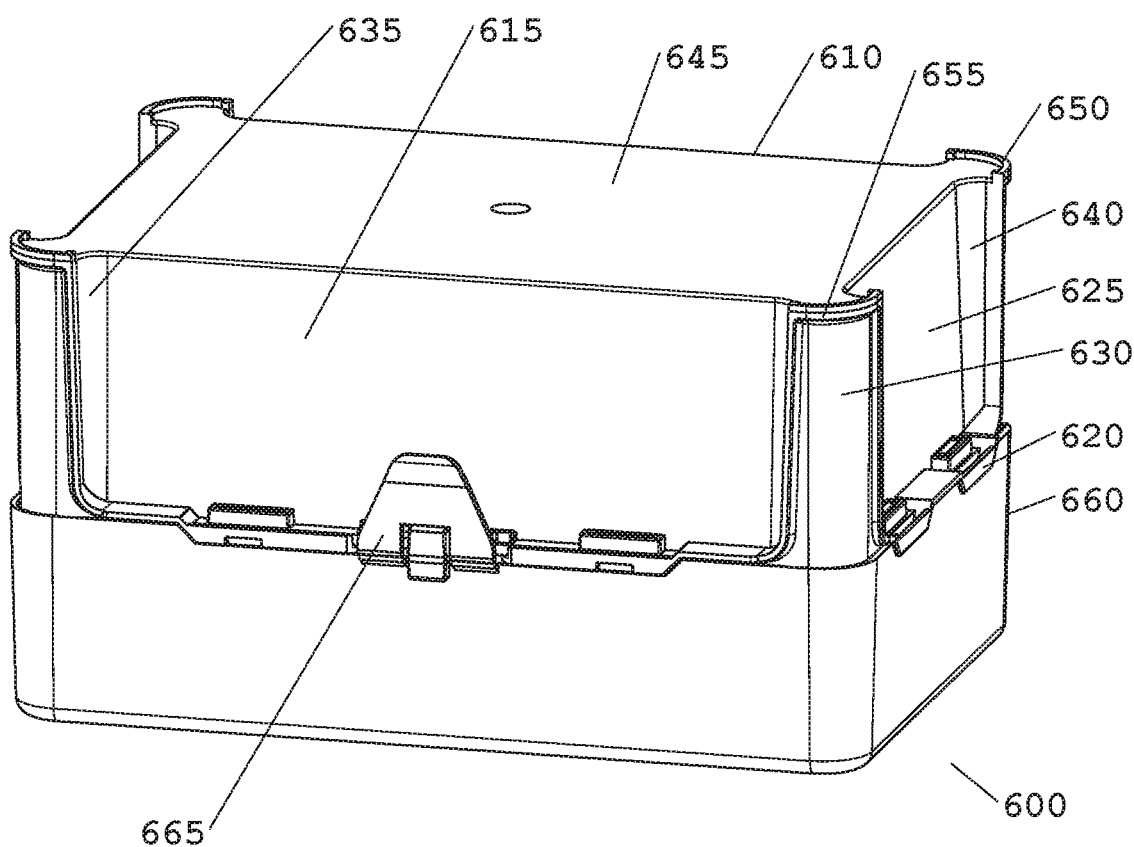
Figure 32:
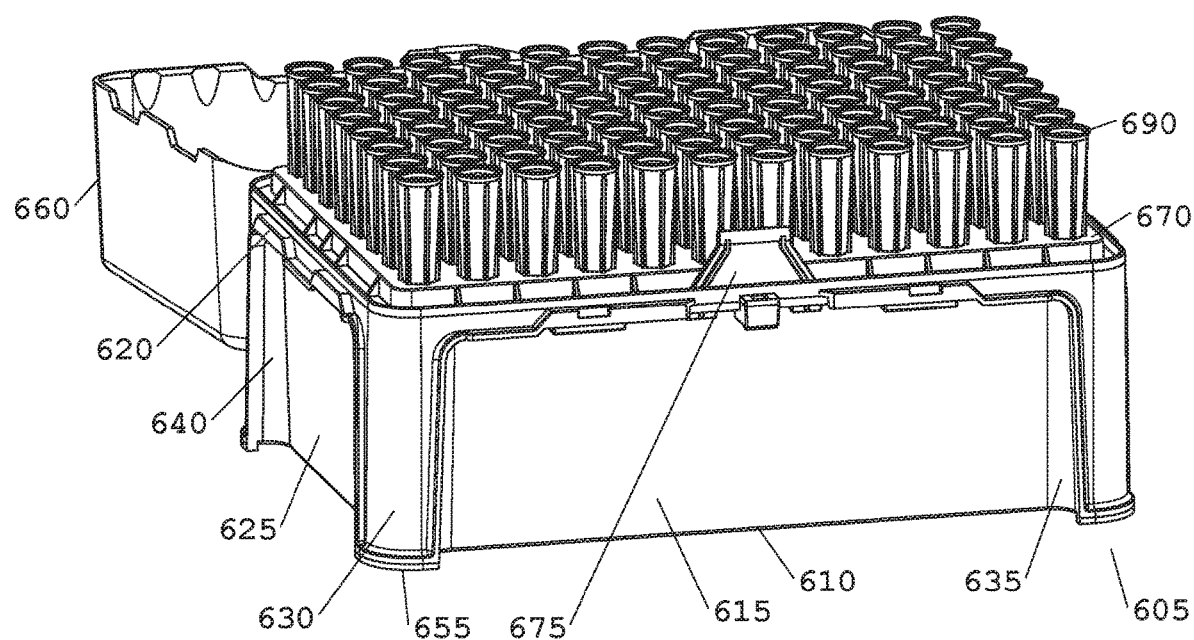
Figure 33:
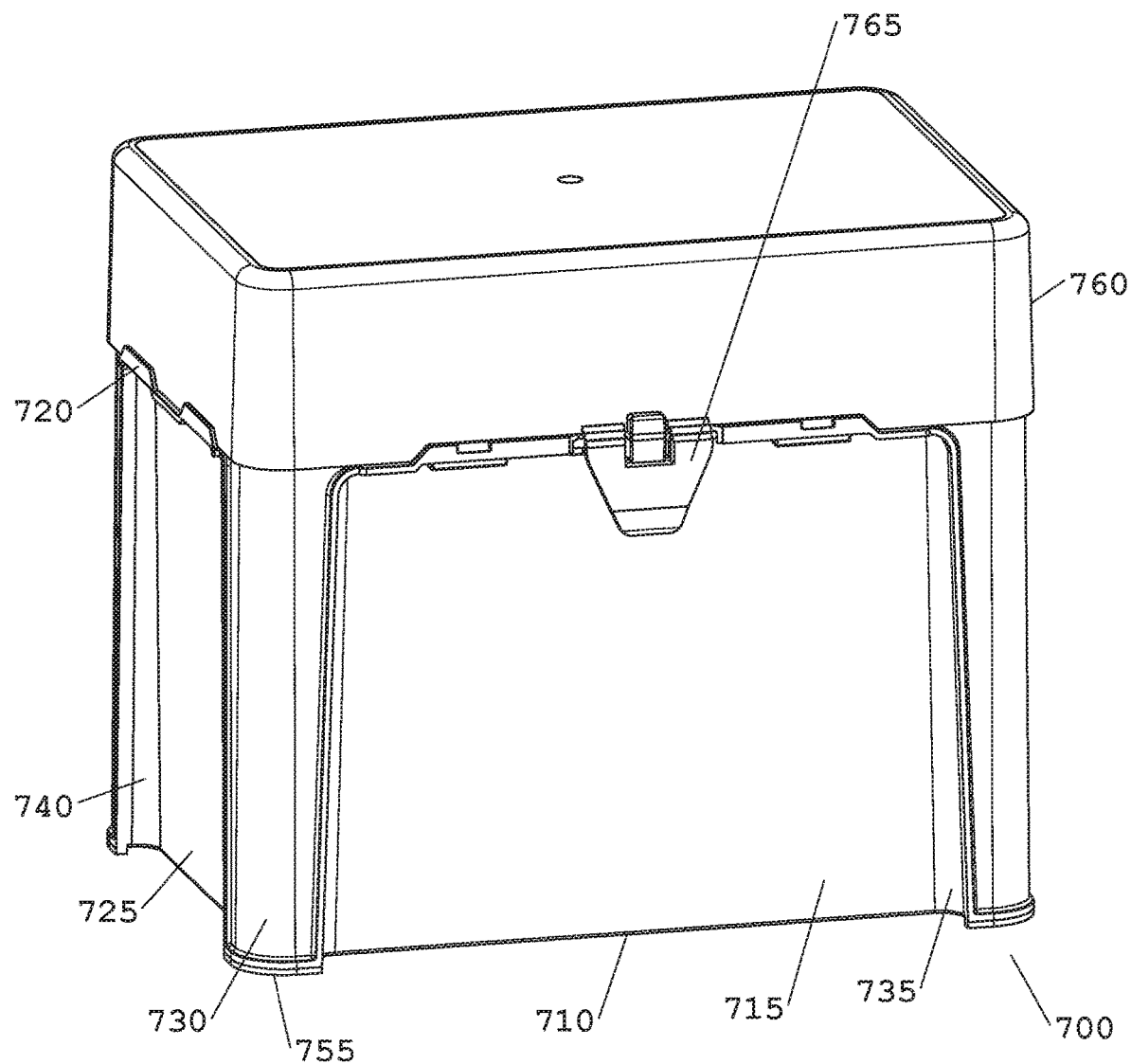
Figure 34:
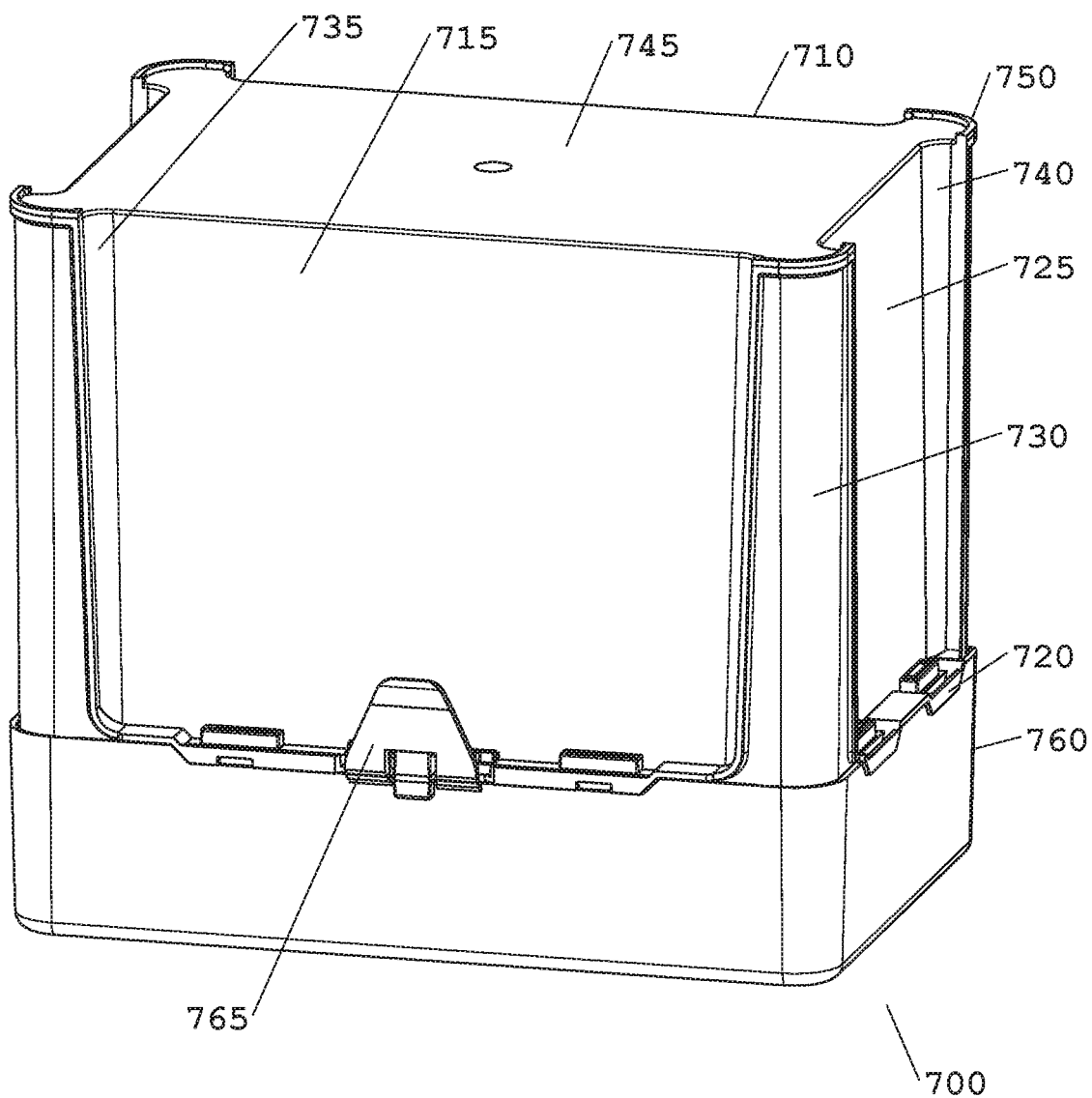
Figure 35:
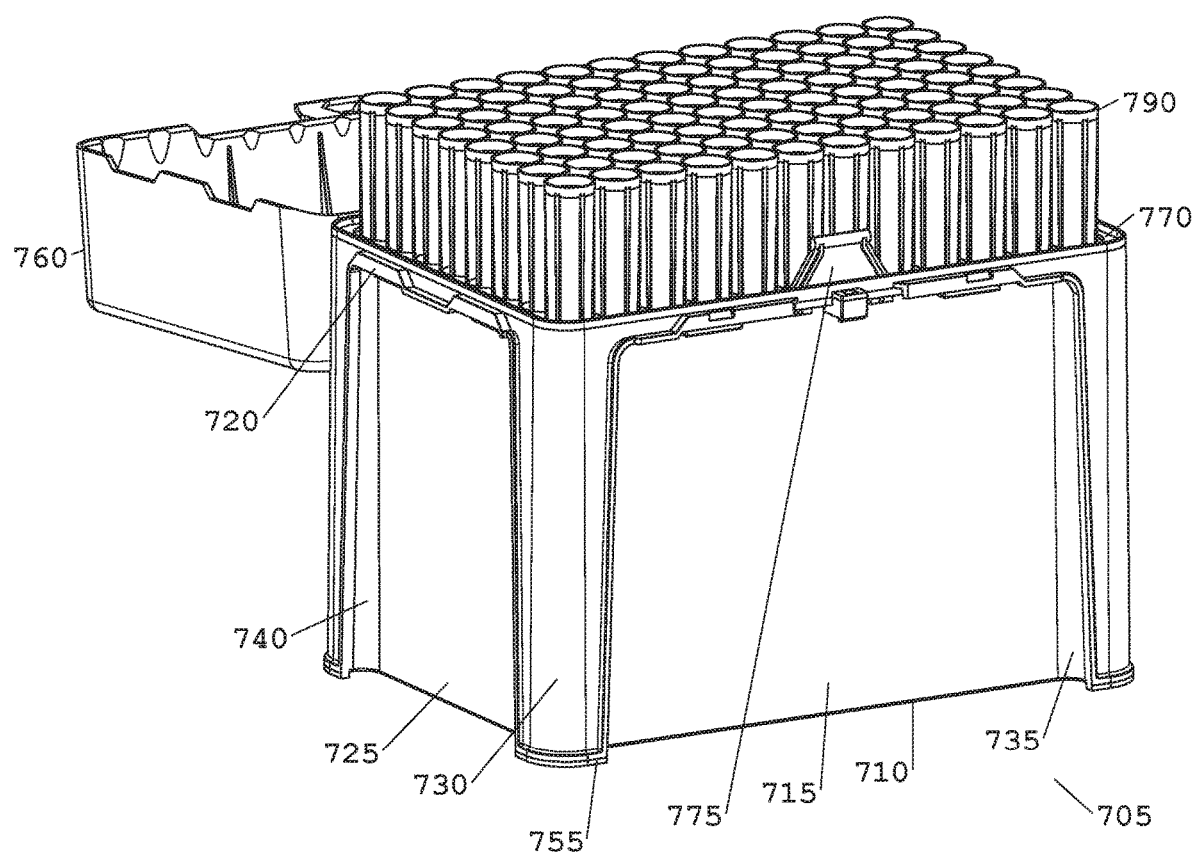

A plate rib can have one or more exposed edges. An exposed edge of a plate rib (i) sometimes is an edge along a non-joined length of a rib (i.e., a distal edge of a plate rib), and (ii) sometimes is an edge along a side terminus of a plate rib (i.e., a side edge of a plate rib). An exposed edge of a plate rib can have any suitable edge profile, including without limitation, an edge profile that is triangular, quadrilateral, square, rectangular, trapezoid, rhomboid, parallelogram or polygon. An edge profile sometimes includes flat sides and/or termini, sometimes includes curved sides and/or termini, sometimes includes a rounded, beveled or cut edge (e.g., rounded, beveled or cut transition with another surface), and combinations thereof. An edge profile for a plate rib sometimes includes sides that parallel to one another, where the thickness of the rib along the edge is uniform or substantially uniform. An edge profile for a plate rib sometimes includes sides that are not parallel to one another, where the thickness of the rib along the edge is discontinuous and not uniform or not substantially uniform. One or both sides of a plate rib edge having an edge profile with a discontinuous thickness sometimes taper from one side of the edge to the other side of the edge, and the one or more sides of the edge profile sometimes are defined independently by a taper angle or draft angle (e.g., an angle of about 0.5 degrees to about 2 degrees). For example, the rib thickness along the non-joined length of a plate rib is not uniform, and (i) the thickness tapers from one side terminus to the opposing side terminus; (ii) the thickness flares from one side terminus towards the middle of the non-joined length edge, and then tapers from the middle of the non-joined length edge to the opposing side terminus; (iii) the thickness tapers from the joined length at the plate distal surface to the non-joined length edge; (iv) the thickness tapers from the non-joined length edge to the joined length at the distal plate surface; or combination of two or more of (i), (ii), (iii) and (iv). In a non-limiting example, latitudinal plate ribs 430 include a cut at the junction of side edge 432 and distal edge 433, as illustrated in FIG. 29 for plate 400. In a non-limiting example, longitudinal plate ribs 434 include a cut at the junction of side edge 436 and distal edge 437, as illustrated in FIG. 25 for plate 400

In some embodiments, the average (e.g., mean or median) or actual surface area of each plate rib distal edge of a plate is about 0.040 square inches to about 0.060 square inches for latitudinal ribs (e.g., about 0.045 square inches to about 0.055 square inches; about 0.040 square inches to about 0.050 square inches, about 0.041, 0.042, 0.043, 0.044, 0.045, 0.046, 0.047, 0.048, 0.049, 0.050, 0.051, 0.052, 0.053, 0.054, 0.055, 0.056, 0.057, 0.058, 0.059 square inches); and about 0.080 square inches to about 0.100 square inches for longitudinal ribs (e.g., about 0.085 square inches to about 0.095 square inches; about 0.088 square inches to about 0.092 square inches, about 0.081, 0.082, 0.083, 0.084, 0.085, 0.086, 0.087, 0.088, 0.089, 0.090, 0.091, 0.092, 0.093, 0.094, 0.095, 0.096, 0.097, 0.098, 0.099 square inches). In certain embodiments, the length of each latitudinal rib (when present) is about 2.70 inches to about 2.80 inches (e.g., about 2.72 inches to about 2.78 inches, about 2.74 inches to about 2.76 inches, about 2.71, 2.72, 2.73, 2.74, 2.75, 2.76, 2.77, 2.78, 2.79 inches) and the length of each longitudinal rib (when present on a plate) is about 4.1 inches to about 4.2 inches (e.g., about 4.12 inches to about 4.18 inches, about 4.14 inches to about 4.16 inches, about 4.11, 4.12, 4.13, 4.14, 4.15, 4.16, 4.17, 4.18, 4.19 inches). For a plate rib having a non-uniform thickness, a plate rib may be characterized by one or more of the following thickness measurements: (i) average rib thickness (e.g., mean rib thickness or median rib thickness) of about 0.025 inches to about 0.032 inches, about 0.027 inches to about 0.029 inches, or about 0.025, 0.026, 0.027, 0.028, 0.029, 0.030, 0.031 or 0.032 inches; (ii) a maximum thickness of about 0.030 inches to about 0.040 inches, about 0.032 inches to about 0.038 inches, about 0.033 inches to about 0.037 inches, about 0.034 inches to about 0.036 inches, or about 0.030, 0.031, 0.032, 0.033, 0.034, 0.035, 0.036, 0.037, 0.038, 0.039 or 0.040 inches; and (iii) a minimum thickness of about 0.017 inches to about 0.025 inches, about 0.018 inches to about 0.024 inches, about 0.019 inches to about 0.023 inches, about 0.020 inches to about 0.022 inches or about 0.017, 0.018, 0.019, 0.020, 0.021, 0.022, 0.023, 0.024 or 0.25 inches.

In certain embodiments, a subset of the plate ribs or all of the plate ribs disposed on a plate have the same edge profile, and sometimes two or more or all of the plate ribs disposed on a plate have one or more different edge profiles. A subset of the latitudinal plate ribs or all of the latitudinal plate ribs disposed on a plate sometimes have the same edge profile, and sometimes two or more or all of the latitudinal plate ribs disposed on a plate have one or more different edge profiles. A subset of the longitudinal plate ribs or all of the longitudinal plate ribs disposed on a plate sometimes have the same edge profile, and sometimes two or more or all of the longitudinal plate ribs disposed on a plate have one or more different edge profiles.

A plate in certain embodiments includes one or more longitudinal ribs and one or more latitudinal ribs. In some embodiments, a plate includes a plurality of longitudinal ribs (i.e., a set of longitudinal ribs) and a plurality of latitudinal ribs (i.e., a set of latitudinal ribs). In certain embodiments, each of the longitudinal plate ribs intersects the set of latitudinal plate ribs at a plurality of plate rib junctions; and each of the latitudinal plate ribs intersects the set of longitudinal plate ribs at a plurality of plate rib junctions.

In certain embodiments, a plate includes a plate sidewall that extends distally from the plate distal surface, and that often is extends perpendicularly or substantially perpendicularly from the plate distal surface. A plate sidewall often includes an exterior sidewall surface and an interior sidewall surface. A plate in some embodiments includes flange extending from a plate sidewall exterior surface, which often extends perpendicularly or substantially perpendicularly away from the plate interior from a plate sidewall exterior surface. A flange sometimes includes (i) an external flange edge, which often surrounds the plate perimeter, and (ii) a flange distal surface, which often forms a foot surface of the plate, and sometimes includes (iii) a flange proximal surface, which can project away from a plate sidewall exterior surface and form an exterior shelf.

In some embodiments, the joined length of each of the plate ribs disposed on plate distal surface is equal to or substantially equal to the length between opposing edges of the distal surface on which the plate ribs are disposed. In some embodiments, one or both of the side edges of each of at least a portion or all of the plate ribs are a distance of 0.05 inches or less from the perimeter of the proximal surface, or 0.05 inches or less from the perimeter of the distal surface, of the plate, where the direction of the distance is parallel to the proximal surface of the plate. In certain embodiments, one or both of the side edges of each of at least a portion or all of the plate ribs are coextensive with the perimeter of the distal surface of the plate. In certain embodiments, a plate includes a distally extending sidewall that includes an exterior sidewall surface and an interior sidewall surface; one or both of all of the side edges of each of at least a portion of the plate ribs is a distance of 0.05 inches or less from the interior sidewall surface; and the direction of the distance is parallel to the proximal surface of the plate. In some embodiments, a plate includes a distally extending sidewall that includes an exterior sidewall surface and an interior sidewall surface; and one or both of the side edges of each of at least a portion or all of the plate ribs abut the interior sidewall surface. In some embodiments, the distance between (i) one or both of the side edges of the plate ribs, and (ii) the perimeter of the proximal surface, the perimeter of the distal surface or the interior sidewall surface, is about 0.05, 0.045, 0.04, 0.035, 0.03, 0.025, 0.02, 0.015, 0.01, 0.008, 0.006, 0.005, 0.004, 0.002 or 0.001 inches or less. In a non-limiting example, side edge 432 of rib 430 abuts the interior surface 417A of the plate sidewall, as illustrated in FIG. 29 for plate embodiment 400.

Figure 21:
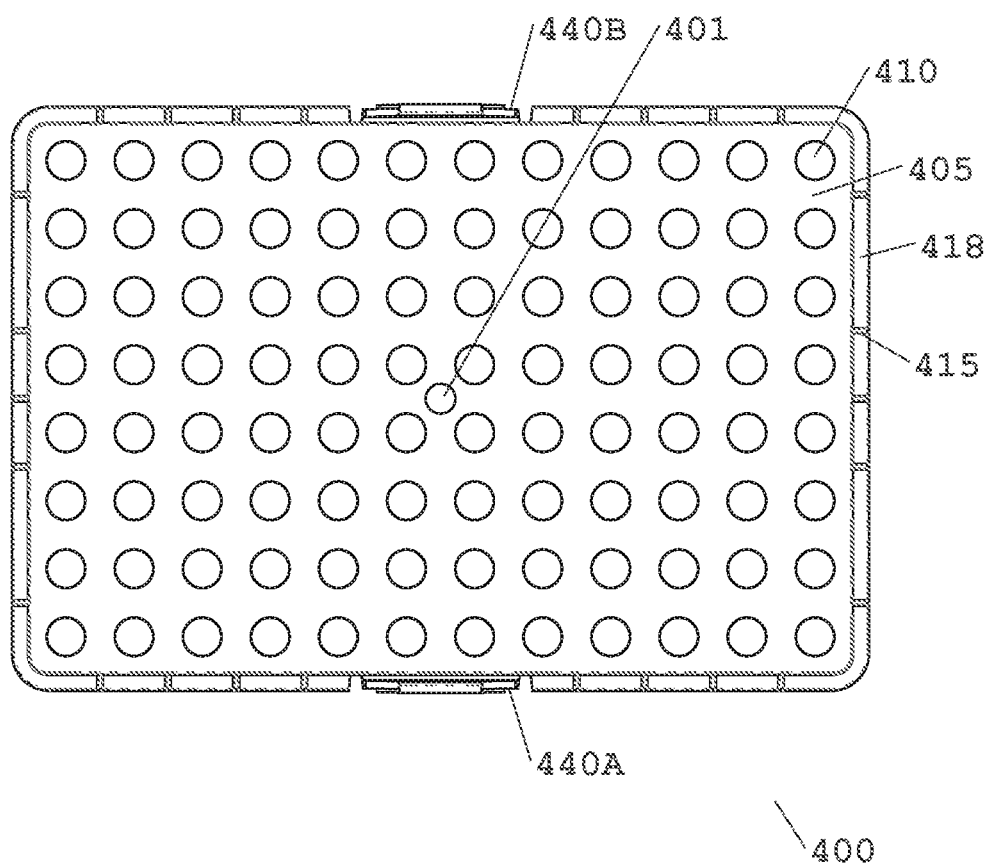
Figure 22:
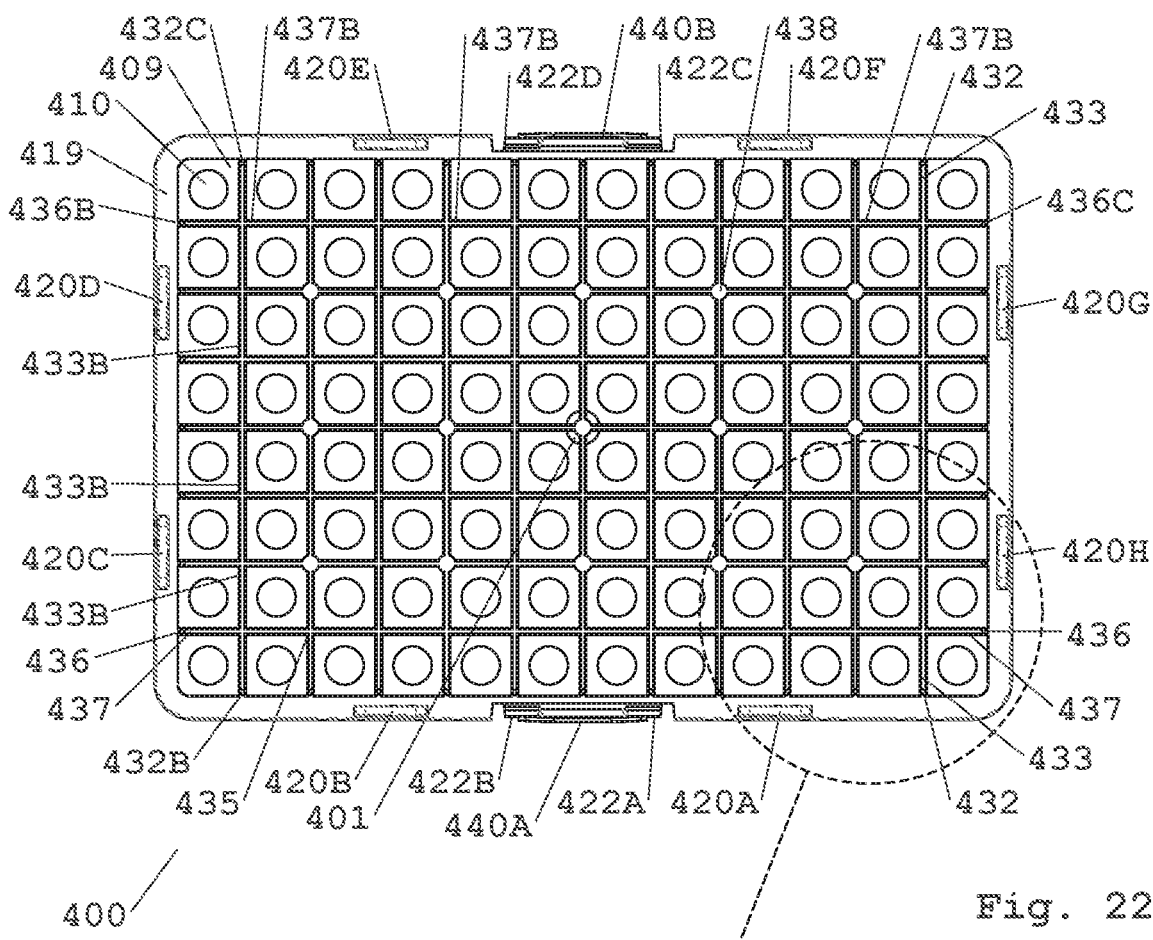

The array of bores in a plate can include a plurality of array columns and a plurality of array rows. Each column in the array of columns sometimes extend from a longer side to the opposing longer side of a plate, and each row in the array of rows sometimes extends from a shorter side to the opposing shorter side of the plate. Each array column includes a subset of bores c in the array of bores and each array row includes a subset of bores r in the array of bores. An array of bores can include any suitable number of array columns and any suitable number of array rows. For example, the plate shown in FIG. 21 includes twelve array columns and eight array rows. In some embodiments, each array column includes c bores; the plate includes c−1 longitudinal plate ribs; and each bore in each array column is adjacent to one or two longitudinal plate ribs. In some embodiments, the plate includes c−1 plate rib junctions on each of the latitudinal plate ribs; and each bore in each array column is adjacent to one or two latitudinal ribs. In certain embodiments, each array row includes r bores; the plate includes r−1 latitudinal plate ribs; and each bore in each array row is adjacent to one or two latitudinal plate ribs. In some embodiments, the plate includes r−1 plate rib junctions on each of the longitudinal plate ribs; and each bore in each array row is adjacent to one or two longitudinal ribs. Each bore in each array column or in each array row generally is adjacent to one latitudinal rib when the array column or the array row is the first or last array column or array row (i.e., the array column or the array row is located near the plate perimeter). Each bore in each array column or in each array row generally is adjacent to two latitudinal ribs when the array column or the array row is an inside array column or an inside array row, and is not the first or last array column or array row (i.e., the array column or the array row is not located near the plate perimeter).

The height a plate rib is measured at any point along the distal edge of a plate rib as the distance extending perpendicularly from the plate distal surface to that point on the distal edge of the rib. For example, two rib height measurements, h1 and h2, are shown in FIG. 25. In embodiments for which a plate includes one or more junctions at which one or more latitudinal ribs and one or more longitudinal ribs intersect, each rib having a junction has a rib section (i) between two junctions on the rib, or (ii) an edge of the rib and the adjacent rib junction. A width of any rib section of a rib (i.e., rib section width) can be measured as a distance parallel to the distal edge of the rib between (i) a side edge of the rib to the adjacent rib junction, or (ii) two adjacent rib junctions. For example, a rib section width between a side edge to the adjacent rib junction is shown as w1 in FIG. 26 and a rib section width between two adjacent rib junctions is shown as w2 in FIG. 26. Determining rib heights (e.g. h1 and h2) and rib section widths (e.g., w1 and w2) is described in greater detail hereafter with respect to FIG. 25, FIG. 26 and FIG. 29.

In some embodiments, one or more or all ribs, one or more or all latitudinal ribs, and/or one or more or all longitudinal ribs, disposed on a plate, have a non-uniform height. An average height (e.g., mean or median height) can be determine for a rib having a non-uniform height by averaging height measurements regularly dispersed along with the distal edge of the rib. In certain embodiments, one or more or all ribs, one or more or all latitudinal ribs, and/or one or more or all longitudinal ribs, disposed on a plate, have a uniform height. In some embodiments, a subset of or all ribs disposed on a plate have the same uniform height, and sometimes two or more or all of the plate ribs disposed on a plate have one or more different uniform heights. In some embodiments, a subset of or all longitudinal plate ribs disposed on a plate have the same uniform height, and sometimes two or more or all of the longitudinal plate ribs disposed on a plate have one or more different uniform heights. In certain embodiments, a subset of or all latitudinal plate ribs disposed on a plate have the same uniform height, and sometimes two or more or all of the latitudinal plate ribs disposed on a plate have one or more different uniform heights. In some embodiments, the height of each of the ribs of a plate is uniform and is the same for all ribs of the plate, and is about 0.2 inches to about 0.6 inches, about 0.25 inches to about 0.55 inches, about 0.3 inches to about 0.5 inches, about 0.35 inches to about 0.45 inches, about 0.37 inches to about 0.43 inches, or about 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49 or 0.50 inches.

In some embodiments, one or more or all ribs, one or more or all latitudinal ribs, and/or one or more or all longitudinal ribs, disposed on a plate, have non-uniform rib section widths. An average rib section width (e.g., mean or median width) can be determine for a rib having non-uniform rib section widths by averaging rib section width measurements for the rib. In certain embodiments, one or more or all ribs, one or more or all latitudinal ribs, and/or one or more or all longitudinal ribs, disposed on a plate, have a uniform rib section widths. In some embodiments, a subset of or all ribs disposed on a plate have the same uniform rib section width, and sometimes two or more or all of the plate ribs disposed on a plate have one or more different rib section widths. In some embodiments, a subset of or all longitudinal plate ribs disposed on a plate have the same uniform rib section width, and sometimes two or more or all of the longitudinal plate ribs disposed on a plate have one or more different uniform rib section widths. In certain embodiments, a subset of or all latitudinal plate ribs disposed on a plate have the same uniform rib section width, and sometimes two or more or all of the latitudinal plate ribs disposed on a plate have one or more different rib section widths. In some embodiments, the rib section width of each of the ribs of a plate is uniform and is the same for all ribs of the plate, and is about 0.25 inches to about 0.40 inches, about 0.27 inches to about 0.37 inches, about 0.30 inches to about 0.35 inches, about 0.31 inches to about 0.33 inches, or about 0.28, 0.29, 0.30, 0.31, 0.32, 0.33, 0.34, 0.35 or 0.36 inches.

Figure 26:
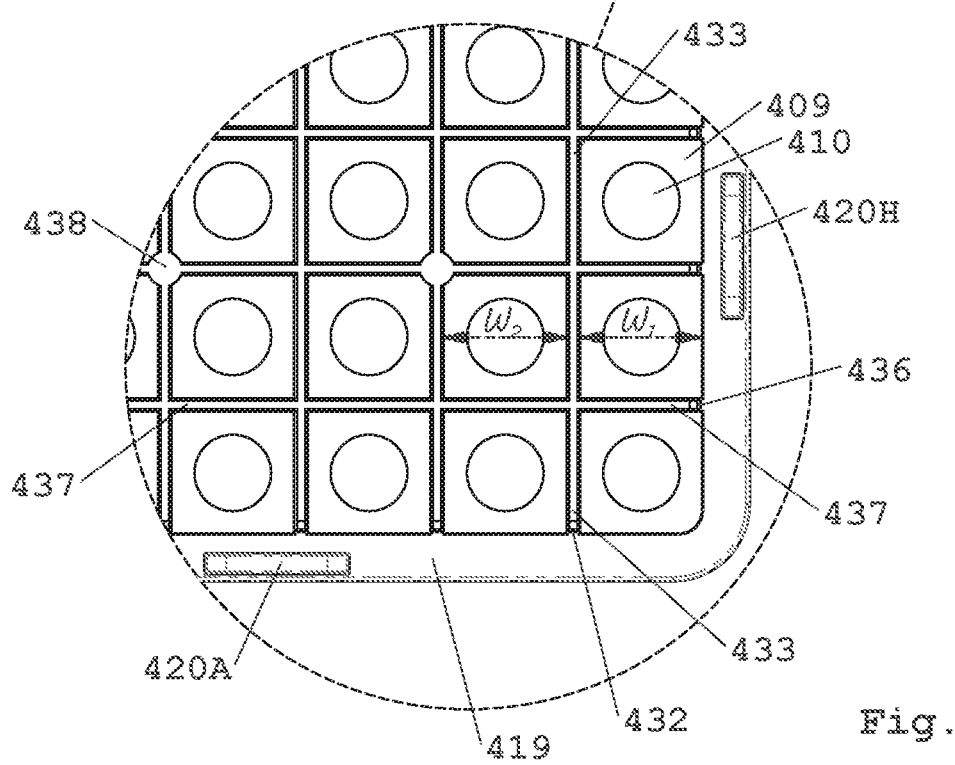
Figure 23:
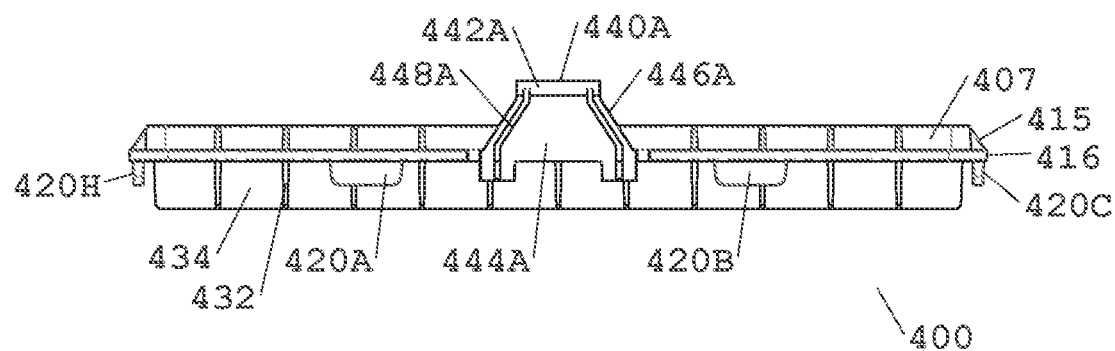
Figure 24:
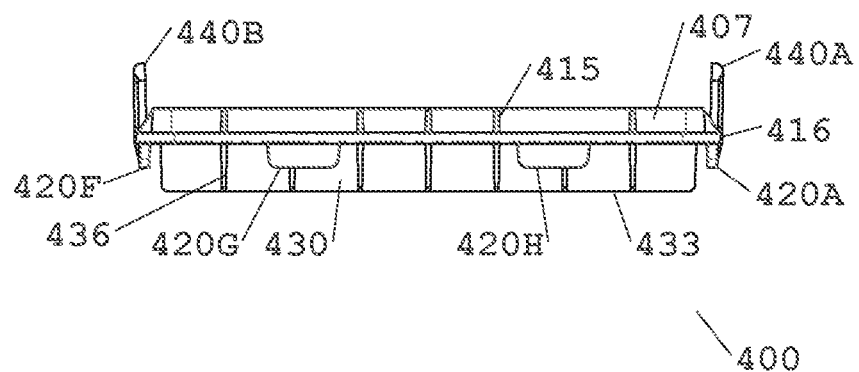
Figure 27:
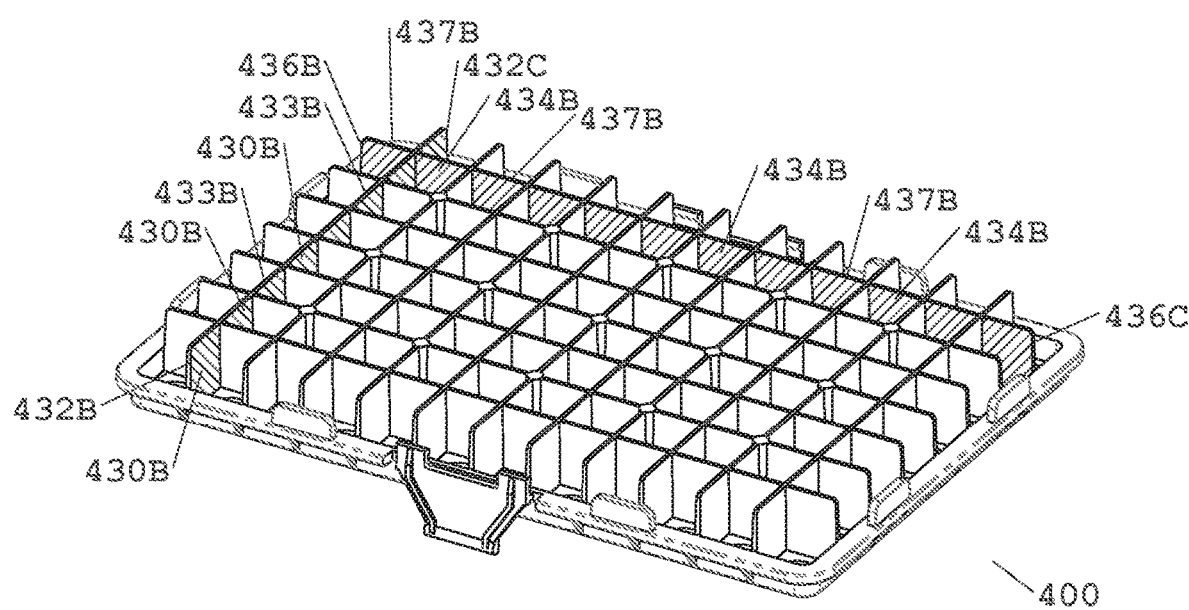

In a non-limiting example, a plate includes proximal surface 405, sidewall exterior surface 407, distal surface 409, bores 410 in an array of bores, and bore sidewall edge 412, as illustrated in plate embodiment 400 shown in FIG. 19 to FIG. 27. A plate sometimes includes support structures having one or more of the following features, as shown for example for plate 400: latitudinal ribs 430 (e.g., 430A, 430B) having side edge 432 (e.g., 432A, 432B, 432C), and distal edge 433 (e.g., 433A, 433B); longitudinal ribs 434 (e.g., 434A, 434B) having side edge 436 (e.g., 436A, 436B, 436C) and distal edge 437 (e.g., 437A, 437B); junctions 435 between latitudinal ribs and longitudinal ribs; and reinforced junctions 439 between certain latitudinal ribs and certain longitudinal ribs and having terminus 438. In such examples, (i) a rib height as illustrated in FIG. 25 is the distance h1 or h2 between plate distal surface 409 and rib distal edge 437 (h1 and h2 are equal for plate rib 434 in this example); (ii) the length of a longitudinal rib, as illustrated in FIG. 27 for longitudinal rib 424B, is the distance along distal edge 437B from side terminus 436B to side terminus 436C; (iii) the length of a latitudinal rib, as illustrated in FIG. 27 for latitudinal rib 430B, is the distance along distal edge 433B from side terminus 432B to side terminus 432C; and (iv) a rib section width as illustrated in FIG. 26 is (1) the distance w1 between sidewall 417A (shown in FIG. 29) to the nearest side of the adjacent rib 433, or (2) the distance w2 between the side of rib 433 to the nearest side of adjacent rib 433.

Interaction Between Base Support Members and Plate Support Members

In embodiments for which a plate is connected to a base, at least a portion of each of at least a subset of the base support members is in contact with a portion of a plate support member. In certain embodiments, at least a portion of the proximal terminus of each of at least a subset of the base ribs is in contact with a portion of a plate rib. In some embodiments, at least a portion of the proximal terminus of each of the base ribs disposed on walls of the base is in contact with a portion of a plate rib. In certain embodiments, the entire proximal terminus of each of base ribs disposed on interior sidewalls of the base is in contact with a portion of a plate rib. Without being limited by theory, the proximal terminus of each base rib in contact with a portion of a plate rib provides support to the plate rib and the plate. Without being limited by theory, the aggregate support provided by the interaction between the proximal terminus of each base rib in contact with a portion of the distal edge of a plate rib, enhances plate rigidity and reduces plate deflection under load, relative to a plate/base combination that does not provide such interaction.

The proximal terminus of a base rib that interacts with a portion of the distal edge of a plate rib generally is the edge (i.e., edge surface) located at the proximal terminus of a base rib, and sometimes a portion of the edge or the entire edge of the base rib is in contact with the portion of a portion of a plate rib distal edge. In certain embodiments, about 5 percent to about 100 percent of the surface area of the proximal terminus edge of a base rib contacts a portion of a plate rib distal terminus edge (e.g., about 10 percent to about 100 percent, about 20 percent to about 100 percent, about 30 percent to about 100 percent, about 40 percent to about 100 percent, about 50 percent to about 100 percent, about 60 percent to about 100 percent, about 70 percent to about 100 percent, about 80 percent to about 100 percent, or about 90 percent to about 100 percent of the surface area of the proximal terminus edge of a base rib contacts a portion of a plate rib distal terminus edge). In some embodiments, the length of the proximal terminus edge of a base rib, from the base interior sidewall on which the rib is disposed at the proximal edge to the rib edge towards the center of the base, that is contact with a portion of the distal edge of a plate rib sometimes is about 0.03 inches to about 0.2 inches (e.g., about 0.04 inches to about 0.15 inches; about 0.05 inches to about 0.12 inches; about 0.06 inches to about 0.09 inches, about 0.03, 0.04, 0.05, 0.06, 0.07, 0.08, 0.09, 0.10, 0.11, 0.12, 0.13, 0.14, 0.15, 0.16, 0.17, 0.18, 0.19, 0.20 inches).

Figure 15:
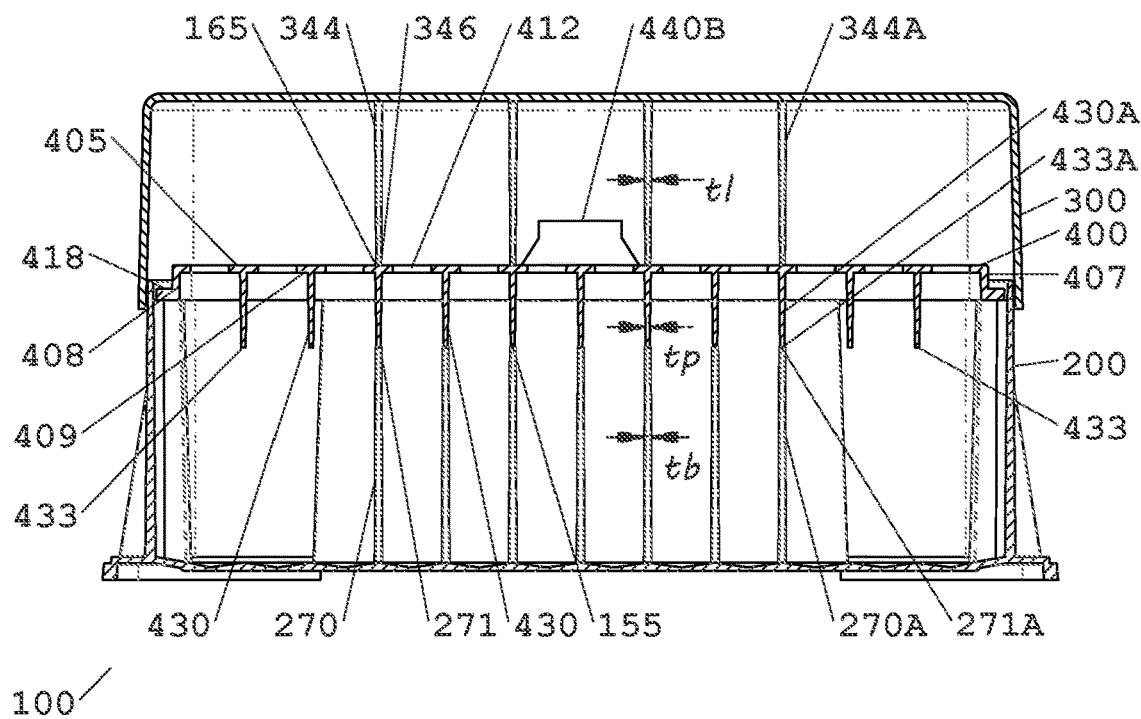
FIG. 15 is a section view through cutting plane 15-15 shown in FIG. 14.
Figure 16:
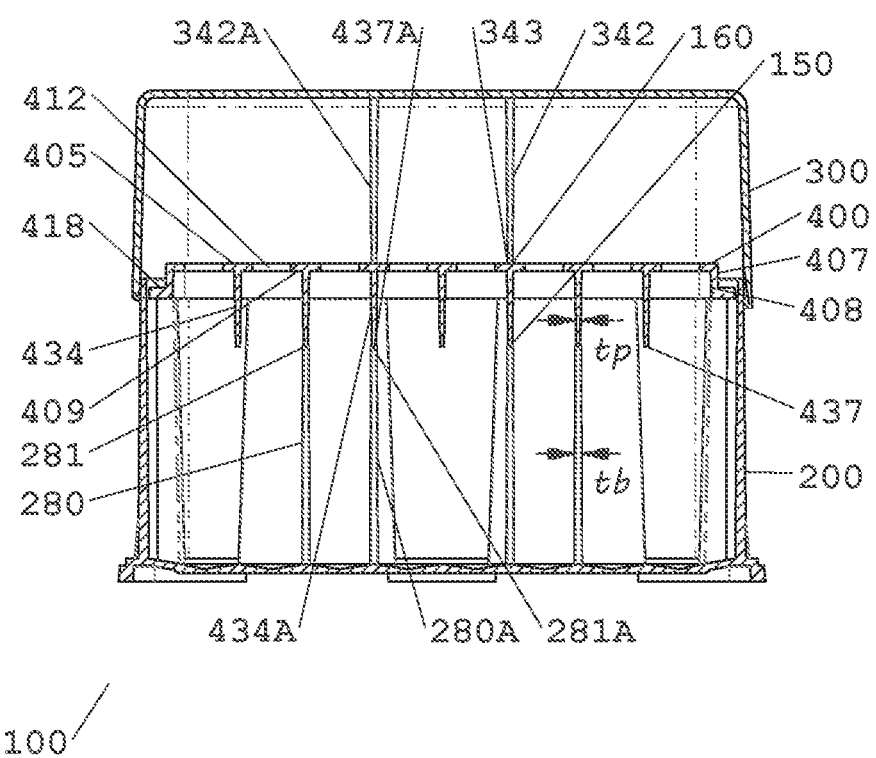
FIG. 16 is a section view through cutting plane 16-16 shown in FIG. 14.

In a non-limiting example, the entire edge of proximal terminus edge 271 of base rib 270 is in contact with the distal edge 433 of plate rib 430, less the gap disposed at the cut between side edge 432 and distal edge 433 of plate rib 430, as illustrated in FIG. 29 for base 200 and plate 400. In a non-limiting example, proximal terminus 271 of each base rib 270 contacts the distal terminus edge 433 of each latitudinal plate rib 430, in a subset of the latitudinal plate ribs, at junction 155, as illustrated in FIG. 15. As illustrated in FIG. 15, the thickness $t_b$ of each base rib 270 at the proximal edge 271 is greater than the thickness $t_p$ of each plate rib 430 at the distal terminus edge 433, for example. In a non-limiting example, proximal terminus 281 of each base rib 280 contacts the distal terminus edge 437 of each longitudinal plate rib 434, in a subset of the longitudinal plate ribs, at junction 150, as illustrated in FIG. 16. As illustrated in FIG. 16, the thickness $t_b$ of each base rib 280 at the proximal edge 281 is greater than the thickness $t_p$ of each plate rib 434 at the distal terminus edge 437, for example.

In some embodiments, the base includes two shorter sides and two longer sides; the base includes a plurality of axially-disposed base ribs disposed on the interior surface of each of the two shorter sides; the surface of the proximal terminus of each of the base ribs disposed on each of the two shorter sides contacts a portion of the distal edge of a longitudinal plate rib; the base includes a plurality of axially-disposed base ribs disposed on the interior surface of each of the two longer sides; and the surface of the proximal terminus of each of the base ribs disposed on each of the two longer sides contacts a portion of the distal edge of a latitudinal plate rib. In certain embodiments, the surface of the proximal terminus of each of the base ribs in contact with a portion of the distal edge of a plate rib contacts a peripheral portion of the plate rib distal edge. In some embodiments, a subset of plate ribs is in contact with all base ribs. In a non-limiting example, a subset of all latitudinal ribs 430 are in contact with all base ribs 270 as illustrated in FIG. 15, and a subset of all longitudinal ribs 434 are in contact with all base ribs 280.

In certain embodiments, the total surface area (i.e., the aggregate surface area) of the proximal terminus edges of all of the base ribs of a base is about 0.066 square inches to about 0.110 square inches (e.g., about 0.075 square inches to about 0.10 square inches, about 0.080 square inches to about 0.095 square inches, about 0.085 square inches to about 0.090 square inches, about 0.068, 0.070, 0.072, 0.074, 0.076, 0.078, 0.080, 0.080, 0.082, 0.084, 0.086, 0.088, 0.090, 0.092, 0.094, 0.096, 0.098, 0.10, 0.12, 0.14, 0.16, 0.18, 0.11 square inches). In some embodiments, the total surface area (i.e., the aggregate surface area) of the distal terminus edges of all of the plate ribs of a plate is about 1.00 square inches to about 1.30 square inches (e.g., about 1.05 square inches to about 1.25 square inches, about 1.1 square inches to about 1.2 square inches, about 1.00, 1.02, 1.04, 1.06, 1.08, 1.10, 1.12, 1.14, 1.16, 1.18, 1.20, 1.22, 1.24, 1.26, 1.28, 1.30 square inches). In certain embodiments, the total surface area (i.e., the aggregate surface area) of the portions of the plate rib distal edges in contact with the proximal terminus edges of all of the base ribs of a base is about 0.001 square inches to about 0.003 square inches (e.g., about 0.0015 square inches to about 0.0025 square inches, about 0.0010, 0.0012, 0.0014, 0.0016, 0.0018, 0.0020, 0.0022, 0.0024, 0.0026, 0.0028, 0.0030 square inches). In some embodiments, the percent of (i) total surface area (i.e., the aggregate surface area) of the portions of the plate rib distal edges in contact with the proximal terminus edges of all of the base ribs of a base, to (ii) the total surface area (i.e., the aggregate surface area) of the distal terminus edges of all of the plate ribs of a plate is about 0.001 percent to about 0.003 percent (e.g., about 0.0015 percent to about 0.0025 percent, about 0.0010, 0.0012, 0.0014, 0.0016, 0.0018, 0.0020, 0.0022, 0.0024, 0.0026, 0.0028, 0.0030 percent).

In certain embodiments, the rib thickness at the proximal terminus of each of the base ribs in contact with a portion of the distal edge of a plate rib is greater than, less than or equal to the rib thickness at the distal edge of the plate rib in contact with the proximal terminus of a base rib. In some embodiments, the rib thickness at the proximal terminus of each of the base ribs in contact with a portion of the distal edge of a plate rib is greater than the rib thickness at the distal edge of the plate rib in contact with the proximal terminus of a base rib. In certain embodiments, the rib thickness at the proximal terminus of each of the base ribs in contact with a portion of the distal edge of a plate rib is about 0.020 inches to about 0.030 inches (e.g., about 0.022 inches to about 0.028 inches, about 0.024 inches to about 0.026 inches, about 0.021, 0.022, 0.023, 0.024, 0.025, 0.026, 0.027, 0.028, 0.029 inches). In some embodiments, the rib thickness at the distal edge of the plate rib in contact with the proximal terminus of a base rib is about 0.017 inches to about 0.025 inches, about 0.018 inches to about 0.024 inches, about 0.019 inches to about 0.023 inches, about 0.020 inches to about 0.022 inches or about 0.017, 0.018, 0.019, 0.020, 0.021, 0.022, 0.023, 0.024 or 0.25 inches.

In certain embodiments for which a plate is in connection with a base, the distance (e.g., maximum distance, average distance) between a plate rib side terminus and the base wall closest to the plate rib side terminus is about 0.03 inches or less (e.g., about 0.025 inches or less, about 0.02 inches or less, about 0.015 inches or less, about 0.01 inches or less, about 0.005 inches or less). In certain embodiments for which a plate is in connection with a base, (i) the non-joined length, i.e., the distal edge, of one or more or all of the plate ribs, is substantially equal to the distance between two opposing base walls between which the plate rib spans and at which the plate rib side termini are disposed (e.g., for plate ribs having a rectangular profile), and/or (ii) the non-joined length, i.e., the distal edge, of one or more or all of the plate ribs, is about 0.03 inches or less (e.g., about 0.025 inches or less, about 0.02 inches or less, about 0.015 inches or less, about 0.01 inches or less, about 0.005 inches or less) than the distance between two opposing base walls between which the plate rib spans and at which the plate rib side termini are disposed (e.g., for plate ribs having a rectangular profile). In some embodiments for which a plate is in connection with a base, and for which a plate rib profile is not rectangular (e.g., one or both side termini are not perpendicular to the plate distal surface or are curved), (i) the maximum non-joined length, i.e., the distal edge, of one or more or all of the plate ribs, is substantially equal to the distance between two opposing base walls between which the plate rib spans and at which the plate rib side termini are disposed, and/or (ii) the maximum non-joined length, i.e., the distal edge, of one or more or all of the plate ribs, is about 0.03 inches or less (e.g., about 0.025 inches or less, about 0.02 inches or less, about 0.015 inches or less, about 0.01 inches or less, about 0.005 inches or less) than the distance between two opposing base walls between which the plate rib spans and at which the plate rib side termini are disposed. In a non-limiting example, the vertical edge of plate rib side terminus 432 of plate rib 430 is a distance about 0.03 inches or less (e.g., about 0.025 inches or less, about 0.02 inches or less, about 0.015 inches or less, about 0.01 inches or less, about 0.005 inches or less) from the nearest interior surface of base wall 205, as illustrated for plate 400 and base 200 in FIG. 29.

Plate Assemblies

A plurality of plates described herein, where each plate sometimes contains an array of pipette tips, can be manufactured as an assembly and provided (e.g., packaged, distributed) for use. An assembly that includes a plurality of plates each containing an array of pipette tips can be utilized for any suitable application, and sometimes an assembly is utilized as part of a pipette tip reload system. A reload system can economically make use of several plates, each containing an array of pipette tips, in conjunction with (i) only one base or a limited number of bases, and (ii) one lid or a limited number of lids. An array of pipette tips sometimes includes 12, 16, 24, 32, 48, 64, 96, 128, 256, 384 or 1536 pipette tips. A plate and/or a sheet described herein sometimes include an array of bores having 12, 16, 24, 32, 48, 64, 96, 128, 256, 384 or 1536 bores.

In certain embodiments, the distal surface of each of two of the plates oppose one another in an assembly. In such assembly embodiments, the distal portion of each of the pipette tips disposed in the first plate often is adjacent to the distal portion of a pipette tip disposed in the second plate.

In some embodiments, the distal surface a first plate is disposed proximally to a proximal surface of a second plate for at least two of the plates in an assembly, and the distal surface of the first plate is spaced from the proximal surface of the second plate. In such assembly embodiments, at least a portion of the distal portion of the each of the pipette tips disposed in the first plate often is nested within a pipette tip disposed in the second plate.

Lid Component

A pipette tip tray that includes a base and receptacle plate sometimes does not include a lid. A pipette tip tray that includes a base and receptacle plate often includes a lid. A lid may include any suitable support features disposed on two or more interior walls of the lid that can interact with a portion of a pipette tip receptacle plate. Lid support features may be disposed on a proximal edge of the lid or on an exterior wall surface, and often are disposed on an interior surface of two or more lid walls. Lid support features include or consist of ribs in certain embodiments.

In some embodiments a lid includes a top and walls, where: each of the walls includes a distal terminus and an interior surface, the lid includes a plurality of axially-disposed lid ribs disposed on the interior surface of two or more of the walls, and each of the lid ribs includes a distal terminus; and at least a portion of the distal terminus of each of at least a subset of the lid ribs contacts a portion of the proximal surface of the plate when the lid is in a closed position. In certain embodiments, a portion of the distal terminus surface, or the entire distal terminus surface, of each of the lid ribs of the lid contacts a portion of the proximal surface of the plate when the lid is in a closed position. In some embodiments, the entire distal terminus surface of each of a subset of the lid ribs, or all of the lid ribs of the lid, contacts a portion of the proximal surface of the plate when the lid is in a closed position.

Lid ribs generally include a joined length disposed on an interior wall, a non-joined length opposite the joined length, a proximal terminus and a distal terminus. The joined length and non-joined length typically are longer than the length of each of the proximal terminus and distal terminus, and the proximal terminus and distal terminus each generally are disposed at the ends of the joined length and non-joined length. The joined length, non-joined length, proximal terminus and distal terminus of a rib together form a lid rib face profile. A lid rib face profile can be any suitable rib profile, including without limitation, a profile that is triangular, quadrilateral, square, rectangular, trapezoid, rhomboid, parallelogram or polygon. The lid rib profile formed sometimes includes flat sides and/or termini, sometimes includes curved sides and/or termini, sometimes includes a rounded, beveled or cut edge (e.g., rounded, beveled or cut transition with another surface), and combinations thereof. The joined length sometimes is a major length of a lid rib, sometimes the non-joined length is the major length of a lid rib, and sometimes the joined length and the non-joined length are equal and each is the major length of a lid rib.

In some embodiments, the joined length and the proximal terminus of one or more or all of the lid ribs is disposed on (e.g., joined to, molded on) the interior surface of the lid top. A lid sometimes includes a transition surface between the lid top interior surface and an interior sidewall surface (e.g., the interior sidewall surface of each wall), where the transition surface has a beveled, cut or curved profile, the proximal terminus of one or more of all of the lid ribs sometimes is disposed on the transition surface, and the profile of the proximal terminus of the one or more or all of the lid ribs follows the profile of the transition surface. The joined length of each of the lid ribs disposed on a wall sometimes is equal to the length between the interior surface of the lid top and a distal terminus of the lid wall, and often is less than the length between the interior surface of the lid top and the distal terminus of the lid wall.

For a rectangular lid rib profile, (i) the joined length and non-joined length are parallel, are equal in length, and often are the major length of the rib, and (ii) the proximal terminus and distal terminus are perpendicular to the joined length and the non-joined length, are parallel to one another, are of the same length as one another, and typically are shorter in length than the joined length and the non-joined length. For a triangular lid rib profile, (i) the joined length and non-joined length are angled with respect to one another (e.g., angle of about 5 degrees to about 60 degrees, e.g., an angle of about 5, 10, 15, 20 25, 30, 35, 40, 45, 50, 55, 60 degrees), and are not equal in length, with the non-joined length often being the major length of the rib, and (ii) one of the proximal terminus and distal terminus often is perpendicular or substantially perpendicular to the joined length and often has a length shorter than the joined length and non-joined length, and the other of the proximal terminus and distal terminus often is a point. For certain quadrilateral lid rib profiles, (i) the joined length and non-joined length sometimes are angled with respect to one another (e.g., angle of about 5 degrees to about 60 degrees, e.g., an angle of about 5, 10, 15, 20 25, 30, 35, 40, 45, 50, 55, 60 degrees), and are not equal in length, with the non-joined length often being the major length of the rib, and (ii) one of the proximal terminus and distal terminus often is perpendicular or substantially perpendicular to the joined length and often has a length shorter than the joined length and non-joined length, and the other of the proximal terminus and distal terminus often is a shorter than the other. For some quadrilateral lid rib profiles, (i) the joined length and non-joined length sometimes are parallel or substantially parallel to one another, and are equal or substantially equal in length, with the non-joined length and joined length typically being the major length or lengths of the rib, and (ii) the distal terminus often is perpendicular or substantially perpendicular to the joined length, and generally is of a length shorter than the joined length and non-joined length, and (iii) the proximal terminus often is angled with respect to the joined length (e.g., angle of about 5 degrees to about 60 degrees, e.g., an angle of about 5, 10, 15, 20 25, 30, 35, 40, 45, 50, 55, 60 degrees) and sometimes is longer than the distal terminus length.

The joined length of one or more or all of the lid ribs often is disposed in a direction from the lid top interior surface to the distal terminus of the wall on which the ribs are disposed, and thereby is "axially disposed" on the interior lid wall. The joined length of one or more or all of the lid ribs sometimes is disposed in a direction perpendicular or substantially perpendicular to the interior seam of the lid formed between the lid top edge and the wall edge on which the rib is disposed. In some embodiments, the joined length of a lid rib disposed on a lid wall is parallel or substantially parallel to the joined length of one or more or all of the other lid ribs disposed on the wall. The joined length of each of the lid ribs of the lid sometimes is parallel or substantially parallel to the joined length of the other lid ribs of the lid.

Lid ribs disposed on a lid wall may be spaced equally (e.g., uniform distribution) and sometimes the distance between two lid ribs is different than the distance between two other lid ribs disposed on the same wall (e.g., irregular distribution). Spacing between lid ribs disposed on one wall sometimes is the same or different than spacing between lid ribs disposed on another wall of the lid. Lid ribs sometimes are disposed on two walls, three walls or four walls of a lid.

A lid rib can have one or more exposed edges. An exposed edge of a lid rib sometimes is an edge along a non-joined length of a lid rib (i.e., a surface of a non-joined length of a rib) and sometimes is an edge along the distal terminus of a lid rib (i.e., a surface of a distal terminus of a lid rib). An exposed edge of a lid rib can have any suitable edge profile, including without limitation, an edge profile that is triangular, quadrilateral, square, rectangular, trapezoid, rhomboid, parallelogram or polygon. An edge profile sometimes includes flat sides and/or termini, sometimes includes curved sides and/or termini, sometimes includes a rounded, beveled or cut edge (e.g., rounded, beveled or cut transition with another surface), and combinations thereof. An edge profile sometimes includes sides that parallel to one another, where the thickness of the rib along the edge is uniform or substantially uniform. An edge profile sometimes includes sides that are not parallel to one another, where the thickness of the rib along the edge is discontinuous and not uniform or not substantially uniform. One or both sides of an edge having an edge profile with a discontinuous thickness sometimes taper from one side of the edge to the other side of the edge, and the one or more sides of the edge profile sometimes are defined independently by a taper angle or draft angle (e.g., an angle of about 0.5 degrees to about 2 degrees). For example, the rib thickness along the non-joined length of a lid rib sometimes is not uniform, and (i) the thickness tapers from the proximal rib terminus to the distal rib terminus, (ii) the thickness tapers from the distal rib terminus to the proximal rib terminus, (iii) the thickness tapers from the joined length to the non-joined length, (iv) the thickness tapers from the non-joined length to the joined length; or combination of two or more of (i), (ii), (iii) and (iv).

In certain embodiments, a subset or all of the lid ribs disposed on a side of a lid have the same distal terminus edge profile and/or non-joined edge profile, and sometimes two or more or all of the lid ribs disposed on a side of a lid have one or more different distal terminus edge profiles and/or non-joined edge profiles. One or more or all lid ribs disposed on all sides of a lid sometimes have the same distal terminus edge profile and/or non-joined edge profile.

For embodiments in which the lid is in a closed position relative to a base, the joined length of each of at least a subset of the lid ribs sometimes is aligned with the joined length of a base rib. In some embodiments, the distal terminus of each of at least a subset of the lid ribs is aligned with a proximal terminus of a base rib. In certain embodiments, the joined length of each of the lid ribs is aligned with the joined length of a base rib. In some embodiments, the distal terminus of each of the lid ribs is aligned with a proximal terminus of a base rib. In certain embodiments, the distal terminus of each of at least a subset of the lid ribs is aligned with a plate rib. In some embodiments, the distal terminus of each of the lid ribs is aligned with a plate rib. In certain embodiments, at least a portion or the entire surface (i.e., the edge) of the distal terminus of at least a subset of the lid ribs contacts a portion of the proximal surface of the plate. In some embodiments, at least a portion or the entire surface (i.e., the edge) of the distal terminus of each of the lid ribs contacts a portion of the proximal surface of the plate. In certain embodiments, the lid includes two shorter sides and two longer sides; the lid includes a plurality of axially-disposed lid ribs disposed on the interior surface of each of the two shorter sides; at least a portion of or the entire surface of the distal terminus of each of the lid ribs disposed on each of the two shorter sides contacts a portion of the proximal surface of the plate when the lid is in a closed position; the lid includes a plurality of axially-disposed lid ribs disposed on the interior surface of each of the two longer sides; and at least a portion of or the entire surface of the distal terminus of each of the lid ribs disposed on each of the two longer sides contacts a portion of the proximal surface of the plate when the lid is in a closed position.

A non-limiting example of a lid is shown in FIG. 1 to FIG. 18, and FIG. 28 and FIG. 29 (e.g., lid 300). A lid may include a front wall exterior surface 310, rear wall exterior surface 311, sidewall exterior surface 315, top exterior surface 325, and opening perimeter edge 333, as shown in lid 300. A lid may include a front wall interior surface 331, sidewall interior surface 316, rear wall interior surface 336, top proximal interior surface 326, and transition surface 337 between the rear wall interior surface the proximal interior surface as shown in lid 300. A lid also may include a front-to-side transition exterior surface 320 (e.g., 320A), rear-to-side transition exterior surface 321, and front-to-side transition interior surface 322 as shown in lid 300. Also, a lid may include one or more hollows disposed on the front interior lid surface, which can provide clearance for pipette tips as the lid is closed or opened around a hinge connector. Non-limiting examples of such hollows include interior peripheral hollows 332 and interior central hollows 334 as shown in lid 300. A lid also may include a plurality of support members disposed on an interior wall surface of the lid. A lid may include one or more of the following support members as illustrated in lid 300: front wall interior axially-disposed ribs 340 having distal terminus 341, sidewall interior axially-disposed ribs 342 (e.g., 342A) having distal terminus 343, rear wall interior axially-disposed ribs 344 (e.g., 344A) having (i) distal terminus 346, (ii) proximal terminus 348, and (iii) side surface 349.

In a non-limiting example, distal terminus 346 of each lid rib 344 contacts plate proximal surface 405 at junction 165, and each lid rib 344 is aligned with each base rib 270, of a subset of the base ribs 270, as illustrated in FIG. 15. In a non-limiting example, distal terminus 343 of each lid rib 342 contacts plate proximal surface 405 at junction 160, and each lid rib 342 is aligned with each base rib 280, of a subset of the base ribs 280, as illustrated in FIG. 16. Similar relationships between lid ribs 340 having distal terminus 341 and base ribs exist as for lid ribs 342 and 344, in certain non-limiting examples.

A lid in certain embodiments is connected to a base by one or more hinge members. In some embodiments, a hinge member includes one or more base hinge members that connect to one or more lid hinge members. Base hinge members sometimes are disposed on a rear wall of the base and lid hinge member counterparts sometimes are disposed on a rear wall of the lid. A base may include a hinge connector disposed on a rear exterior surface (e.g., rear projection 268), which may include central lid hinge connector 255 and peripheral lid hinge connector 256 (and 256A), where hinge connector 255 is joined to projection 254, as illustrated for base 200. A lid may include a hinge counterpart member disposed on a rear exterior surface, which may include a rear hinge connector 330 (and 330A), disposed on rear lid surface 311, and can be disposed between central lid hinge connector 255 and peripheral lid hinge connector 256 of the base, as illustrated for lid 300 and base 200. A lid hinge connector also may include lid rear hinge connector bore 329 that can be configured to receive projection 254 of the base hinge member, as illustrated for base 200 and lid 300. Connection of hinge connector bore 329 to projection 254 of the base hinge member can connect the base hinge member and the lid hinge member and permit hinge rotation, as illustrated for base 200 and lid 300.

A lid in some embodiments includes a lid fastener member that connects with a base fastener counterpart, and sometimes the lid fastener member is disposed on a front wall surface and the base fastener counterpart is disposed on a front wall of a base. In certain embodiments, a lid connector member includes a latch member that connects to a base connector counterpart. A lid, for example, can include latch 305 disposed on lid front wall exterior surface 310 as shown in lid 300. A latch sometimes includes distal region exterior surface 306, proximal region exterior surface 307, central region exterior surface 308 and central region interior surface 312, as shown in lid 300. A latch sometimes includes members that interact with connection members of a base, such as distal projection 309, proximal projection 313 and distal projection protrusion 314 as illustrated in lid 300. As a non-limiting example, a base connection member can be disposed on a front exterior surface of a base (e.g., disposed on base proximal rim 269) and can include a front exterior latch connector 266, which may include latch connector proximal surface 266A, latch connector distal surface 266B, latch connector protrusion 266C, and orifice 266D, as illustrated for base 200. Latch proximal projection 313 in the lid can insert in orifice 266 of the base connector, and latch distal projection protrusion 314 of the lid also may contact latch connector protrusion 266C to facilitate an interference fit between the lid connector and the base connector, as shown for base 200 and lid 300 in FIG. 29. A latch sometimes is connected via a lid-to-latch connector disposed on the front surface of a lid, as illustrated for lid 300 as connector 360.

A lid in certain embodiments is not connected to a base by one or more hinge members or other connectors, and sometimes is reversibly associated with a base. A lid, for example, can be rotated 180 degrees horizontally from its position shown in FIG. 1, and hinge connector 330 (or 330A) can rest in a front exterior hollow 265 of the base, and proximal projection 313 of latch 305 can rest in rear exterior hollow 267, as illustrated for base 200 and lid 300. In such an orientation, edges of lid 300 can rest uninterrupted on base 200 and lid 300 is not connected to base 200 by hinge members or other connectors.

Certain Tray Component Embodiments

Tray component embodiments described herein can include one or more of the following features. In certain embodiments, a plate and a base are connected in a tray. A plate sometimes is reversibly connected to a base via connection members, and sometimes a plate and base are associated and connected with no connection members.

A pipette tip receptacle plate in some embodiments includes a plate sidewall and sometimes includes a flange. The plate sidewall generally includes a distal terminus and the flange sometimes is disposed at the distal terminus of the plate sidewall. The flange generally includes a flange distal surface offset from the plate distal surface by the plate sidewall. In a non-limiting example, a plate can include plate sidewall surface 417A, flange 416, flange edge 417, flange proximal surface 418, flange distal surface 419, as illustrated for plate 400. A plate sometimes includes a plurality of exterior support structures (e.g., exterior ribs) disposed on the flange exterior surface and the plate sidewall exterior surface. In a non-limiting example, a plate can include plate exterior ribs 415 disposed on the flange exterior surface and the plate sidewall exterior surface.

A plate sometimes includes at least one connector configured as a tab disposed on a plate sidewall. The proximal terminus of each tab sometimes is offset from the proximal surface of the plate and extends beyond the proximal surface of the plate. Each tab sometimes includes one or more distal projections extending beyond the plate distal surface, the distal projections sometimes extend beyond the distal surface of a plate flange, and the base sometimes includes tab projection connector counterparts. In some embodiments, a base includes one or more boss members, each of the boss members sometimes includes a proximal ledge, and sometimes each proximal ledge includes one or more connector members configured to receive the projections of the tab.

A non-limiting example of a tab disposed on a plate is shown as tab 440A or 440B illustrated for plate 400. A tab, for example, may include one or more of the following features: a proximal region 442A or 442B, a body having an exterior surface 444A or 444B and an interior surface 445A or 445B, a sloped edge 446A or 446B, a reinforcement 448A or 448B, and one or more tab projections 422 (e.g., 422A, 422B, 422C, 422D), as illustrated for plate 400.

A tab disposed on a plate sometimes is connected to the plate by a spacer, which spacer sometimes is disposed on a tab surface and plate surface in a position for the spacer to serve as a pivot point around which the tab can rotate relative to the plate when a force is applied (e.g., by an operator) to a tab surface. In a non-limiting example, a plate may include flange-to-tab spacer 449A or 449B, as illustrated for plate 400. In certain embodiments, rotation of a tab can release a connector member disposed on the tab from a connector counterpart member disposed in the base, thereby disassociating the connector members and permitting dissociation of the plate from the base. In a non-limiting example, a tab disposed on a plate may include a tab projection that includes one or more tab projection distensions 423, which distension can contact projection 277 in a base connector counterpart as described in greater detail hereafter.

A non-limiting example of base is shown in FIG. 1 to FIG. 18, and FIG. 28 and FIG. 29 (e.g., base 200). A connector in a base can be disposed on a long side of a base and can be configured to receive one of plate tab projections, such as tab projections 422A, 422B, 422C or 422D. A base can include proximal orifice 259, disposed on shelf 276 of a base interior, which opposes distal orifice 261 disposed on a distal surface of shelf 276 of the base, as illustrated for base 200. A base may include orifices 259A, 259B, 259C, and 259D configured to receive plate tab projections 422A, 422B, 422C or 422D, respectively, and opposing distal orifices 261A, 261B, 261C, 261D, respectively, as illustrated in part for base 200. One or more or all base connectors may include one or more projections 277, as shown for base 200 in FIG. 29, each of which can contact a pipette tip receptacle plate tab projection distension 423 disposed on plate tab projection 422. Interaction of projection 277 of the base with distension 423 of a plate tab can connect the plate to the base, for example, by an interference fit.

In some embodiments, a plate includes one or more alignment members and a base includes one or more alignment member counterparts. A plate sometimes includes one or more alignment member projections and a base sometimes includes one or more alignment member orifice counterparts. The one or more alignment member projections sometimes project distally from a distal member of a plate. A plate sometimes includes a distally-disposed flange, and the alignment member projections sometimes are disposed on the flange. A base sometimes includes a ledge disposed on a sidewall boss, and sometimes the alignment member orifice counterparts are disposed on the ledge. In certain embodiments, a base includes one or more alignment member projections and a plate includes one or more alignment member orifice counterparts.

A plate may include two or more alignment projections (e.g., 2, 3, 4, 5, 6, 7, 8, 9, 10, 11, 12, 13, 14, 15, 16, 17, 18, 19, 20 alignment projections). As a non-limiting example, alignment projections may be configured as shown for projections 420 (e.g., projections 420A, 420B, 420C, 420D, 420E, 420F, 420G, 420H), as illustrated for plate 400. As a non-limiting example, a base may include alignment member 260, as illustrated for base 200 that is configured to receive an alignment projection 420 disposed on plate 400. An alignment member (e.g., 260) can include proximal orifice 257 disposed on shelf 276, each of which is disposed on a long side of the base, and can oppose a distal orifice 262 disposed in the alignment member, as shown for base 200. An alignment member (e.g., 260) also can include interior sidewall 278 extending from boss proximal surface 276, as shown for base 200. Proximal orifice 257, sidewall 278 and distal orifice 262 form a slot defined by a volume that often is marginally larger than the volume of alignment projection 420 received by the slot. As a particular example, alignment members 260A, 260B, 260E and 260F of base 200 are configured to receive plate projections 420A, 420B, 420E and 420F, respectively. Alignment members 260A, 260B, 260E and 260F include proximal orifices 257A, 257B, 257E and 257F, respectively, which oppose distal orifices 262A, 262B, 262E and 262F, respectively, for example. An alignment member (e.g., 260) also can include proximal orifice 258 disposed on shelf 286, each of which is disposed on a short side of base 200, and can oppose a distal orifice 262 disposed in the alignment member. An alignment member (e.g., 260) also can include interior sidewall 288 extending from boss proximal surface 286 as shown for base 200. Proximal orifice 258, sidewall 288 and distal orifice 262 form a slot defined by a volume that often is marginally larger than the volume of alignment projection 420 received by the slot. In a particular example, alignment members 260C, 260D, 260G and 260H of base 200 are configured to receive plate projections 420C, 420D, 420G and 420H, respectively. Alignment members 260C, 260D, 260G and 260H include proximal orifices 258C, 258D, 258G and 258H, respectively, which oppose distal orifices 262C, 262D, 262G and 262H, respectively, for example.

In some embodiments, a tray including a plate and a base also includes an array of pipette tips, where each of the pipette tips in the array is disposed in a bore of the array of bores in a plate. In some embodiments, a pipette tip receptacle plate described herein includes an array of pipette tips, where each of the pipette tips in the array is disposed in a bore of the array of bores in a plate. In some embodiments, each of the pipette tips in an array of pipette tips includes a filter, and sometimes each of the pipette tips in an array of pipette tips includes no filter. Each of the pipette tips, in some embodiments, includes axially disposed ribs having a major length disposed in a direction from the proximal rib terminus to the distal rib terminus, and the distal rib terminus of each of the ribs disposed on each of the pipette tips sometimes contacts the proximal surface of the plate. In a non-limiting example, a pipette tip can include a proximal terminus 505, axially-disposed ribs 510, distal terminus 515 of the axially disposed ribs, and proximal region 507 spanning proximal terminus 505 and distal terminus 515, as shown for pipette 500 in FIG. 12.

Each of the bores in the array of bores sometimes includes an interior bore edge and the bore edge sometimes contacts an exterior surface of a pipette tip disposed in the bore. Each of the bores sometimes has an effective diameter, and the effective diameter sometimes is less than the outer diameter of the exterior surface of the pipette tip in contact with the bore edge. A bore edge sometimes contacts an exterior surface of the pipette tip disposed in the same bore by an interference fit, and sometimes a bore edge retains a pipette tip by a force greater than the force of gravity. In some embodiments, each of the bores in the array of bores includes an interior bore edge, each of the bores has an effective diameter, and the effective diameter is greater than the outer diameter of the exterior surface of the pipette tip adjacent to the bore edge.

A tray in some embodiments includes a sheet. A sheet sometimes includes a proximal surface, a distal surface and an array of holes concentric with bores in the array of bores in the plate. Each of the holes of a sheet sometimes includes an interior hole edge and each of the holes of the sheet sometimes has an effective diameter. Any suitable sheet can be utilized in conjunction with a tray, and representative examples are described and shown in International Patent Application No. PCT/2015/064784, filed on Dec. 9, 2015, published as WO 2016/094553, and entitled "Static-Defeating Apparatus For Pipette Tips."

The distal surface of a sheet sometimes contacts the proximal surface of the plate, and pipette tips in the array of pipette tips sometimes are disposed in the holes of the sheet. The hole edge of each of the holes of a sheet sometimes contacts an exterior surface of a pipette tip disposed in the hole of the sheet, and the effective diameter of the holes of the sheet sometimes is less than the outer diameter of the exterior surface of the pipette tip in contact with the hole edge. The hole edge sometimes contacts the exterior surface of the pipette tip by an interference fit, and the hole edge sometimes retains the pipette tip by a force greater than the force of gravity. A distal rib terminus of each of the ribs disposed on each of the pipette tips sometimes contacts the proximal surface of the sheet.

Each of the pipette tips in an array of pipette tips often include a proximal terminus and a proximal terminus interior diameter, and the distal surface of the sheet sometimes is adhered to the proximal terminus of the pipette tips. Each of the holes of the sheet sometimes is concentric with the proximal terminus interior diameter of each of the pipette tips, and the sheet sometimes retains the pipette tips by an adhesion force greater than the force of gravity. Pipette tips sometimes are adhered to a sheet in such embodiments by an adhesive.

In certain embodiments, the walls of the base form a single wall and include no double-wall elements. A wall of a base sometimes includes two wall sections that are offset from one another, which can define a buttress structure that can stabilize the structure of a single wall base. One or more walls of the base sometimes include a first wall portion and an adjacent second wall portion, the first wall portion and the second wall portion sometimes are parallel, the first wall portion and the second wall portion sometimes are joined by a third wall portion, the third wall portion sometimes is not parallel to the first wall portion and the second wall portion, and the first wall portion sometimes is in a different plane than the second wall portion. In some embodiments, one or more walls of the base include a boss member. A boss member sometimes includes the first wall portion and the third wall portion, the third wall portion sometimes extends towards the base interior, and the first wall portion sometimes extends further in the base interior than the second wall portion. Each of the boss members sometimes includes a proximal ledge, and each proximal ledge sometimes includes one or more plate connector members and/or one or more plate alignment members. In some embodiments, a base includes one or more axially extended ribs each disposed on an exterior wall surface.

Walls of a single wall base sometimes include wall sections that are offset from adjacent wall sections. For example, a wall section may include central front wall exterior surface 205, central rear wall exterior surface 206, peripheral front wall exterior surface 210, and peripheral rear wall exterior surface 211, of which wall section 205 is offset from wall section 210, as shown for base 200. Similarly, a wall may include a central sidewall exterior surface 215 (and 215A), rearward offset sidewall exterior surface 216 (and 216A), rearward peripheral sidewall exterior surface 217 (and 217A), forward peripheral sidewall exterior surface 218 (and 218A), and forward offset sidewall exterior surface 219 (and 219A), as shown for base 200. A base can include a transition wall exterior surface 220 (and 220A), which transitions between peripheral front wall and peripheral sidewall), and transition wall exterior surface 221, which transitions between peripheral rear wall and peripheral sidewall, as shown for base 200. For a single wall base that includes buttresses, buttresses on a sidewall can in part be defined by peripheral sidewall buttress edge 241 (and 241A), central sidewall buttress edge 242, peripheral sidewall buttress face 246 (and 246A, 246B) and central sidewall buttress face 247 (and 247A, 247B), as shown for base 200. Buttresses on a front wall or rear wall in part can be defined by front buttress edge 240, front buttress face 245 (and 245A), rear buttress edge 248 and rear buttress face 249, as shown for base 200. A buttress may include a proximal structure, such as an arch for example (e.g., buttress arch 212) as shown for base 20).

A lid in certain embodiments includes an irregular distal edge configured to accommodate uneven base wall structure. In a non-limiting example, a lid may include an irregular distal edge having cutout edge 317 and edge 318 adjacent to cutout edge 317, as shown for lid 300, configured to accommodate arch 212 of base 200.

In addition to including one or more buttresses, a single wall base also may include one or more projection members located in a proximal region of a base that afford further structural rigidity. In a non-limiting example, a base may include a base wall proximal terminus 269 (i.e., base proximal rim), front exterior projection ledge 263, front exterior projection 264 and rear exterior projection 265 as rigidifying support structures, as shown for example for base 200.

A single wall base also may include one or more axially-disposed supports joined to a base wall and a portion of a base footing that afford further structural rigidity, and do not contact a plate support member. A base may include one or more external axially-disposed supports joined to an external base wall (e.g., disposed at or near a transition between a base front wall and base sidewall or base rear wall and base sidewall) and a portion of a base footing. As a non-limiting example, a base may include exterior ribs each having edge 230 (e.g., 230A) and face 235 (e.g., 235A) as shown for base 200. A base may include one or more internal axially-disposed supports joined to an internal base wall (e.g., disposed at or near a transition between a base front wall and base sidewall or base rear wall and base sidewall) and a portion of a base footing. For example, a base may include interior base ribs 290 joined to an interior wall transition surface 291, each having a distal portion joined to another interior wall transition surface 292, as shown for base 200. Interior wall transition surface 291 can be between a rear wall and a sidewall or a front wall and a sidewall. Interior wall transition surface 292 is between (i) the interior surface of the base bottom, and (ii) a rear wall, a sidewall, a front wall or transition surface 291. The proximal edge surface of each of ribs 290 sometimes contact a distal portion of a plate other than a plate rib member, and sometimes contact flange distal surface 419.

A footing sometimes is defined by a perimeter wider than the wall perimeter of a base, which can stabilize a base when in use. In some embodiments, a footing includes a footing proximal surface that extends away externally from an external wall surface. As a non-limiting example, a base may include, a footing distal surface 225 (and 225A, 225B), footing exterior edge 226 (and 226A, 226B), peripheral footing proximal surface adjacent to peripheral sidewall 227 and central footing proximal surface adjacent to central sidewall 228, as illustrated for base 200. A base also may include, as shown in base 200, a peripheral footing distal surface sidewall 232 (and 232A), peripheral footing distal surface to rack base distal exterior surface transition 233, central footing distal surface to rack base distal exterior surface transition 234, peripheral footing distal surface 236, central footing distal surface 237, footing interior edge 238 and rack base distal exterior surface 231.

An interior surface of a base bottom sometimes includes a plurality of depressions, and sometimes each of the depressions includes adjoining bevels. Each of depressions can serve as a fluid-retaining well, which can allow for an operator to utilize a base without a plate and without a lid as a multi-well fluid handling device. A non-limiting example of such features is shown in base 200, that includes depressions having bottom 296 and formed by bevels 294.

A pipette tip tray assembly can include any suitable wall geometry. In some embodiments, a pipette tip tray assembly can include fewer sidewall sections than tray assembly embodiment 100, as illustrated for tray assembly embodiment 600 shown in FIG. 30 and FIG. 31, and for tray assembly embodiment 700 shown in FIG. 33 and FIG. 34, for example. In certain embodiments, different pipette tray assemblies can have different sidewall heights to accommodate pipette tips of different sizes, as illustrated in a comparative manner, for example, by tray assembly embodiment 605 shown in FIG. 32, in comparison to tray assembly embodiment 705 shown in FIG. 35. Representative features of pipette tray assembly embodiments 600, 605, 700 and 705 are shown in FIG. 30 to FIG. 35 and described in Table 1. Pipette tip tray assembly embodiments 600, 605, 700 and 705 generally include pipette tip receptacle plate features described herein, including plate ribs that can interact with base ribs disposed on internal base walls (e.g., proximal terminus of a base rib that interacts with a portion of the distal edge of a plate rib).

A tray component (e.g., a base, pipette tip receptacle plate, lid, pipette tips, or combination thereof) independently often include a polymer, and sometimes are manufactured from a polymer. A polymer can be independently chosen for each component from low density polyethylene (LDPE), high-density polyethylene (HDPE), polypropylene (PP), high-impact polystyrene (HIPS), polyvinyl chloride (PVC), polyethylene terephthalate (PET), amorphous polyethylene terephthalate (APET), polycarbonate (PC), polyethylene (PE), or combination thereof, for example.

Methods of Manufacture

A tray component (e.g., base, pipette tip receptacle plate, lid, pipette tip) described herein may be manufactured by any suitable process. Non-limiting examples of manufacturing processes include thermoforming, vacuum forming, pressure forming, plug-assist forming, reverse-draw thermoforming, matched die forming, extrusion, casting and injection molding.

Tray components independently can include, and can be manufactured from, the same or different material. In some embodiments, all elements of a tray component are manufactured from the same material. Some or all elements of a tray component sometimes include, or are manufactured from, a suitable polymer or polymer mixture. Non-limiting examples of polymers include low density polyethylene (LDPE), high-density polyethylene (HDPE), polypropylene (PP), high impact polystyrene (HIPS), polyvinyl chloride (PVC), amorphous polyethylene terephthalate (APET), polycarbonate (PC) and polyethylene (PE). One or more elements of a tray component can include, or can be manufactured from, a recyclable material and/or degradable material (e.g., a bio-degradable material), non-limiting examples of which are disclosed in International Application no. PCT/US2009/063762 filed on Nov. 9, 2009 and published as WO 2010/054337 on May 14, 2010. One or more elements of a tray component, in some embodiments, include an anti-microbial agent, non-limiting examples of which are disclosed in International Application no. PCT/US2009/047541 filed on Jun. 16, 2009 and published as WO 2010/008737 on Jan. 10, 2010 (e.g., antimicrobial metal (e.g., silver)).

A tray component sometimes is manufactured by a method that includes: providing a mold configured to form features of a tray component described herein; introducing a moldable polymer mixture to the mold; curing the polymer mixture in the mold, thereby forming the tray component; and releasing the tray component from the mold. In certain embodiments, a method for manufacturing a tray component described herein includes: contacting a mold having an interior cavity configured to mold a tray component described herein with a molten polymer; hardening the polymer in the mold, thereby forming the tray component in the mold; and ejecting the tray component from the mold. One or more or all elements of a tray component be molded as a single unit, or can be attached after individual elements are molded. A mold sometimes includes or is manufactured from a metal, which sometimes is or includes aluminum, zinc, steel or a steel alloy. A polymer utilized in a molding process sometimes is a polymer described herein.

Also provided herein in certain embodiments is a mold for manufacturing a tray component described herein by a molding process (e.g., injection molding process), which includes a body that forms exterior surfaces of the tray component and a member that forms interior surfaces of the tray component. A mold sometimes includes one or more core components that form interior surfaces of the tray component.

A tray component sometimes is manufactured by an injection molding process. Injection molding is a manufacturing process for producing objects from thermoplastic (e.g., nylon, polypropylene, polyethylene, polystyrene and the like, for example) or thermosetting plastic (e.g., epoxy and phenolics, for example) materials. A plastic material (e.g., a polymer material) of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method often ensures the complete filling of the mold with the melted plastic. After the mold cools, mold portions are separated, and the molded object is ejected.

A plastic with higher flow and lower viscosity sometimes is selected for use in injection molding processes. Non-limiting examples of plastics with higher flow and lower viscosity include any suitable moldable material having one or more of the following properties: a melt flow rate (230 degrees Celsius at 2.16 kg) of about 30 to about 75 grams per 10 minutes using an ASTM D 1238 test method; a tensile strength at yield of about 3900 to about 5000 pounds per square inch using an ASTM D 638 test method; a tensile elongation at yield of about 7 to about 14% using an ASTM D 638 test method; a flexural modulus at 1% sectant of about 110,000 to about 240,000 pounds per square inch using an ASTM D 790 test method; a notched Izod impact strength (23 degrees Celsius) of about 0.4 to about 4.0 foot pounds per inch using an ASTM D 256 test method; and/or a heat deflection temperature (at 0.455 MPa) of about 160 degrees to about 250 degrees Fahrenheit using an ASTM D 648 test method. Non-limiting examples of materials that can be used include polypropylene, polystyrene, polyethylene, polycarbonate, the like, and mixtures thereof. In some embodiments, additional additives can be included in the plastic or mold to impart additional properties to the final product (e.g., anti-microbial, degradable, anti-static properties). A tray component can be injection molded as a unitary construct.

A mold often is configured to retain molten plastic in a geometry that yields the desired product upon cooling of the plastic. Injection molds sometimes are made of two or more parts. Molds typically are designed so that the molded part reliably remains on the ejector side of the mold after the mold opens, after cooling. The molded part may fall freely away from the mold when ejected from ejector side of the mold. In some embodiments, an ejector sleeve pushes the molded part from the ejector side of the mold.

Methods of Use

Provided are methods of using pipette tip tray and tray, tray components and assemblies described herein. In certain embodiments, a force is applied to the pipette tip receptacle plate, where the force is applied in a direction from the proximal surface of the plate towards the interior surface of the base bottom, and the plate flexes in the direction about 0.03 inches or less (e.g., about 0.025 inches or less, about 0.02 inches or less, about 0.015 inches or less, about 0.01 inches or less, about 0.005 inches or less). In certain embodiments, the force is about 1 pound to about 6 pounds for each pipette tip associated with, or can be associated with, the receptacle plate. For example, the force sometimes is about 90 pounds to about 600 pounds (e.g., for a receptacle plate capable of receiving 96 pipette tips), sometimes is about 300 pounds to about 2500 pounds (e.g., for a receptacle plate capable of receiving 384 pipette tips) or sometimes is about 50, 60, 70, 80, 90, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900 or 3000 pounds.

Provided in some embodiments is a method of using a pipette tip tray described herein that does not contain an array of pipette tips, where the method includes loading an array of pipette tips into the pipette tip receptacle plate of the tray, where each pipette tip in the array of pipette tips is disposed in a bore of the plate. In certain embodiments, a force is applied to the array of pipette tips for the loading, where the force is applied in a direction from the proximal surface of the plate towards the interior surface of the base bottom, and the plate flexes in the direction about 0.03 inches or less (e.g., about 0.025 inches or less, about 0.02 inches or less, about 0.015 inches or less, about 0.01 inches or less, about 0.005 inches or less). Any suitable method for loading pipette tips into a pipette receptacle plate of a tray may be utilized, including automated loading methods and manual loading methods. Pipette tips sometimes are loaded into a pipette receptacle plate of a tray using a press device.

Also provided in certain embodiments is a method of using a pipette tip tray described herein that contains an array of pipette tips disposed in the receptacle plate, where the method includes: sealingly engaging one or more of the pipette tips in the array of pipette tips with a fluid dispensing device, and dissociating one or more of the pipette tips from the pipette tip receptacle plate. After the one or more pipette tips are sealing engaged with a pipette tip device (e.g., sealingly engaged with a nozzle or barrel of a dispensing device), one or more of the following may be performed: draw a fluid into the one or more pipette tips, emit fluid from the one or more pipette tips, and eject the one or more pipette tips from the fluid dispensing device. In certain embodiments, a force is applied to the one or more pipette tips for engaging the one or pipette tips to the fluid dispensing device; the force is applied in a direction from the proximal surface of the plate towards the interior surface of the base bottom; and the plate flexes in the direction about 0.03 inches or less (e.g., about 0.025 inches or less, about 0.02 inches or less, about 0.015 inches or less, about 0.01 inches or less, about 0.005 inches or less). Any suitable fluid handling device can be utilized, including without limitation, an automated device or manual device.

Provided also in some embodiments is a method of using a pipette tip tray described herein that includes an array of pipette tips disposed in the receptacle plate, where the method includes disposing a filter at the proximal terminus of one or more of the pipette tips in the array of pipette tips, and pressing a filter into the one or more of the pipette tips. A filter sometimes is disposed at the proximal terminus of each of the pipette tips in the array of pipette tips, and pressed into each of the pipette tips. In some embodiments, a force is applied to each filter for the pressing; the force is applied in a direction from the proximal surface of the plate towards the interior surface of the base bottom, and the plate flexes in the direction about 0.03 inches or less (e.g., about 0.025 inches or less, about 0.02 inches or less, about 0.015 inches or less, about 0.01 inches or less, about 0.005 inches or less). Any suitable method for disposing and pressing filters into pipette tips can be utilized, including without limitation automated and manual methods, including those that make use of a press device. In certain embodiments, the pressing force is about 1 pound to about 6 pounds for each pipette tip associated with, or can be associated with, the receptacle plate. For example, the pressing force sometimes is about 90 pounds to about 600 pounds (e.g., for a receptacle plate capable of receiving 96 pipette tips), sometimes is about 300 pounds to about 2500 pounds (e.g., for a receptacle plate capable of receiving 384 pipette tips) or sometimes is about 50, 60, 70, 80, 90, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900 or 3000 pounds. In some embodiments, the proximal terminus of the filter is disposed a distance from the proximal terminus of the pipette tip, and the deviation of the distance for the pipette tips in the array of pipette tips is about 0.03 inches or less (e.g., about 0.025 inches or less, about 0.02 inches or less, about 0.015 inches or less, about 0.01 inches or less, about 0.005 inches or less). After filters are loaded into the one or more pipette tips in the array of pipette tips disposed in the receptacle plate, the tray of pipette tips sometimes is prepared for use or distribution, and sometimes the one or more pipette tips loaded with a filter are removed from the tray and prepared for use or distribution.

Examples of Embodiments

Provided hereafter are non-limiting examples of certain embodiments of the technology.

A1. A pipette tip tray, comprising a base and a pipette tip receptacle plate associated with the base,
 which base comprises a bottom and walls, wherein:
  each of the walls comprises a proximal terminus and an interior surface,
  the base comprises a plurality of axially-disposed base ribs disposed on the interior surface of two or more of the walls, and
  each of the base ribs comprises a proximal terminus;
 which pipette tip receptacle plate comprises a proximal surface, a distal surface, an array of bores traversing the plate from the proximal surface to the distal surface, and a plurality of plate ribs disposed on the distal surface of the plate, wherein:
 each of the plate ribs comprises a distal edge and two opposing side edges; and
 at least a portion of the proximal terminus of each of at least a subset of the base ribs contacts a portion of the distal edge of a plate rib.

A1.1. The pipette tip tray of embodiment A1, wherein the interior of the base is a hollow cavity with no internal support features that contact the plate except for the base ribs disposed on the interior surface of each of the two or more walls of the base.

A1.2. The pipette tray of embodiment A1 or A1.2, wherein ribs in the base interior consist of the base ribs disposed on the interior surface of the two or more walls of the base.

A1.3. The pipette tip tray of any one of embodiments A1-A1.2, wherein no base rib contacts another base rib.

A2. The pipette tip tray of any one of embodiments A1-A1.3, wherein each of the base ribs has a major length disposed in a direction from the base bottom to the proximal terminus of the wall on which the ribs are disposed.

A3. The pipette tip tray of embodiment A2, wherein the major length of each of the base ribs is disposed in a direction perpendicular or substantially perpendicular to the base bottom.

A4. The pipette tip tray of embodiment A2 or A3, wherein the major length of each of the base ribs disposed on a wall is parallel or substantially parallel to the major length of the other base ribs disposed on the wall.

A5. The pipette tip tray of embodiment A4, wherein the major length of each of the base ribs of the base is parallel or substantially parallel to the major length of the other base ribs of the base.

A5.1. The pipette tip tray of any one of embodiments A1-A5, wherein the base is substantially a hollow cavity with no internal support features that contact the plate except for the base ribs.

A6. The pipette tip tray of any one of embodiments A1-A5.1, wherein the plate comprises two opposing shorter sides and two opposing longer sides.

A7. The pipette tip tray of embodiment A6, wherein the plate comprises longitudinal plate ribs each having a major length disposed in a direction from one of the shorter sides to the opposing shorter side.

A8. The pipette tip tray of embodiment A7, wherein the major length of each of the longitudinal plate ribs is disposed in a direction perpendicular or substantially perpendicular to the two opposing shorter sides.

A9. The pipette tip tray of any one of embodiments A6-A8, wherein the plate comprises latitudinal plate ribs each having a major length disposed in a direction from one of the longer sides to the opposing longer side.

A10. The pipette tip tray of embodiment A9, wherein the major length of each of the latitudinal plate ribs is disposed in a direction perpendicular or substantially perpendicular to the two opposing longer sides.

A11. The pipette tip tray of any one of embodiments A6-A10, wherein the plate comprises:
a set of longitudinal plate ribs each having a major length disposed in a direction from one of the shorter sides to the opposing shorter side; and
a set of latitudinal plate ribs each having a major length disposed in a direction from one of the longer sides to the opposing longer side.

A12. The pipette tip tray of embodiment A11, wherein:
the major length of each of the longitudinal plate ribs is disposed in a direction perpendicular or substantially perpendicular to the two opposing shorter sides; and
the major length of each of the latitudinal plate ribs is disposed in a direction perpendicular or substantially perpendicular to the two opposing longer sides.

A13. The pipette tip tray of embodiment A11 or A12, wherein:
each of the longitudinal plate ribs intersects the set of latitudinal plate ribs at a plurality of plate rib junctions; and
each of the latitudinal plate ribs intersects the set of longitudinal plate ribs at a plurality of plate rib junctions.

A14. The pipette tip tray of any one of embodiments A6-A13, wherein the array of bores of the plate comprises a plurality of array columns each extending from one of the longer sides to the opposing longer side of the plate and comprising a subset of bores in the array of bores, and a plurality of array rows each extending from one of the shorter sides to the opposing shorter side of the plate and comprising another subset of bores in the array of bores.

A15. The pipette tip tray of embodiment A14, wherein:
each array column comprises c bores;
the plate comprises c−1 longitudinal plate ribs; and
each bore in each array column is adjacent to one or two longitudinal plate ribs.

A16. The pipette tip tray of embodiment A15, wherein:
the plate comprises c−1 plate rib junctions on each of the latitudinal plate ribs; and
each bore in each array column is adjacent to one or two latitudinal ribs.

A17. The pipette tip tray of any one of embodiments A14-A16, wherein:
each array row comprises r bores;
the plate comprises r−1 latitudinal plate ribs; and
each bore in each array row is adjacent to one or two latitudinal plate ribs.

A18. The pipette tip tray of embodiment A17, wherein:
the plate comprises r−1 plate rib junctions on each of the longitudinal plate ribs; and
each bore in each array row is adjacent to one or two longitudinal ribs.

A19. The pipette tip tray of any one of embodiments A1-A18, wherein each of the plate ribs has an average height from the plate distal surface to the distal edge of the plate rib.

A20. The pipette tip tray of any one of embodiments A1-A18, wherein each of the plate ribs has a uniform height or substantially uniform height from the plate distal surface to the distal edge of the plate rib.

A21. The pipette tip tray of embodiment A19 or A20, wherein each of the plate ribs has a uniform height and the same height as each of the other plate ribs.

A22. reserved

A23. The pipette tip tray of any one of embodiments A19-A22, wherein the height of each of the plate ribs is about 0.20 inches to about 0.60 inches.

A24. The pipette tip tray of any one of embodiments A1-A23, wherein each of the plate ribs comprises an average width between (i) adjacent plate rib junctions, or (ii) a plate rib junction and an adjacent plate rib side edge.

A25. The pipette tip tray of any one of embodiments A1-A23, wherein each of the plate ribs comprises a uniform width or substantially uniform width (i) between adjacent plate rib junctions, and (ii) between a plate rib junction and an adjacent plate rib side edge.

A26. The pipette tip tray of embodiment A24 or A25, wherein each of the plate ribs comprises a uniform width (i) between adjacent plate rib junctions, and (ii) between a plate rib junction and an adjacent plate rib side edge, and the width (i) between adjacent plate rib junctions, and (ii) between a plate rib junction and an adjacent plate rib side edge, is the same for all of the plate ribs.

A27. The pipette tip tray of any one of embodiments A1-A26, wherein the surface of the proximal terminus of at least a subset of the base ribs contacts a portion of the distal edge of a plate rib.

A28. The pipette tip tray of any one of embodiments A1-A27, wherein the surface of the proximal terminus of each of the base ribs contacts a portion of the distal edge of a plate rib.

A29. The pipette tip tray of any one of embodiments A1-A28, wherein the rib thickness at the proximal terminus of each of the base ribs in contact with a portion of the distal edge of a plate rib is greater than, less than or equal to the rib thickness at the distal edge of the plate rib in contact with the proximal terminus of a base rib.

A30. The pipette tip tray of embodiments A29, wherein the rib thickness at the proximal terminus of each of the base ribs in contact with a portion of the distal edge of a plate rib is greater than the rib thickness at the distal edge of the plate rib in contact with the proximal terminus of a base rib.

A31. The pipette tip tray of any one of embodiments A1-A30, wherein the rib thickness at the proximal terminus of each of the base ribs in contact with a portion of the distal edge of a plate rib is about 0.020 inches to about 0.060 inches.

A32. The pipette tip tray of any one of embodiments A1-A31, wherein the rib thickness at the distal edge of the plate rib in contact with the proximal terminus of a base rib is about 0.017 inches to about 0.025 inches.

A33. The pipette tip tray of any one of embodiments A1-A32, wherein the rib thickness of each of the base ribs is uniform or substantially uniform.

A34. The pipette tip tray of any one of embodiments A1-A33, wherein the rib thickness of each of the base ribs is not uniform.

A35. The pipette tip tray of embodiment A34, wherein the rib thickness of each of the base ribs tapers from the base bottom to the proximal terminus of the base rib.

A36. The pipette tip tray of any one of embodiments A1-A35, wherein the rib thickness of each of the plate ribs is uniform or substantially uniform.

A37. The pipette tip tray of any one of embodiments A1-A35, wherein the rib thickness of each of the plate ribs is not uniform.

A38. The pipette tip tray of embodiment A37, wherein the rib thickness of each of the plate ribs tapers from the plate distal surface to the distal edge of the plate rib.

A39. The pipette tip tray of any one of embodiments A1-A38, wherein:
the base comprises two shorter sides and two longer sides;
the base comprises a plurality of axially-disposed base ribs disposed on the interior surface of each of the two shorter sides;
the surface of the proximal terminus of each of the base ribs disposed on each of the two shorter sides contacts a portion of the distal edge of a longitudinal plate rib;
the base comprises a plurality of axially-disposed base ribs disposed on the interior surface of each of the two longer sides; and
the surface of the proximal terminus of each of the base ribs disposed on each of the two longer sides contacts a portion of the distal edge of a latitudinal plate rib.

A40. The pipette tip tray of any one of embodiments A1-A39, wherein the surface of the proximal terminus of each of the base ribs in contact with a portion of the distal edge of a plate rib contacts a peripheral portion of the plate rib.

A41. The pipette tip tray of any one of embodiments A1-A40, wherein:
the base bottom comprises an interior surface;
each of the base ribs comprises a distal terminus;
the distal terminus of each of the base ribs is disposed at the interior surface of the base bottom; and
the major length of each of the base ribs disposed on a wall is less than the length between the interior surface of the base bottom and the proximal terminus of the wall.

A42. The pipette tip tray of any one of embodiments A1-A41, wherein:
the base comprises two longer sides and two shorter sides;
each of the longer sides comprises one or more bosses; and
a subset of the base ribs are disposed on the one or more bosses disposed on each of the longer sides.

A43. The pipette tip tray of any one of embodiments A1-A42, wherein:
the base comprises two longer sides and two shorter sides;
each of the shorter sides comprises one or more bosses; and
a subset of the base ribs are disposed on the one or more bosses disposed on each of the shorter sides.

A44. The pipette tip tray of any one of embodiments A1-A43, wherein one or both of the side edges of each of at least a portion of the plate ribs is a distance of 0.02 inches or less from an interior wall surface of the base.

A45. The pipette tip tray of any one of embodiments A1-A44, wherein the length of the proximal terminus of each base rib, measured from the base interior sidewall at which the proximal terminus of the rib is disposed to the corner of proximal terminus towards the center of the base, is about 0.09 inches (0.23 cm) to about 0.21 inches (0.53 cm).

A46. The pipette tip tray of embodiment A45, wherein the length of the proximal terminus of each base rib is about 0.09 inches (0.23 cm) to about 0.15 inches (0.38 cm).

A47. The pipette tip tray of embodiment A46, wherein the length of the proximal terminus of each base rib is about 0.09 inches (0.23 cm) to about 0.12 inches (0.31 cm).

A48. The pipette tip tray of any one of embodiments A1-A47, wherein the plate flexes about 0.03 inches (0.08 cm) or less in a direction from the top surface of the plate towards the interior surface of the base bottom if a force sufficient to insert filters into an array of pipette tips disposed in the array of bores in the plate is applied.

A49. The pipette tip tray of embodiment A48, wherein the plate flexes about 0.02 inches (0.05 cm) or less in the direction from the top surface of the plate towards the interior surface of the base bottom if the force is applied.

A50. The pipette tip tray of embodiment A48 or embodiment A49, wherein the force is about 1 pound to about 6 pounds for each pipette tip associated with, or can be associated with, the receptacle plate.

B1. The pipette tip tray of any one of embodiments A1-A50, comprising a lid connected to the base.

B2. The pipette tip tray of embodiment B1, which lid comprises a top and walls, wherein:
each of the walls comprises a distal terminus and an interior surface,
the lid comprises a plurality of axially-disposed lid ribs disposed on the interior surface of two or more of the walls, and
each of the lid ribs comprises a distal terminus; and
at least a portion of the distal terminus of each of at least a subset of the lid ribs contacts a portion of the proximal surface of the plate when the lid is in a closed position.

B3. The pipette tip tray of embodiment B2, wherein each of the lid ribs has a major length disposed in a direction from the lid top to the distal terminus of the wall on which the lid ribs are disposed.

B4. The pipette tip tray of embodiment B3, wherein the major length of each of the lid ribs is disposed in a direction perpendicular or substantially perpendicular to the lid top.

B5. The pipette tip tray of embodiment B3 or B4, wherein the major length of each of the lid ribs disposed on a lid wall is parallel or substantially parallel to the major length of the other lid ribs disposed on the wall.

B6. The pipette tip tray of embodiment B5, wherein the major length of each of the lid ribs is parallel or substantially parallel to the major length of the other lid ribs of the lid.

B7. The pipette tip tray of any one of embodiments B2-B6, wherein the major length of each of at least a portion of the lid ribs is aligned with the major length of a base rib.

B7.1. The pipette tip tray of any one of embodiments B2-B6, wherein the distal terminus of each of at least a portion the lid ribs is aligned with a proximal terminus of a base rib.

B7.2. The pipette tip tray of any one of embodiments B2-B6, wherein the distal terminus of each of at least a portion the lid ribs is aligned with a plate rib.

B8. The pipette tip tray of embodiment B7, wherein the major length of each of the lid ribs is aligned with the major length of a base rib.

B8.1. The pipette tip tray of embodiment B7.1, wherein the distal terminus of each of the lid ribs is aligned with the proximal terminus of a base rib.

B8.2. The pipette tip tray of embodiment B7.2, wherein the distal terminus of each of the lid ribs is aligned with the proximal terminus of a plate rib.

B9. The pipette tip tray of any one of embodiments B2-B8, wherein the surface of the distal terminus of at least a subset of the lid ribs contacts a portion of the proximal surface of the plate when the lid is in a closed position.

B10. The pipette tip tray of any one of embodiments B2-B8, wherein the surface of the distal terminus of each of the lid ribs contacts a portion of the proximal surface of the plate when the lid is in a closed position.

B11. The pipette tip tray of any one of embodiments B2-B10, wherein the rib thickness of each of the lid ribs is uniform or substantially uniform.

B12. The pipette tip tray of any one of embodiments B2-B10, wherein the rib thickness of each of the lid ribs is not uniform.

B13. The pipette tip tray of embodiment B12, wherein:
the lid top comprises an interior surface; and
the rib thickness of each of the lid ribs tapers from the interior surface of the lid top to the distal terminus of the lid rib.

B14. The pipette tip tray of any one of embodiments B2-B13, wherein:
the lid comprises two shorter sides and two longer sides;
the lid comprises a plurality of axially-disposed lid ribs disposed on the interior surface of each of the two shorter sides;
the surface of the distal terminus of each of the lid ribs disposed on each of the two shorter sides contacts a portion of the proximal surface of the plate when the lid is in a closed position;
the lid comprises a plurality of axially-disposed lid ribs disposed on the interior surface of each of the two longer sides; and
the surface of the distal terminus of each of the lid ribs disposed on each of the two longer sides contacts a portion of the proximal surface of the plate when the lid is in a closed position.

B15. The pipette tip tray of any one of embodiments B2-B14, wherein:
each of the lid ribs comprises a proximal terminus;
the proximal terminus of each of the lid ribs is disposed at the interior surface of the lid top; and
the major length of each of the lid ribs disposed on a wall is less than the length between the interior surface of the lid top and the distal terminus of the wall.

C1. The pipette tip tray of any one of embodiments A1-A50 and B1-B15, wherein the plate and the base are connected.

C2. The pipette tip tray of embodiment C1, wherein the plate and the base are reversibly connected.

C3. The pipette tip tray of embodiment C1 or C2, wherein the plate and the base are connected by one or more connectors.

C4. The pipette tip tray of embodiment C3, wherein:
the plate comprises projection connectors and the base comprises receptacle connector counterparts; and
the projection connectors are disposed on a distal portion of the plate.

C5. The pipette tip tray of embodiment C3, wherein:
the base comprises projection connectors and the plate comprises receptacle connector counterparts; and
the projection connectors are disposed on a proximal portion of the base.

C6. The pipette tip tray of any one of embodiments A1-A50, B1-B15 and C1-C5, wherein the lid and the base are connected.

C7. The pipette tip tray of embodiment C6, wherein the lid and the base are connected by one or more hinge connectors.

C8. The pipette tip tray of embodiment C7, wherein the lid comprises hinge connectors and the base comprises hinge connector counterparts.

C9. The pipette tip tray of embodiment C8, wherein the hinge connectors are disposed on a rear wall of the lid and the hinge connector counterparts are disposed on a rear wall of the base.

C10. The pipette tip tray of any one of embodiments A1-A50, B1-B15 and C1-C9, wherein the lid comprises a fastener member and the base comprises fastener member counterpart.

C11. The pipette tip tray of embodiment C10, wherein the fastener member is disposed on a front wall of the lid and the fastener member counterpart is disposed on a front wall of the base.

C12. The pipette tip tray of any one of embodiments A1-A50, B1-B15 and C1-C11, comprising an array of pipette tips, wherein each of the pipette tips in the array is disposed in a bore of the array of bores in the plate.

C13. The pipette tip tray of embodiment C12, wherein each of the bores in the array of bores comprises an interior bore edge and the bore edge contacts an exterior surface of a pipette tip disposed in the bore.

C14. The pipette tip tray of embodiment C13, wherein each of the bores has an effective diameter, and the effective diameter is less than the outer diameter of the exterior surface of the pipette tip in contact with the bore edge.

C15. The pipette tip tray of embodiment C14, wherein the bore edge contacts the exterior surface of the pipette tip by an interference fit.

C16. The pipette tip tray of embodiment C14 or C15, wherein the bore edge retains the pipette tip by a force greater than the force of gravity.

C17. The pipette tip tray of embodiment C12, wherein:
each of the bores in the array of bores comprises an interior bore edge,
each of the bores has an effective diameter, and
the effective diameter is greater than the outer diameter of the exterior surface of the pipette tip adjacent to the bore edge.

C18. The pipette tip tray of any one of embodiments C12-C17, wherein each of the pipette tips comprises axially disposed ribs having a major length disposed in a direction from the proximal rib terminus to the distal rib terminus.

C19. The pipette tip tray of embodiment C18, wherein the distal rib terminus of each of the ribs disposed on each of the pipette tips contacts the proximal surface of the plate.

C20. The pipette tip tray of embodiment C12, C17 or C18, comprising a sheet, wherein:
the sheet comprises a proximal surface, a distal surface and an array of holes concentric with bores in the array of bores in the plate;
each of the holes of the sheet comprises an interior hole edge and each of the holes of the sheet has an effective diameter;
the distal surface of the sheet contacts the proximal surface of the plate;
pipette tips in the array of pipette tips are disposed in the holes of the sheet;
the hole edge of each of the holes of the sheet contacts an exterior surface of a pipette tip disposed in the hole of the sheet;
the effective diameter of the holes of the sheet is less than the outer diameter of the exterior surface of the pipette tip in contact with the hole edge.

C21. The pipette tip tray of embodiment C20, wherein the hole edge contacts the exterior surface of the pipette tip by an interference fit.

C22. The pipette tip tray of embodiment C20 or C21, wherein the hole edge retains the pipette tip by a force greater than the force of gravity.

C23. The pipette tip tray of any one of embodiments C20-C22, wherein the distal rib terminus of each of the ribs disposed on each of the pipette tips contacts the proximal surface of the sheet.

C24. The pipette tip tray of embodiment C12, C17, C18 or C19, comprising a sheet, wherein:
the sheet comprises a proximal surface, a distal surface and an array of holes concentric with bores in the array of bores in the plate;
each of the pipette tips in the array of pipette tips comprises a proximal terminus and a proximal terminus interior diameter;
the distal surface of the sheet is adhered to the proximal terminus of the pipette tips;
each of the holes of the sheet is concentric with the proximal terminus interior diameter of each of the pipette tips.

C25. The pipette tip tray of embodiment C24, wherein the sheet retains the pipette tips by an adhesion force greater than the force of gravity.

C25.1. The pipette tip receptacle plate of any one of embodiments C12-C25, wherein each of the pipette tips comprises a filter or comprises no filter.

C26. The pipette tip tray of any one of embodiments A1-A50, B1-B15 and C1-C25.1, wherein the walls of the base form a single wall and comprise no double wall elements.

C27. The pipette tip tray of embodiment C26, wherein:
one or more walls of the base comprise a first wall portion and an adjacent second wall portion;
the first wall portion and the second wall portion are parallel;
the first wall portion and the second wall portion are joined by a third wall portion;
the third wall portion is not parallel to the first wall portion and the second wall portion; and
the first wall portion is in a different plane than the second wall portion.

C28. The pipette tip tray of embodiment C26 or C27, wherein one or more walls of the base comprise a boss member.

C29. The pipette tip tray of embodiment C28, wherein:
the boss member comprises the first wall portion and the third wall portion;
the third wall portion extends towards the base interior; and
the first wall portion is extended further in the base interior than the second wall portion.

C30. The pipette tip tray of embodiment C28 or C29, wherein:
each of the boss members comprises a proximal ledge; and
each proximal ledge comprises one or more plate connector members.

C31. The pipette tip tray of any one of embodiments A1-A50, B1-B15 and C1-C30, wherein the base comprises one or more axially extended ribs each disposed on an exterior wall surface.

C32. The pipette tip tray of any one of embodiments A1-A50, B1-B15 and C1-C31, wherein the interior surface of the base bottom comprises a plurality of depressions.

C33. The pipette tip tray of embodiment C32, wherein each of the depressions comprises adjoining bevels.

C34. The pipette tip tray of any one of embodiments A1-A50, B1-B15 and C1-C33, wherein:
the pipette tip receptacle plate comprises a plate sidewall and a flange;
the plate sidewall comprises a distal terminus and the flange is disposed at the distal terminus of the plate sidewall; and
the flange comprises a flange distal surface offset from the plate distal surface.

C35. The pipette tip tray of embodiment C34, wherein the pipette tip receptacle plate comprises a plurality of exterior ribs disposed on the flange exterior surface and the plate sidewall exterior surface.

C36. The pipette tip tray of any one of embodiments A1-A50, B1-B15 and C1-C35, wherein:
the pipette tip receptacle plate comprises a plate sidewall and two or more tabs disposed on the plate sidewall; and
the proximal terminus of each tab is offset from the proximal surface of the plate and extends beyond the proximal surface of the plate.

C37. The pipette tip tray of embodiment C36, wherein:
each tab comprises one or more distal projections extending beyond the plate distal surface, and optionally extend beyond the distal surface of a plate flange; and
the base comprises tab projection connector counterparts.

C38. The pipette tip tray of embodiment C37, wherein:

the base comprises one or more boss members;
each of the boss members comprises a proximal ledge; and
each proximal ledge comprises one or more connector members configured to receive the projections of the tab.

C39. The pipette tip tray of any one of embodiments A1-A50, B1-B15 and C1-C41, wherein the base, pipette tip receptacle plate, lid, pipette tips, or combination thereof, comprise a polymer.

C40. The pipette tip tray of any one of embodiments A1-A50, B1-B15 and C1-C41, wherein the base, pipette tip receptacle plate, lid, pipette tips, or combination thereof, are manufactured from a polymer.

C41. The pipette tip tray of embodiment C39 or C40, wherein the polymer is chosen from low density polyethylene (LDPE), high-density polyethylene (HDPE), polypropylene (PP), high-impact polystyrene (HIPS), polyvinyl chloride (PVC), polyethylene terephthalate (PET), amorphous polyethylene terephthalate (APET), polycarbonate (PC), polyethylene (PE), or combination thereof.

D1. A pipette tip receptacle plate, comprising a proximal surface, a distal surface, an array of bores traversing the plate from the proximal surface to the distal surface, and a plurality of plate ribs disposed on the distal surface of the plate, wherein:
   each of the plate ribs comprises a distal edge and two opposing side edges;
   the plate comprises two opposing shorter sides and two opposing longer sides;
   the plate comprises longitudinal plate ribs each having a major length disposed in a direction from one of the shorter sides to the opposing shorter side;
   the plate comprises latitudinal plate ribs each having a major length disposed in a direction from one of the longer sides to the opposing longer side; and
   each of the longitudinal plate ribs, of at least a portion of the longitudinal plate ribs, intersects the set of latitudinal plate ribs at a plurality of plate rib junctions, and/or each of the latitudinal plate ribs, for at least a portion of the latitudinal plate ribs, intersects the set of longitudinal plate ribs at a plurality of plate rib junctions.

D2. The pipette tip receptacle plate of embodiment D1, wherein:
   one or both of the side edges of each of at least a portion or all of the plate ribs are a distance of 0.02 inches or less from the perimeter of the proximal surface, or 0.03 inches or less from the perimeter of the distal surface, of the plate; and
   the direction of the distance is parallel to the proximal surface of the plate.

D3. The pipette tip receptacle plate of embodiment D1 or D2, wherein one or both of the side edges of each of at least a portion or all of the plate ribs are coextensive with the perimeter of the distal surface of the plate.

D4. The pipette tip receptacle plate of any one of embodiments D1-D3, wherein:
   the plate comprises a distally extending sidewall that includes an exterior sidewall surface and an interior sidewall surface;
   one or both or all of the side edges of each of at least a portion of the plate ribs is a distance of 0.03 inches or less from the interior sidewall surface; and
   the direction of the distance is parallel to the proximal surface of the plate.

D5. The pipette tip receptacle plate of embodiment D4, wherein:
   the plate comprises a distally extending sidewall that includes an exterior sidewall surface and an interior sidewall surface; and
   one or both of the side edges of each of at least a portion or all of the plate ribs abut the interior sidewall surface.

D6. reserved

D7. The pipette tip receptacle plate of any one of embodiments D1-D6, wherein each of the plate ribs has a uniform height or substantially uniform height from the plate distal surface to the distal edge of the plate rib.

D8. The pipette tip receptacle plate of embodiment D7, wherein each of the plate ribs has a uniform height and the same height as each of the other plate ribs.

D9. The pipette tip receptacle plate of any one of embodiments D1-D8, wherein the height of each of the plate ribs is about 0.20 inches to about 0.60 inches.

D10. The pipette tip receptacle plate of any one of embodiments D1-D9, wherein the major length of each of the longitudinal plate ribs is disposed in a direction perpendicular or substantially perpendicular to the two opposing shorter sides.

D11. The pipette tip receptacle plate of any one of embodiments D1-D10, wherein the major length of each of the latitudinal plate ribs is disposed in a direction perpendicular or substantially perpendicular to the two opposing longer sides.

D12. The pipette tip receptacle plate of any one of embodiments D1-D11, wherein:
   each of the longitudinal plate ribs intersects the set of latitudinal plate ribs at a plurality of plate rib junctions; and
   each of the latitudinal plate ribs intersects the set of longitudinal plate ribs at a plurality of plate rib junctions.

D13. The pipette tip receptacle plate of any one of embodiments D1-D12, wherein the array of bores of the plate comprises a plurality of array columns each extending from one of the longer sides to the opposing longer side of the plate and comprising a subset of bores in the array of bores, and a plurality of array rows each extending from one of the shorter sides to the opposing shorter side of the plate and comprising another subset of bores in the array of bores.

D14. The pipette tip receptacle plate of embodiment D13, wherein:
   each array column comprises c bores;
   the plate comprises c−1 longitudinal plate ribs; and
   each bore in each array column is adjacent to one or two longitudinal plate ribs.

D15. The pipette tip receptacle plate of embodiment D14, wherein:
   the plate comprises c−1 plate rib junctions on each of the latitudinal plate ribs; and
   each bore in each array column is adjacent to one or two latitudinal ribs.

D16. The pipette tip receptacle plate of any one of embodiments D14-D16, wherein:
   each array row comprises r bores;
   the plate comprises r−1 latitudinal plate ribs; and
   each bore in each array row is adjacent to one or two latitudinal plate ribs.

D17. The pipette tip receptacle plate of embodiment D16, wherein:
   the plate comprises r−1 plate rib junctions on each of the longitudinal plate ribs; and each bore in each array row is adjacent to one or two longitudinal ribs.

D18. The pipette tip receptacle plate of any one of embodiments D1-D17, wherein each of the plate ribs has an average height from the plate distal surface to the distal edge of the plate rib.

D19. The pipette tip receptacle plate of any one of embodiments D1-D18, wherein each of the plate ribs comprises an average width between (i) adjacent plate rib junctions, or (ii) a plate rib junction and an adjacent plate rib side edge.

D20. The pipette tip receptacle plate of any one of embodiments D1-D18, wherein each of the plate ribs comprises a uniform width or substantially uniform width (i) between adjacent plate rib junctions, and (ii) between a plate rib junction and an adjacent plate rib side edge.

D21. The pipette tip receptacle plate of embodiment D19 or D20, wherein each of the plate ribs comprises a uniform width (i) between adjacent plate rib junctions, and (ii) between a plate rib junction and an adjacent plate rib side edge, and the width (i) between adjacent plate rib junctions, and (ii) between a plate rib junction and an adjacent plate rib side edge, is the same for all of the plate ribs.

D22. The pipette tip receptacle plate of any one of embodiments D1-D21, wherein the rib thickness of each of the plate ribs is uniform or substantially uniform.

D23. The pipette tip receptacle plate of any one of embodiments D1-D21, wherein the rib thickness of each of the plate ribs is not uniform.

D24. The pipette tip receptacle plate of embodiment D23, wherein the rib thickness of each of the plate ribs tapers from the plate distal surface to the distal edge of the plate rib.

D25. The pipette tip receptacle plate of any one of embodiments D1-D24, wherein:
the pipette tip receptacle plate comprises a plate sidewall and a flange;
the plate sidewall comprises a distal terminus and the flange is disposed at the distal terminus of the plate sidewall; and
the flange comprises a flange distal surface offset from the plate distal surface.

D26. The pipette tip receptacle plate of embodiment D25, wherein the pipette tip receptacle plate comprises a plurality of exterior ribs disposed on the flange exterior surface and the plate sidewall exterior surface.

D27. The pipette tip receptacle plate of any one of embodiments D1-D26, wherein:
the pipette tip receptacle plate comprises a plate sidewall and two or more tabs disposed on the plate sidewall; and
the proximal terminus of each tab is offset from the proximal surface of the plate and extends beyond the proximal surface of the plate.

D28. The pipette tip receptacle plate of embodiment D27, wherein each tab comprises one or more distal projections extending beyond the plate distal surface, and optionally extend beyond the distal surface of a plate flange.

D29. The pipette tip receptacle plate of any one of embodiments D1-D28, comprising an array of pipette tips, wherein each of the pipette tips in the array is disposed in a bore of the array of bores in the plate.

D30. The pipette tip receptacle plate of embodiment D29, wherein each of the bores in the array of bores comprises an interior bore edge and the bore edge contacts an exterior surface of a pipette tip disposed in the bore.

D31. The pipette tip receptacle plate of embodiment D30, wherein each of the bores has an effective diameter, and the effective diameter is less than the outer diameter of the exterior surface of the pipette tip in contact with the bore edge.

D32. The pipette tip receptacle plate of embodiment D31, wherein the bore edge contacts the exterior surface of the pipette tip by an interference fit.

D33. The pipette tip receptacle plate of embodiment D31 or D32, wherein the bore edge retains the pipette tip by a force greater than the force of gravity.

D34. The pipette tip receptacle plate of embodiment D29, wherein:
each of the bores in the array of bores comprises and interior bore edge,
each of the bores has an effective diameter, and
the effective diameter is greater than the outer diameter of the exterior surface of the pipette tip adjacent to the bore edge.

D35. The pipette tip receptacle plate of any one of embodiments D29-D34, wherein each of the pipette tips comprises axially disposed ribs having a major length disposed in a direction from the proximal rib terminus to the distal rib terminus.

D36. The pipette tip receptacle plate of embodiment D35, wherein the distal rib terminus of each of the ribs disposed on each of the pipette tips contacts the proximal surface of the plate.

D37. The pipette tip receptacle plate of embodiment D29, D34 or D35, comprising a sheet, wherein:
the sheet comprises a proximal surface, a distal surface and an array of holes concentric with bores in the array of bores in the plate;
each of the holes of the sheet comprises an interior hole edge and each of the holes of the sheet has an effective diameter;
the distal surface of the sheet contacts the proximal surface of the plate;
pipette tips in the array of pipette tips are disposed in the holes of the sheet;
the hole edge of each of the holes of the sheet contacts an exterior surface of a pipette tip disposed in the hole of the sheet;
the effective diameter of the holes of the sheet is less than the outer diameter of the exterior surface of the pipette tip in contact with the hole edge.

D38. The pipette tip receptacle plate of embodiment D37, wherein the hole edge contacts the exterior surface of the pipette tip by an interference fit.

D39. The pipette tip receptacle plate of embodiment D37 or D38, wherein the hole edge retains the pipette tip by a force greater than the force of gravity.

D40. The pipette tip receptacle plate of any one of embodiments D37-D39, wherein the distal rib terminus of each of the ribs disposed on each of the pipette tips contacts the proximal surface of the sheet.

D41. The pipette tip receptacle plate of embodiment D29, D34, D35 or D36, comprising a sheet, wherein:
the sheet comprises a proximal surface, a distal surface and an array of holes concentric with bores in the array of bores in the plate;
each of the pipette tips in the array of pipette tips comprises a proximal terminus and a proximal terminus interior diameter;
the distal surface of the sheet is adhered to the proximal terminus of the pipette tips;
each of the holes of the sheet is concentric with the proximal terminus interior diameter of each of the pipette tips.

D42. The pipette tip receptacle plate of embodiment D41, wherein the sheet retains the pipette tips by an adhesion force greater than the force of gravity.

D43. The pipette tip receptacle plate of any one of embodiments D29-D42, wherein each of the pipette tips comprises a filter or comprises no filter.

D44. The pipette tip receptacle plate of any one of embodiments D1-D43, comprising a polymer.

D45. The pipette tip receptacle plate of any one of embodiments D1-D44, wherein the plate is manufactured from a polymer.

D46. The pipette tip receptacle plate of embodiment D44 or D45, wherein the polymer is chosen from low density polyethylene (LDPE), high-density polyethylene (HDPE), polypropylene (PP), high-impact polystyrene (HIPS), polyvinyl chloride (PVC), polyethylene terephthalate (PET), amorphous polyethylene terephthalate (APET), polycarbonate (PC), polyethylene (PE), or combination thereof.

D47. An assembly comprising a plurality of pipette tip receptacle plates of any one of embodiments D1-D46.

D48. The assembly of embodiment D47, comprising plates of any one of embodiments D29-D46.

D49. The assembly of embodiment D47 or D48, wherein the distal surface of each of two of the plates oppose one another.

D50. The assembly of embodiment D49, wherein the distal portion of the each of the pipette tips disposed in the first plate is adjacent to the distal portion of a pipette tip disposed in the second plate.

D51. The assembly of embodiment D47 or D48, wherein:
the distal surface of a first plate is disposed proximal to a proximal surface of a second plate for at least two of the plates in the assembly, and
the distal surface of the first plate is spaced from the proximal surface of the second plate.

D52. The assembly of embodiment D51, wherein at least a portion of the distal portion of the each of the pipette tips disposed in the first plate is nested within a pipette tip disposed in the second plate.

E1. A method for manufacturing a pipette tray base, pipette tip receptacle plate or lid, comprising:
contacting a mold comprising an interior cavity configured to mold a pipette tray base, pipette tip receptacle plate or lid of any one of embodiments A1-A50, B1-B15, C1-C41 and D1-D46 with a molten polymer;
hardening the polymer in the mold, thereby forming the pipette tray base, pipette tip receptacle plate or lid in the mold; and
ejecting the pipette tray base, pipette tip receptacle plate or lid from the mold.

E2. The method of embodiment E1, wherein the mold comprises a metal.

E3. The method of embodiment E2, wherein the mold is manufactured from a metal.

E4. The method of embodiment E2 or E3, wherein the metal is chosen from aluminum, zinc, steel and a steel alloy.

E5. The method of any one of embodiments E1 to E4, wherein the polymer is chosen from low density polyethylene (LDPE), high-density polyethylene (HDPE), polypropylene (PP), high-impact polystyrene (HIPS), polyvinyl chloride (PVC), polyethylene terephthalate (PET), amorphous polyethylene terephthalate (APET), polycarbonate (PC), polyethylene (PE), or combination thereof.

E6. A mold configured to form a pipette tray base, pipette tip receptacle plate or lid of any one of embodiments A1-A50, B1-B15, C1-C41 and D1-D46, by a molding process.

E7. The mold of embodiment E6, wherein the mold comprises a metal.

E8. The mold of embodiment E7, wherein the mold is manufactured from a metal.

E9. The mold of embodiment E7 or E8, wherein the metal is chosen from aluminum, zinc, steel and a steel alloy.

E10. The mold of any one of embodiments E6-E9, wherein the molding process is an injection molding process.

F1. A method of using a pipette tip tray of any one of embodiments A1-A50, B1-B15 and C1-C41 that does not contain an array of pipette tips, comprising, loading an array of pipette tips into the pipette tip receptacle plate, wherein each pipette tip in the array of pipette tips is disposed in a bore of the plate.

F2. The method of embodiment F1, wherein:
a force is applied to the array of pipette tips for the loading;
the force is applied in a direction from the proximal surface of the plate towards the interior surface of the base bottom; and
the plate flexes in the direction about 0.03 inches or less.

F3. The method of embodiment F1 or F2, wherein the pipette tips are loaded using a press device.

F4. A method of using a pipette tip tray of any one of embodiments A1-A50, B1-B15 and C1-C41 containing an array of pipette tips, comprising:
sealingly engaging one or more of the pipette tips in the array of pipette tips with a fluid dispensing device; and
dissociating one or more of the pipette tips from the pipette tip receptacle plate.

F5. The method of embodiment F4, wherein:
a force is applied to the one or more pipette tips for the engaging;
the force is applied in a direction from the proximal surface of the plate towards the interior surface of the base bottom; and
the plate flexes in the direction about 0.03 inches or less.

F6. The method of embodiment F4 or F5, wherein the fluid dispensing device is an automated device or manual device.

F7. A method of using a pipette tip tray of any one of embodiments A1-A50, B1-B15 and C1-C41 containing an array of pipette tips, comprising:
disposing a filter at the proximal terminus of each pipette tip in the array of pipette tips; and
pressing a filter into each of the pipette tips in the array of pipette tips.

F8. The method of embodiment F7, wherein:
a force is applied to each filter for the pressing;
the force is applied in a direction from the proximal surface of the plate towards the interior surface of the base bottom; and
the plate flexes in the direction about 0.03 inches or less.

F9. The method of embodiment F7 or F8, wherein the pressing is performed by a press device.

F10. The method of any one of embodiments F7-F9, wherein the proximal terminus of the filter is disposed a distance from the proximal terminus of the pipette tip, and the deviation of the distance for the pipette tips in the array of pipette tips is 0.03 inches or less.

F11. The method of any one of embodiments F1-F10, wherein the force is about 1 pound to about 6 pounds for each pipette tip associated with, or can be associated with, the receptacle plate.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A pipette tip tray, comprising a base and a pipette tip receptacle plate associated with the base,
    the base comprises a base bottom, walls and, a base interior, wherein:
        each of the walls comprises a proximal terminus and an interior surface,
        the base comprises a plurality of axially-disposed base ribs disposed on the interior surface of two or more of the walls,
        each of the base ribs comprises a proximal terminus, ribs in the base interior consist of the base ribs disposed on the interior surface of the two or more walls, and each of the base ribs does not contact another of the base ribs;
    the pipette tip receptacle plate comprises a proximal surface, a distal surface, an array of bores traversing the plate from the proximal surface to the distal surface, and a plurality of plate ribs disposed on the distal surface of the plate, wherein:
        each of the plate ribs comprises a distal edge and two opposing side edges, and
        at least a portion of the proximal terminus of each of at least a subset of the base ribs contacts a portion of the distal edge of a plate rib, whereby the pipette tip receptacle plate is supported and rigidified.

2. The pipette tip tray of claim 1, wherein each of the base ribs has a length disposed in a direction from the base bottom to the proximal terminus of a wall on which the base rib is disposed, and the length of each of the base ribs is disposed in a direction perpendicular to the base bottom.

3. The pipette tip tray of claim 1, wherein:
    the plate comprises:
        two opposing shorter sides and two opposing longer sides;
        a set of longitudinal plate ribs each having a length disposed in a direction from one of the shorter sides to the opposing shorter side; and
        a set of latitudinal plate ribs each having a length disposed in a direction from one of the longer sides to the opposing longer side;
    the length of each of the longitudinal plate ribs is disposed in a direction perpendicular or substantially perpendicular to the two opposing shorter sides;
    the length of each of the latitudinal plate ribs is disposed in a direction perpendicular or substantially perpendicular to the two opposing longer sides;
    each of the longitudinal plate ribs intersects the set of latitudinal plate ribs at a plurality of plate rib junctions; and
    each of the latitudinal plate ribs intersects the set of longitudinal plate ribs at a plurality of plate rib junctions.

4. The pipette tip tray of claim 1, wherein each of the plate ribs has a height of about 0.20 inches to about 0.60 inches.

5. The pipette tip tray of claim 1, wherein a surface of the proximal terminus of at least a subset of the base ribs contacts a portion of the distal edge of the plate rib.

6. The pipette tip tray of claim 5, wherein the surface of the proximal terminus of each of the base ribs contacts a portion of the distal edge of the plate rib.

7. The pipette tip tray of claim 1, wherein a base rib thickness at the proximal terminus of each of the base ribs in contact with a portion of the distal edge of the plate rib is greater than a plate rib thickness at the distal edge of the plate rib in contact with the proximal terminus of the base rib.

8. The pipette tip tray of claim 1, wherein a base rib thickness at the proximal terminus of each of the base ribs in contact with a portion of the distal edge of the plate rib is about 0.020 inches to about 0.060 inches.

9. The pipette tip tray of claim 1, wherein a plate rib thickness at the distal edge of the plate rib in contact with the proximal terminus of the base rib is about 0.017 inches to about 0.025 inches.

10. The pipette tip tray of claim 3, wherein:
    the base comprises two shorter sides and two longer sides;
    the base comprises a plurality of axially-disposed base ribs disposed on the interior surface of each of the two shorter sides;
    the surface of the proximal terminus of each of the base ribs disposed on each of the two shorter sides contacts a portion of the distal edge of a longitudinal plate rib;

the base comprises a plurality of axially-disposed base ribs disposed on the interior surface of each of the two longer sides; and the surface of the proximal terminus of each of the base ribs disposed on each of the two longer sides contacts a portion of the distal edge of a latitudinal plate rib.

11. The pipette tip tray of claim 1, wherein:
the base bottom comprises an interior surface;
each of the base ribs comprises a distal terminus;
the distal terminus of each of the base ribs is disposed at the interior surface of the base bottom; and
the length of each of the base ribs disposed on a wall is less than the length between the interior surface of the base bottom and the proximal terminus of the wall.

12. The pipette tip tray of claim 1, wherein:
the base comprises two longer sides and two shorter sides;
each of the longer sides comprises one or more bosses; and
a subset of the base ribs are disposed on the one or more bosses disposed on each of the longer sides.

13. The pipette tip tray of claim 1, wherein:
the base comprises two longer sides and two shorter sides;
each of the shorter sides comprises one or more bosses; and
a subset of the base ribs are disposed on the one or more bosses disposed on each of the shorter sides.

14. The pipette tip tray of claim 1, comprising a lid connected to the base.

15. The pipette tip tray of claim 1, wherein the pipette tip receptacle plate and the base are connected by one or more connectors.

16. The pipette tip tray of claim 1, wherein the proximal terminus of each base rib, measured from the base interior surface of the wall at which the proximal terminus of the rib is disposed to a corner of proximal terminus towards a base center, has a length that is about 0.09 inches to about 0.21 inches.

17. The pipette tip tray of claim 16, wherein the length of the proximal terminus of each base rib is about 0.09 inches to about 0.15 inches.

18. The pipette tip tray of claim 17, wherein the length of the proximal terminus of each base rib is about 0.09 inches to about 0.12 inches.

19. The pipette tip tray of claim 1, comprising an array of pipette tips, wherein each of the pipette tips in the array is disposed in a bore of the array of bores in the pipette tip receptacle plate.

20. The pipette tip tray of claim 11, wherein the pipette tip receptacle plate flexes about 0.03 inches or less in a direction from the proximal surface of the pipette tip receptacle plate towards the interior surface of the base bottom if a force sufficient to insert filters into an array of pipette tips disposed in the array of bores in the plate is applied.

21. The pipette tip tray of claim 20, wherein the pipette tip receptacle plate flexes about 0.02 inches or less in the direction from the proximal surface of the pipette tip receptacle plate towards the interior surface of the base bottom if the force is applied.

22. The pipette tip tray of claim 20, wherein the force is about 1 pound to about 6 pounds for each pipette tip associated with, or can be associated with, the pipette tip receptacle plate.

* * * * *